US 9,970,768 B2

(12) United States Patent
Monroe et al.

(10) Patent No.: US 9,970,768 B2
(45) Date of Patent: May 15, 2018

(54) VEHICLE INFORMATION/ENTERTAINMENT MANAGEMENT SYSTEM

(71) Applicants: Jason J Monroe, Pontiac, MI (US); Robert M Denby, Rochester Hills, MI (US); Lei Zhang, Rochester Hills, MI (US); Ross S Maunders, Harbor Springs, MI (US); Mark E Piche, Troy, MI (US)

(72) Inventors: Jason J Monroe, Pontiac, MI (US); Robert M Denby, Rochester Hills, MI (US); Lei Zhang, Rochester Hills, MI (US); Ross S Maunders, Harbor Springs, MI (US); Mark E Piche, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days. days.

(21) Appl. No.: 14/577,406

(22) Filed: Dec. 19, 2014

(65) Prior Publication Data
US 2015/0185030 A1 Jul. 2, 2015

Related U.S. Application Data

(60) Provisional application No. 61/918,829, filed on Dec. 20, 2013.

(51) Int. Cl.
*G01C 21/20* (2006.01)
*B60W 50/14* (2012.01)
*G01C 21/34* (2006.01)

(52) U.S. Cl.
CPC ............ *G01C 21/20* (2013.01); *B60W 50/14* (2013.01); *G01C 21/3438* (2013.01); *B60K 2350/1028* (2013.01); *B60W 2050/146* (2013.01)

(58) Field of Classification Search
CPC ............... G01C 21/20; G01C 21/3438; B60K 2350/1028; B60W 50/14
(Continued)

(56) References Cited

U.S. PATENT DOCUMENTS 8,457,839 B2 * 6/2013 Schneider .............. B60K 35/00
701/36
8,903,593 B1 * 12/2014 Addepalli ............. H04W 4/046
701/29.1
(Continued)

FOREIGN PATENT DOCUMENTS

DE  102005035431 B3  4/2007
EP      1914106 A2    4/2008

OTHER PUBLICATIONS

International Search Report and Written Opinion dated Oct. 21, 2015 for International Application No. PCT/US2014/071594, International Filing Date Dec. 19, 2014.

*Primary Examiner* — Rodney A Butler
(74) *Attorney, Agent, or Firm* — Ralph E Smith

(57) ABSTRACT

The present disclosure relates to a motor vehicle information management system for use in a motor vehicle. The system incorporates a radio system which has a display system, and a remotely located processor-based inference engine. The inference engine automatically, wirelessly receives information inputs from the radio system in real time pertaining to at least one of a real time location of the vehicle and at least one of a destination of travel of the vehicle or a status of operation of the vehicle. The inference engine may analyzes the information inputs and determines new information, in real time, that is useful to the vehicle operator, and automatically transmits the new information wirelessly to the radio system for use by the user. The display system automatically displays the new information to the vehicle operator.

22 Claims, 48 Drawing Sheets

(58) Field of Classification Search
USPC .......................................................... 701/532
See application file for complete search history.

(56) References Cited

U.S. PATENT DOCUMENTS

| | | | |
|---|---|---|---|
| 2009/0146846 A1* | 6/2009 | Grossman | B60R 25/04 340/988 |
| 2012/0215403 A1* | 8/2012 | Tengler | B60W 50/12 701/36 |
| 2013/0018545 A1* | 1/2013 | Prakah-Asante | G08G 1/166 701/36 |
| 2013/0214939 A1* | 8/2013 | Washlow | G01S 7/003 340/901 |
| 2014/0062687 A1* | 3/2014 | Voticky | G06Q 30/0251 340/438 |
| 2014/0075048 A1* | 3/2014 | Yuksel | H04L 45/02 709/242 |
| 2014/0129965 A1* | 5/2014 | Sorin | G06F 9/4446 715/762 |
| 2014/0278091 A1* | 9/2014 | Horvitz | G01C 21/3679 701/533 |
| 2015/0081157 A1* | 3/2015 | Banasky, Jr. | G01C 21/26 701/29.1 |

* cited by examiner

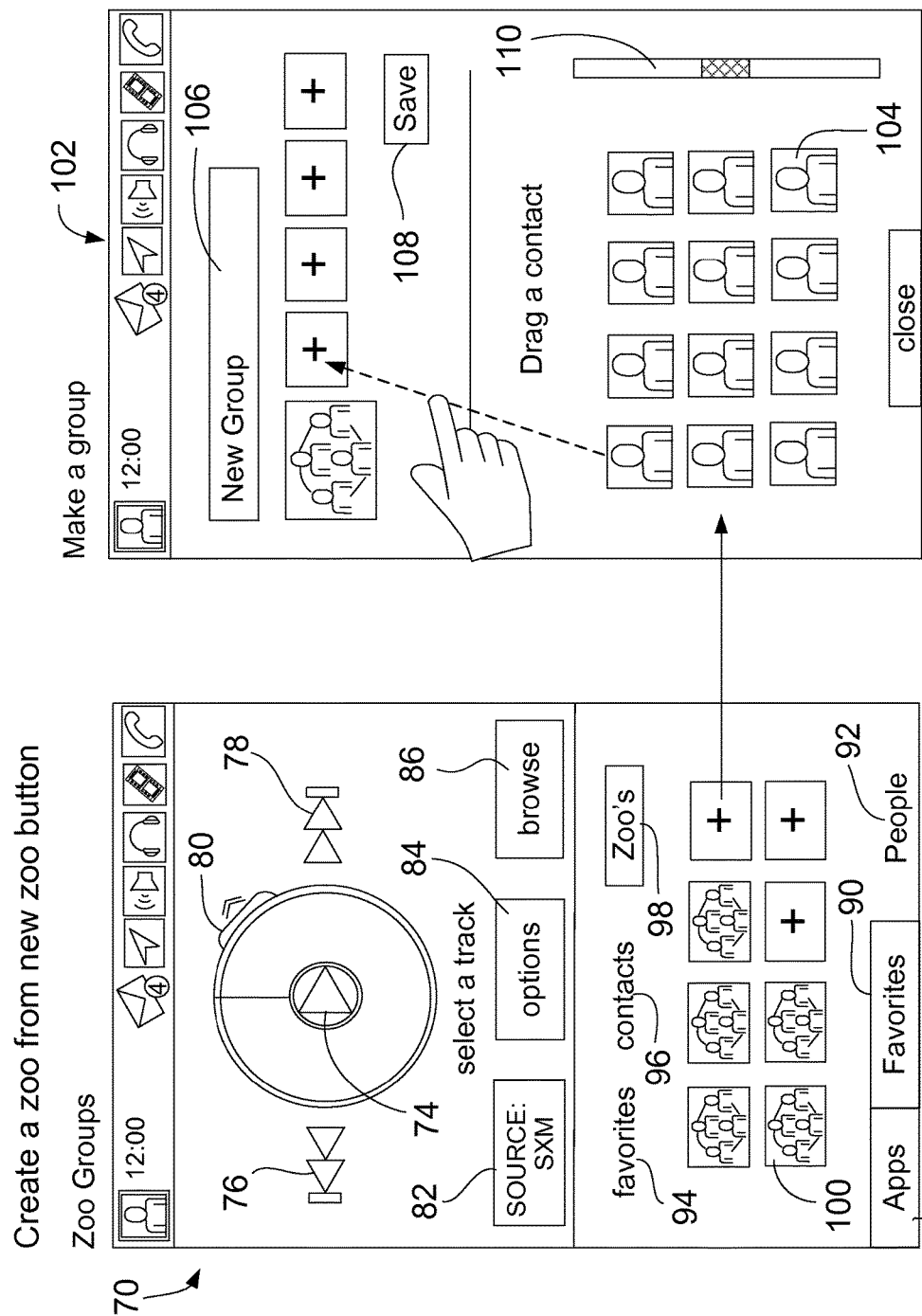

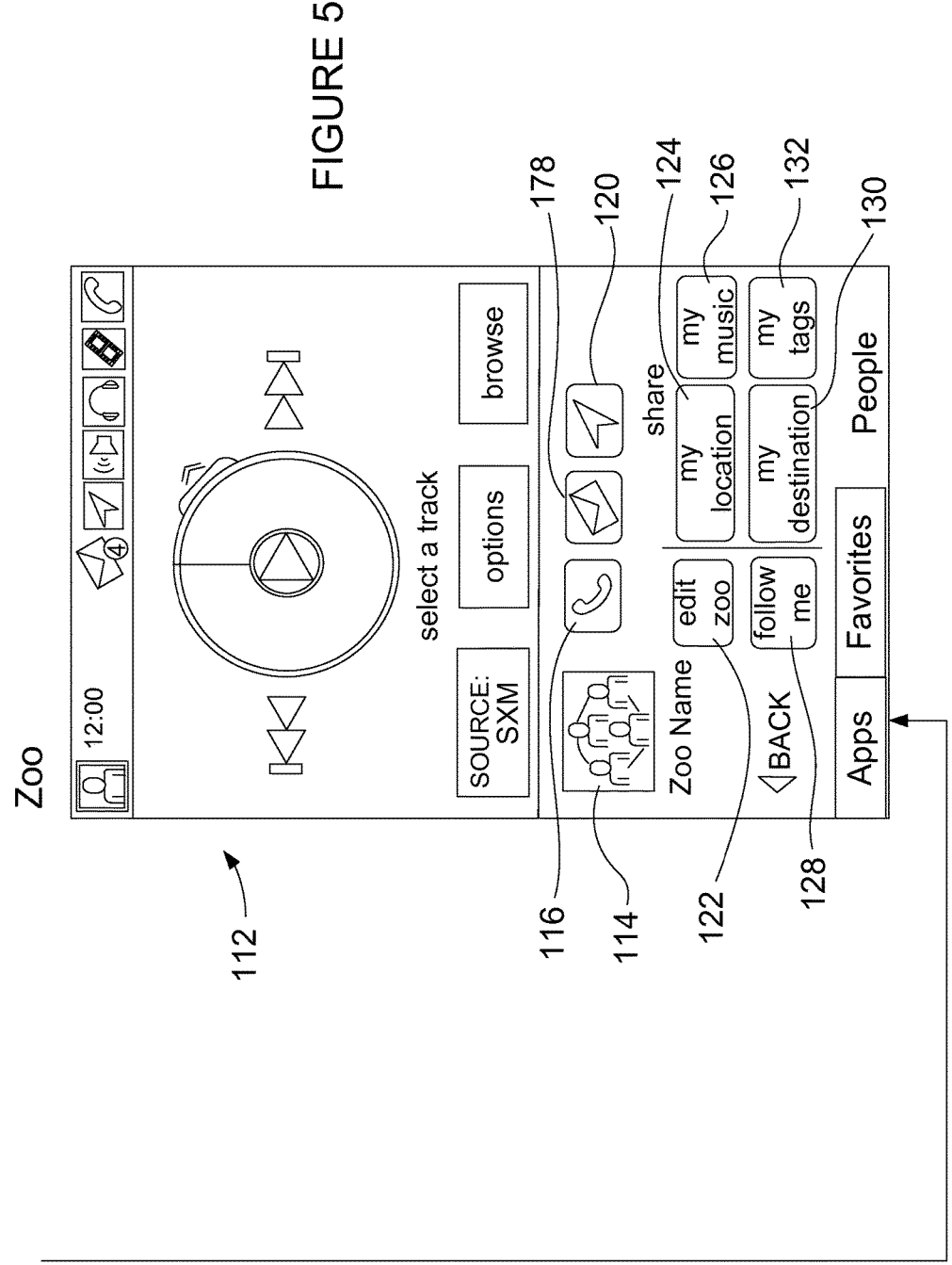

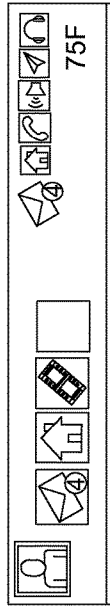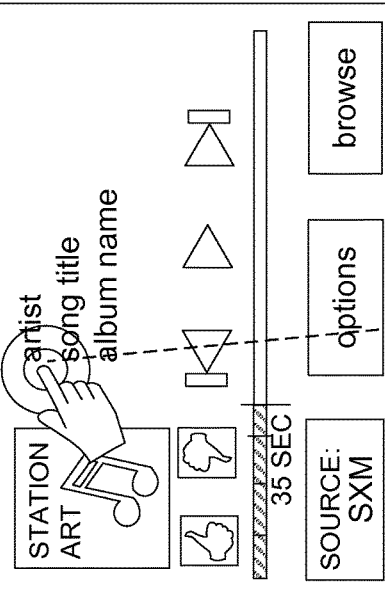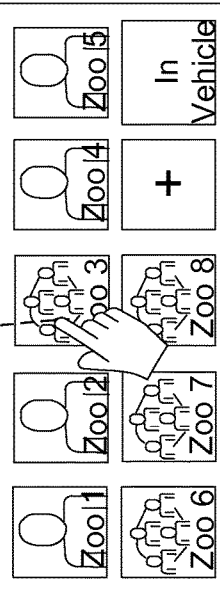
FIGURE 5B
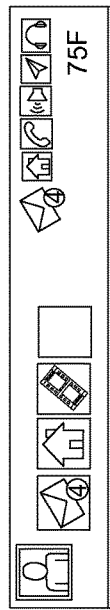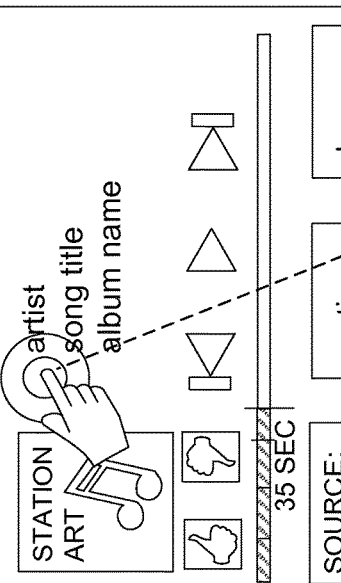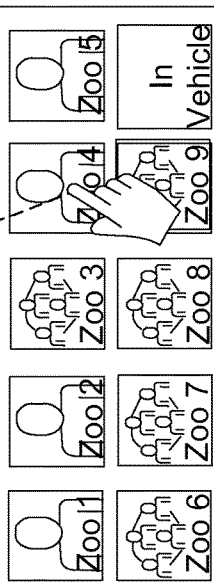
FIGURE 5A

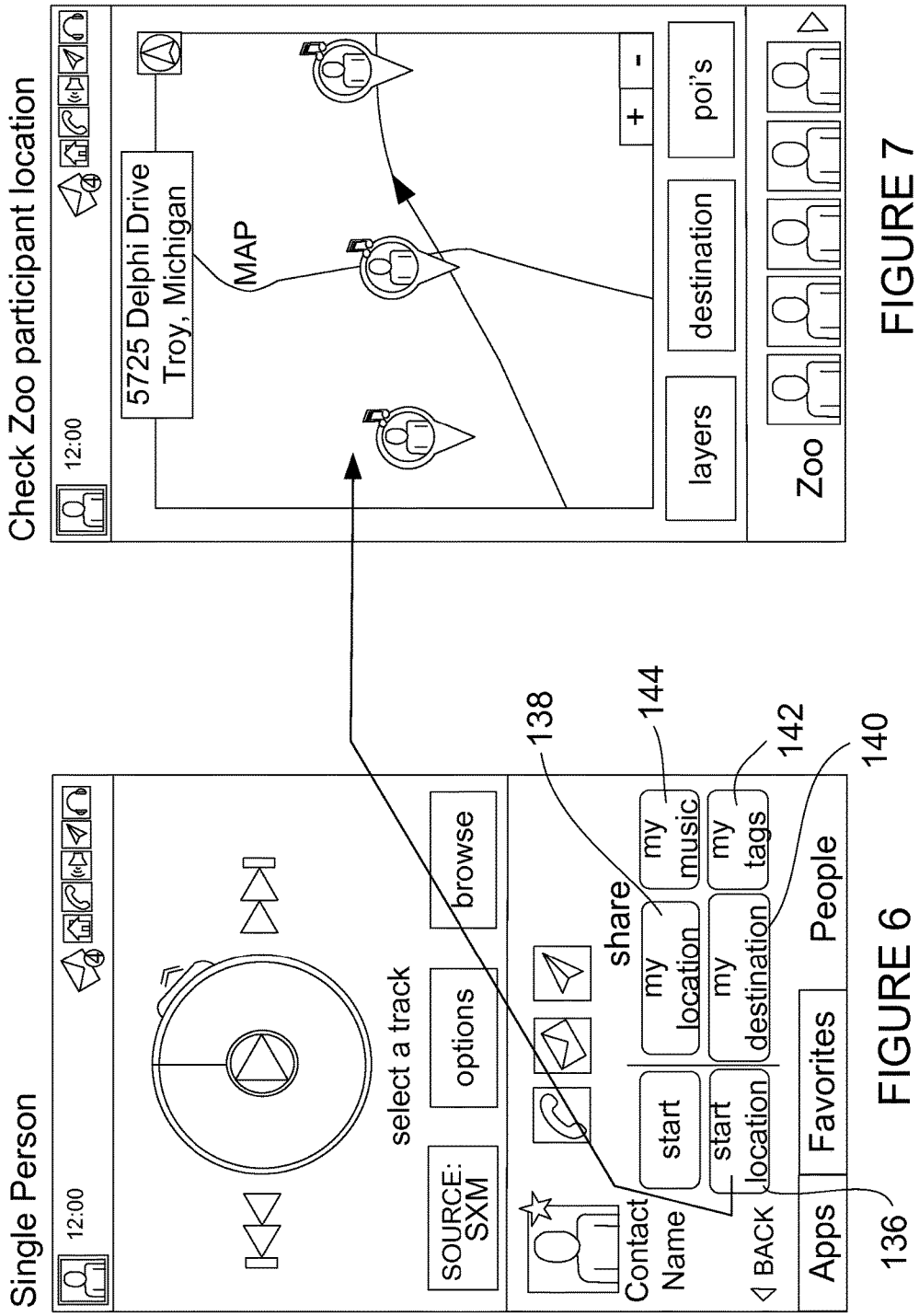

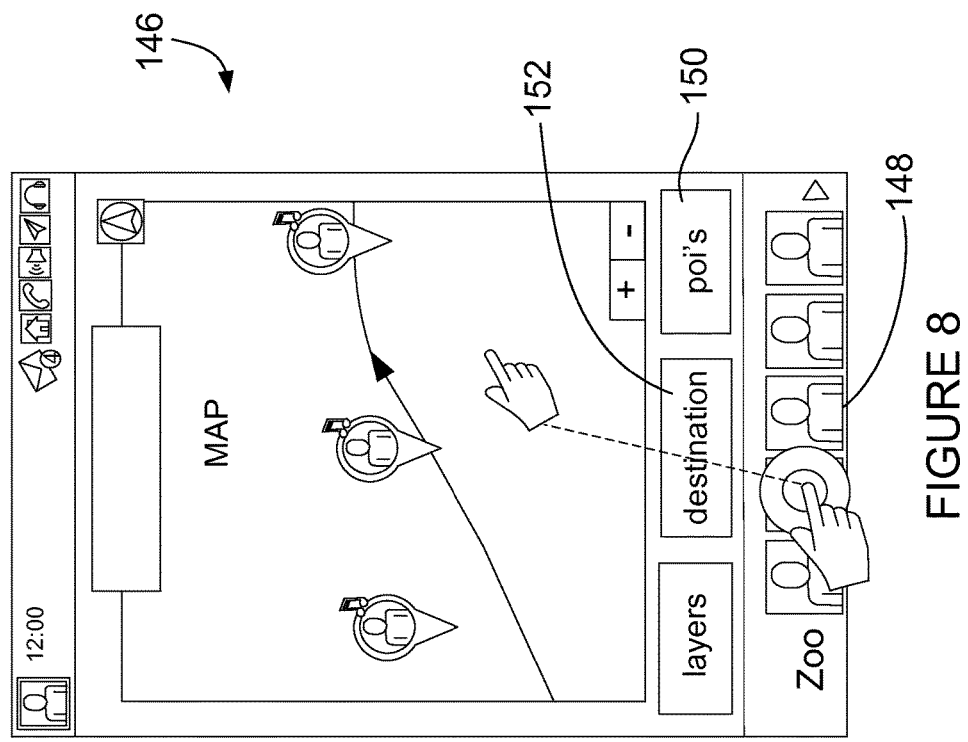

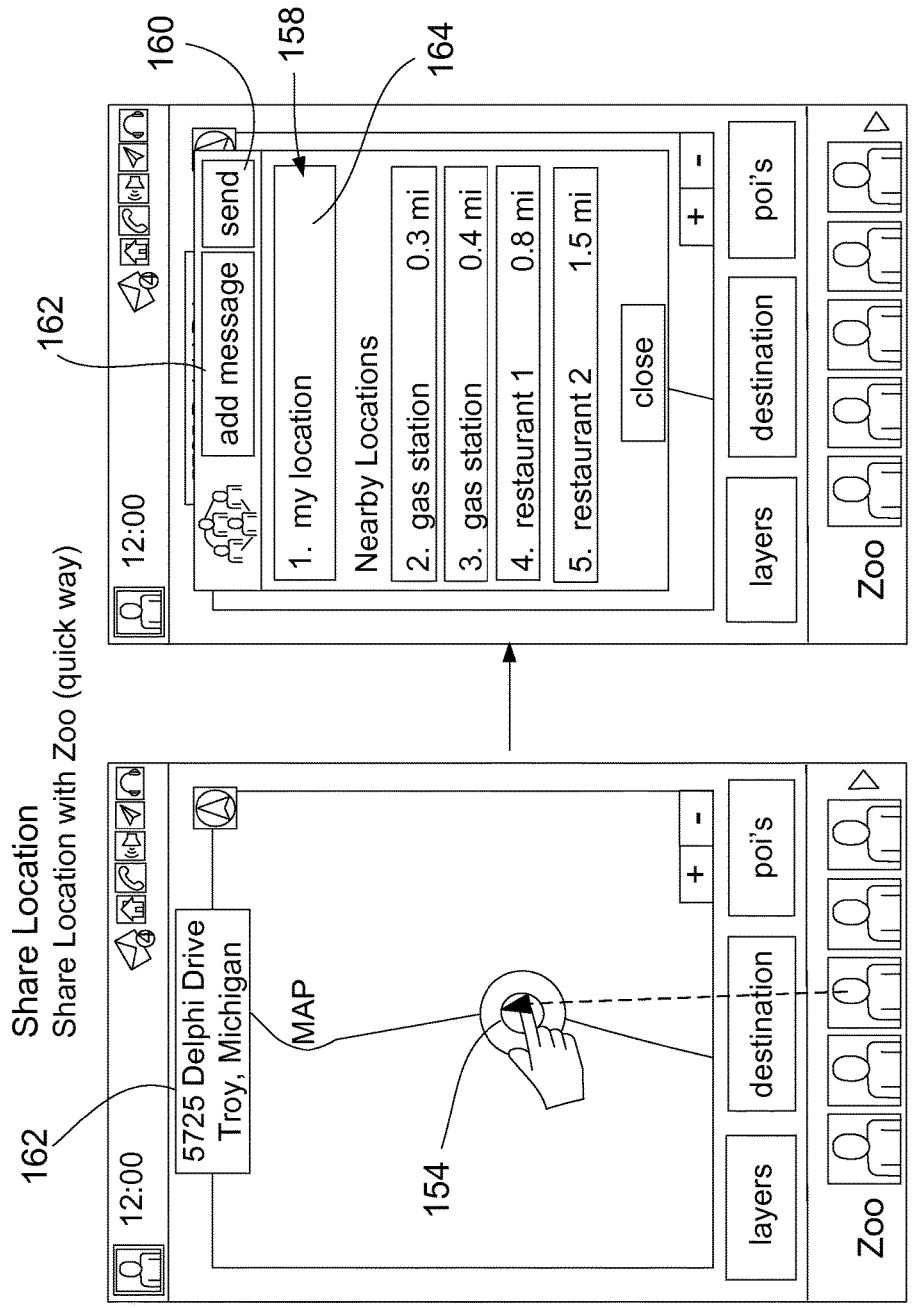

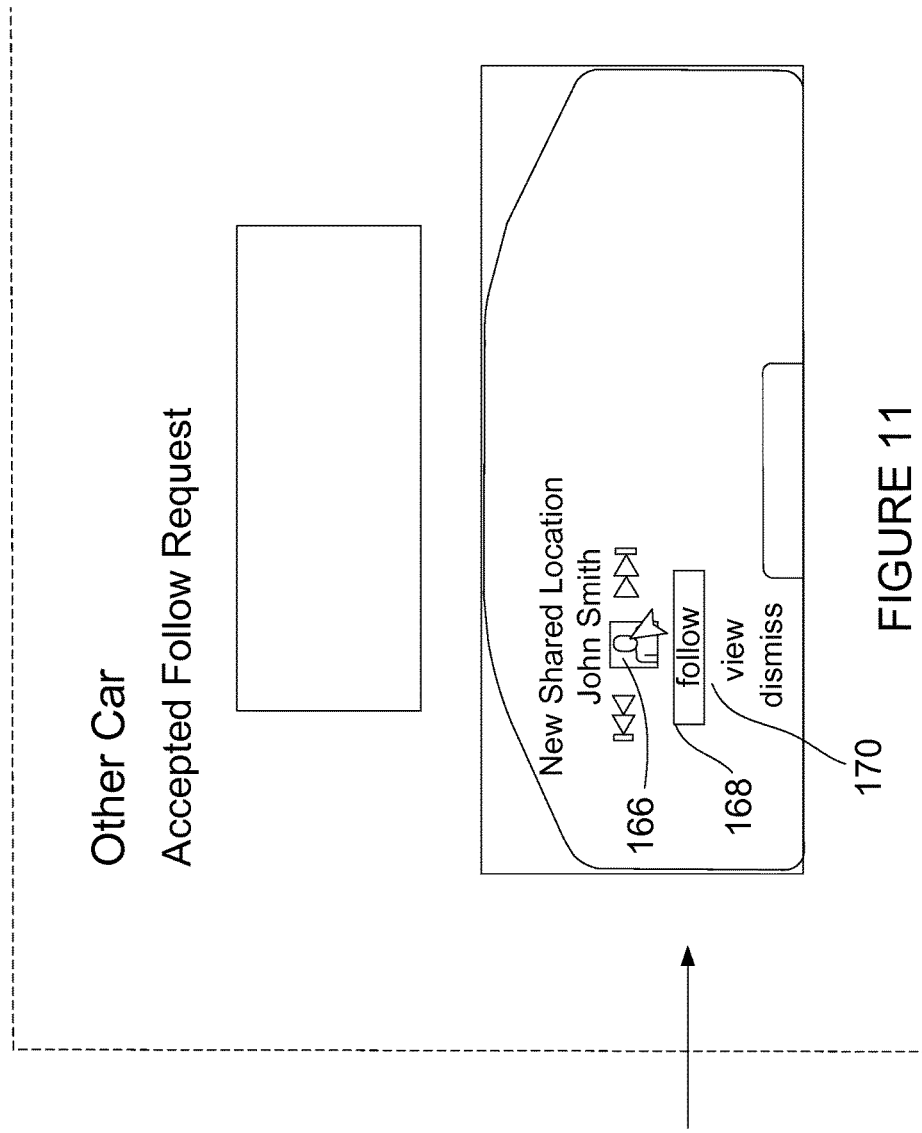

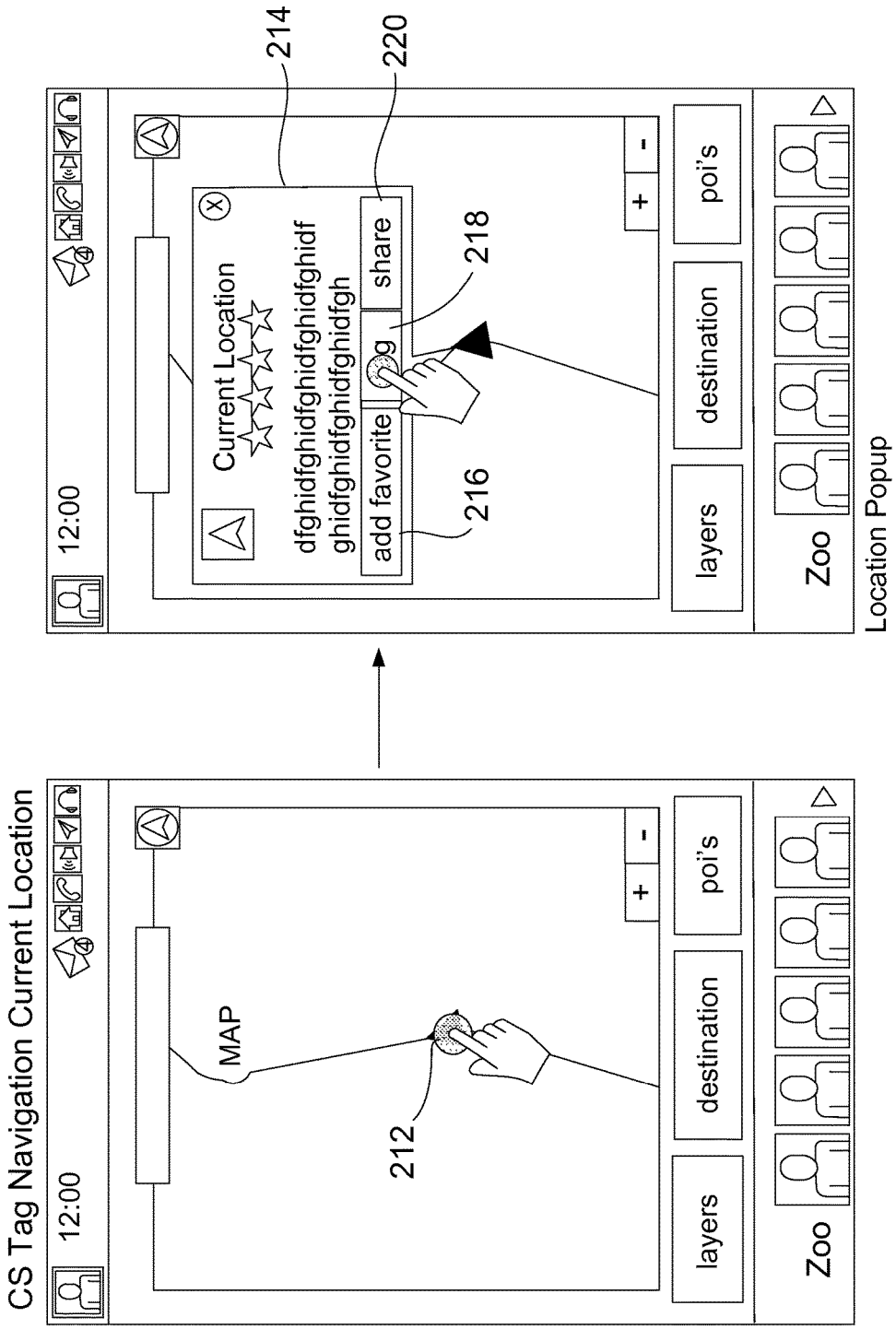

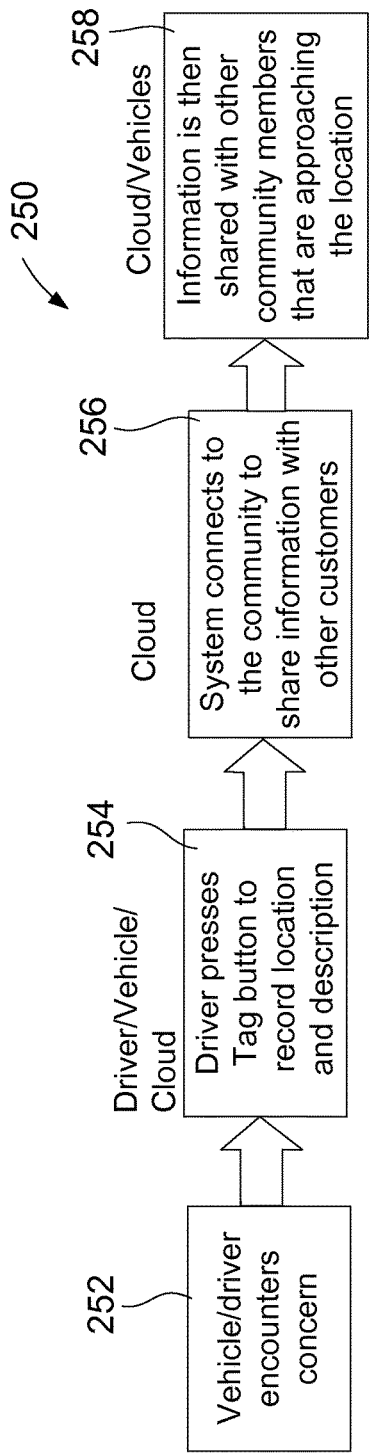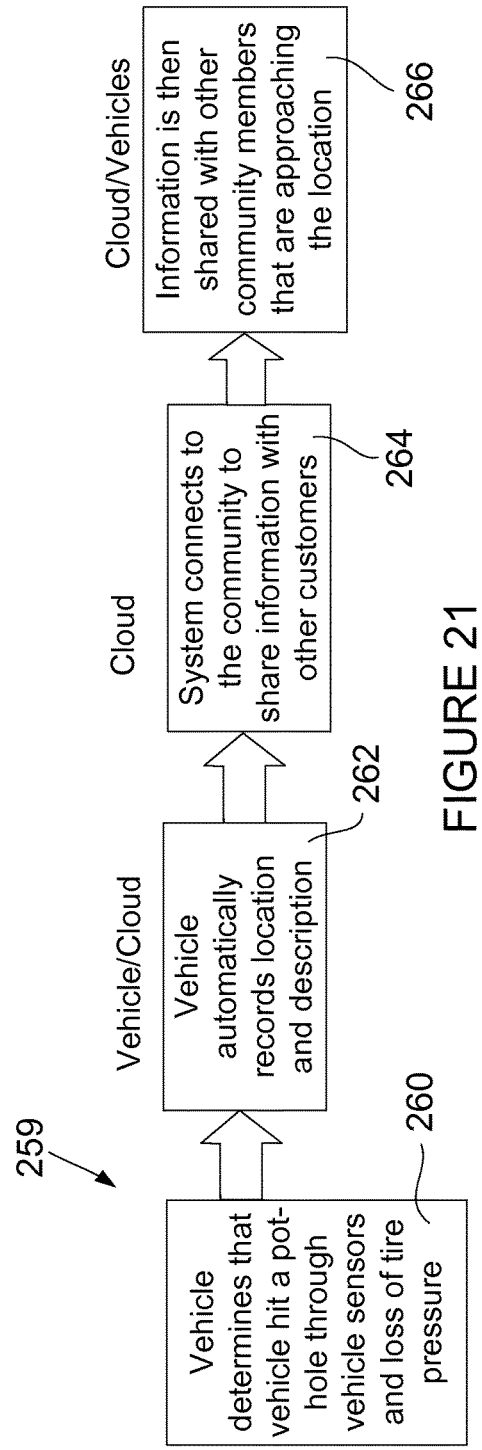

Making Inferences Using Vehicle Information

300

START

Vehicle travelling on a given inferred route
302

Computer providing real time vehicle information to cloud-based inference engine
304

Inference engine determines fuel refilling will be needed before vehicle reaches inferred destination
306

Inference engine provides listing of gas stations in proximity to the inferred route and alerts user that fuel supply is insufficient to reach inferred destination
308

User may select one of the listed gas stations listed, and NAV system displays route for user to the selected gas station
310

END

FIGURE 23

4. PROFILE DATA
    4.1.1.     User profiles will be populated in 3 ways: Direct User Input, Social Media Data Collection, User Behavior Data Collection, and the Inference Engine
    4.1.2. Direct User Input
        4.1.2.1. Direct User Input may be accomplished through an interview process using the personal assistant.
        4.1.2.2. Direct User Input may be accomplished through internet profile entry.
        4.1.2.3. Each family member or friend identified by the driver will have a profile.
        4.1.2.4. Internet Profile Entry
            4.1.2.4.1. Family attributes
                4.1.2.4.1.1. Family member relationship (son, daughter, spouse, father, mother, brother, etc.)
                4.1.2.4.1.2. First names of family members
                4.1.2.4.1.3. Birthdays of family members
                4.1.2.4.1.4. Pictures of family members
                4.1.2.4.1.5. Pet type, name, and picture
            4.1.2.4.2. Friends
                4.1.2.4.2.1. Automatic entry from Facebook or other app
                4.1.2.4.2.2. Selection of attribute to identify close friends
            4.1.2.4.3. Share my location with
                4.1.2.4.3.1. Me
                4.1.2.4.3.2. Family
                4.1.2.4.3.3. Friends
                4.1.2.4.3.4. Sites (Facebook, Twitter)
            4.1.2.4.4. Favorites and Preferences
                4.1.2.4.4.1. Colors- primary and secondary
                4.1.2.4.4.2. Restaurant categories (Italian, Mexican, Fast Food). Select more than one.
                4.1.2.4.4.3. Events

FIGURE 24A

- 4.1.2.4.4.4. Activities
- 4.1.2.4.4.5. Music Genres
- 4.1.2.4.4.6. Places
- 4.1.2.4.4.7. News Feeds
- 4.1.2.4.4.8. Selection of sites
  - 4.1.2.4.4.8.1. Facebook < URL, username: ; password: >
  - 4.1.2.4.4.8.2. Twitter < URL, username: ; password: >
  - 4.1.2.4.4.8.3. Linkedin < URL, username: ; password: >
  - 4.1.2.4.4.8.4. iHeartradio < URL, username: ; password: >
  - 4.1.2.4.4.8.5. Pandora < URL, username: ; password >
  - 4.1.2.4.4.8.6. College Alumni Society < URL, username: ; password: >
  - 4.1.2.4.4.8.7. High School Alumni Society < URL, username: ; password: >
- 4.1.3. Social Media Data Collection
- 4.1.4. Social Media Data shall be collected if the user opts into social media monitoring
- 4.1.5. Social Media sources may include Facebook, Yelp, Open Table, Twitter, ???
- 4.1.6. The data collected from Social Media sources may include profile information.
- 4.1.7. The data collected from Social Media sources may include pattern identification to identify likes/dislikes
- 4.1.8. User Behavior Data Collection
- 4.1.9. User Behavior monitoring will include tracking of preferences when interacting with the cockpit and rear seat electronics
- 4.1.10. Examples of behavior monitoring
  - 4.1.10.1. Seat Position
  - 4.1.10.2. HVAC Temp and fan settings
  - 4.1.10.3. Navigation routes
  - 4.1.10.4. Audio Volume Level
  - 4.1.10.5. Audio Type (AM, FM, Satellite, onboard/offboard audio)...) by time of day
  - 4.1.10.6. Audio Selection (Songs, Artists ...) by time of day ...i.e. my favorites
  - 4.1.10.7. Voice prompt of various attributes
  - 4.1.10.8. Rate of declining help from the vehicle or inference engine ...
- 4.1.11. Inference Engine

FIGURE 24B 4.1.11.1. The system will use Entry and Measurement data to infer and fill in the gaps in the user profile 4.1.11.1.1. Only stops for gas on Mondays (whether needs or not) so provide gas prices 4.1.11.1.2. Stops for coffee in AM on a defined schedule 4.1.11.1.3. Learns what time leaves for work to help with Traffic Routing 4.1.11.1.4. Learns what time leaves from work to help with Traffic Routing

5. CLOUD REQUIREMENTS 5.1.1. A profile for each user will be stored in cloud.

5.1.2. The cloud will associate the vehicle with all user profiles that have used the system

6. VEHICLE CUSTOMIZATION 6.1. FUNCTIONS 6.1.1. The head unit will store a copy of each user profile that has used the system 6.1.2. After the driver is identified, the head unit will activate the profile of the driver 6.1.3. The head unit will communicate the active profile over Ethernet to the other system modules.

6.1.4. The system modules will utilize the profile information to customize the look and feel of the system 6.2 CONTENT 6.2.1. Themes 6.2.1.1. Themes consist of skins- look and color 6.2.1.2. Themes will not change the placement of gauges 6.2.1.3. Themes will not affect the HMI flow 6.2.1.4. There will be 2 themes for Phase 1

6.2.2. HMI Content 6.2.2.1. Content may be added to the HMI such as gauges, info boxes, etc.

6.2.2.2. Personal apps will be loaded or not loaded based on profile

FIGURE 24C

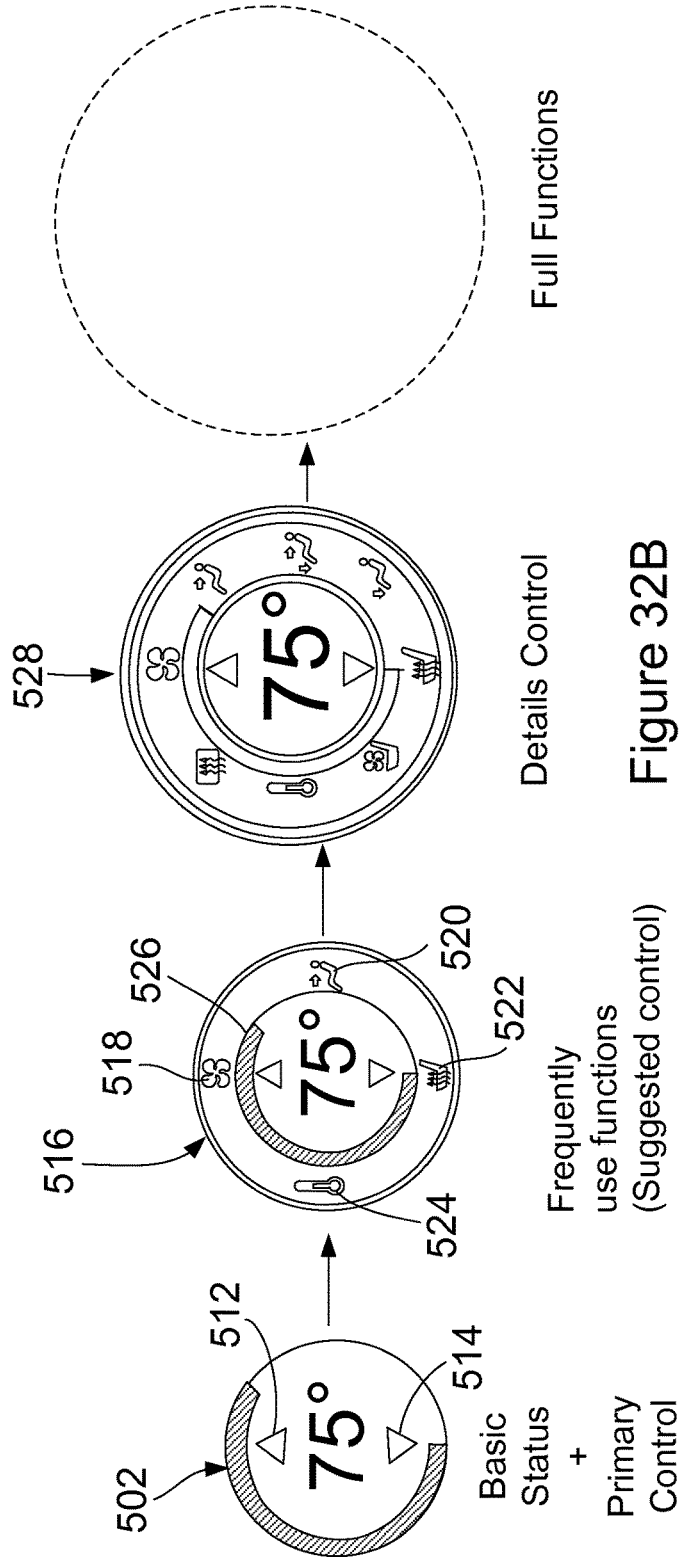

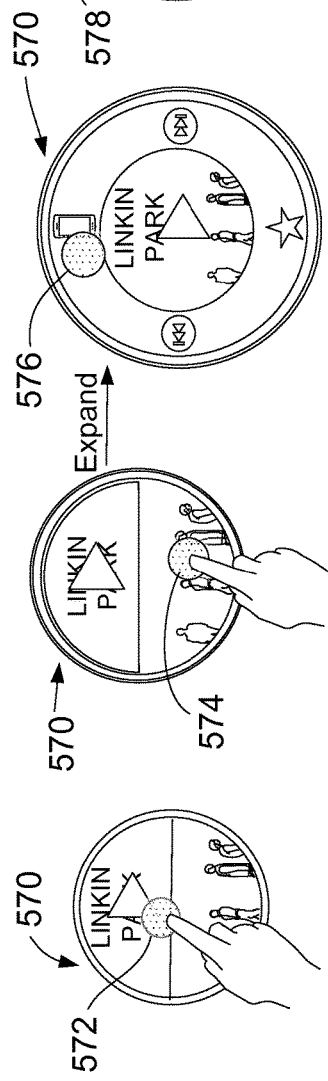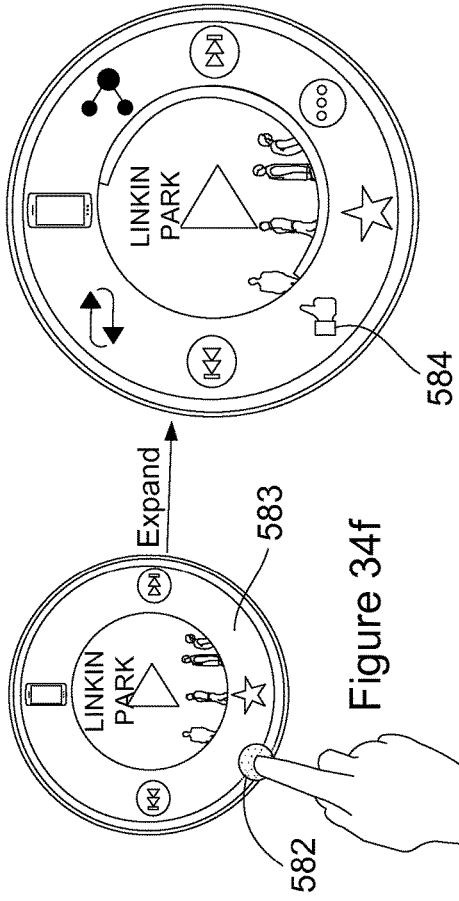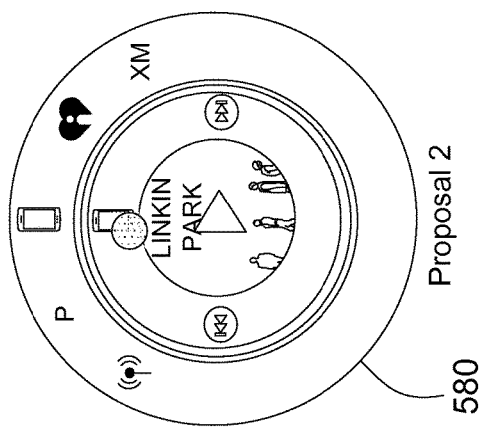

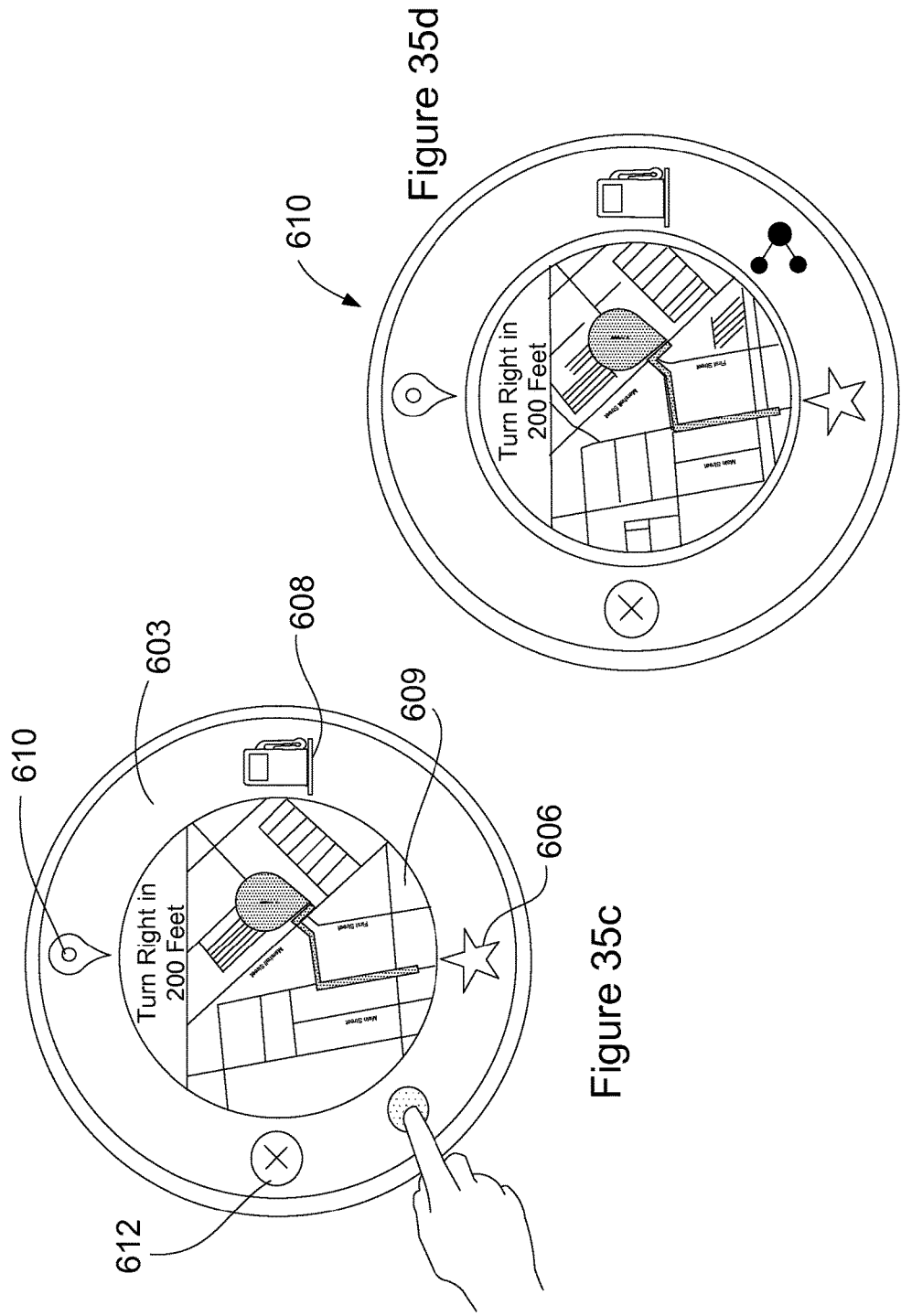

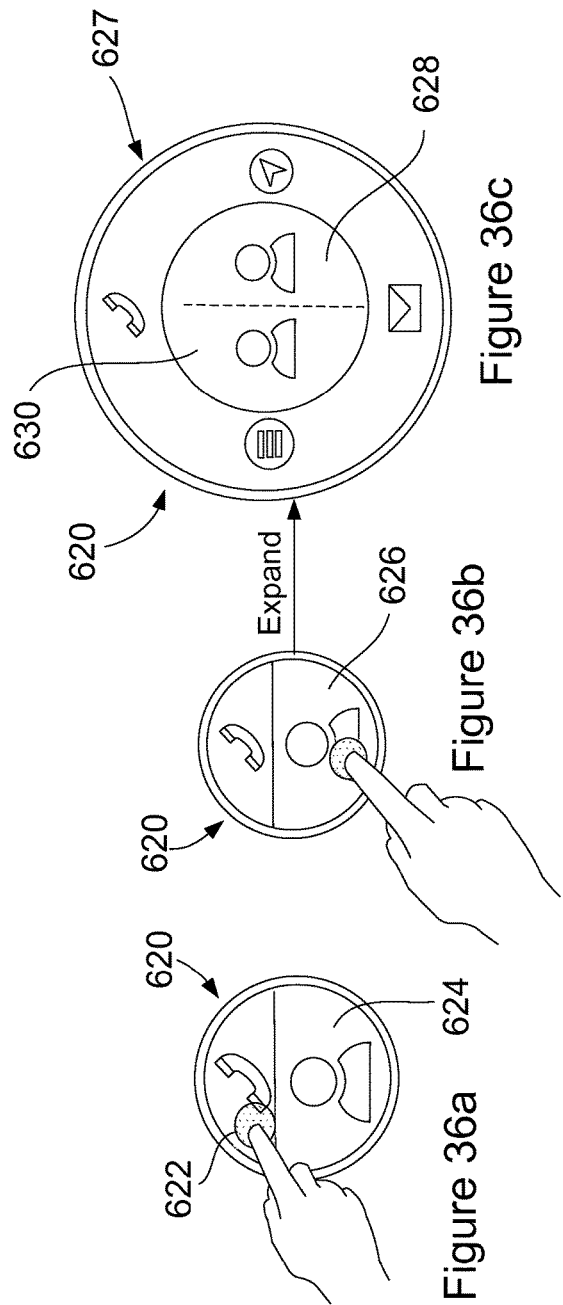

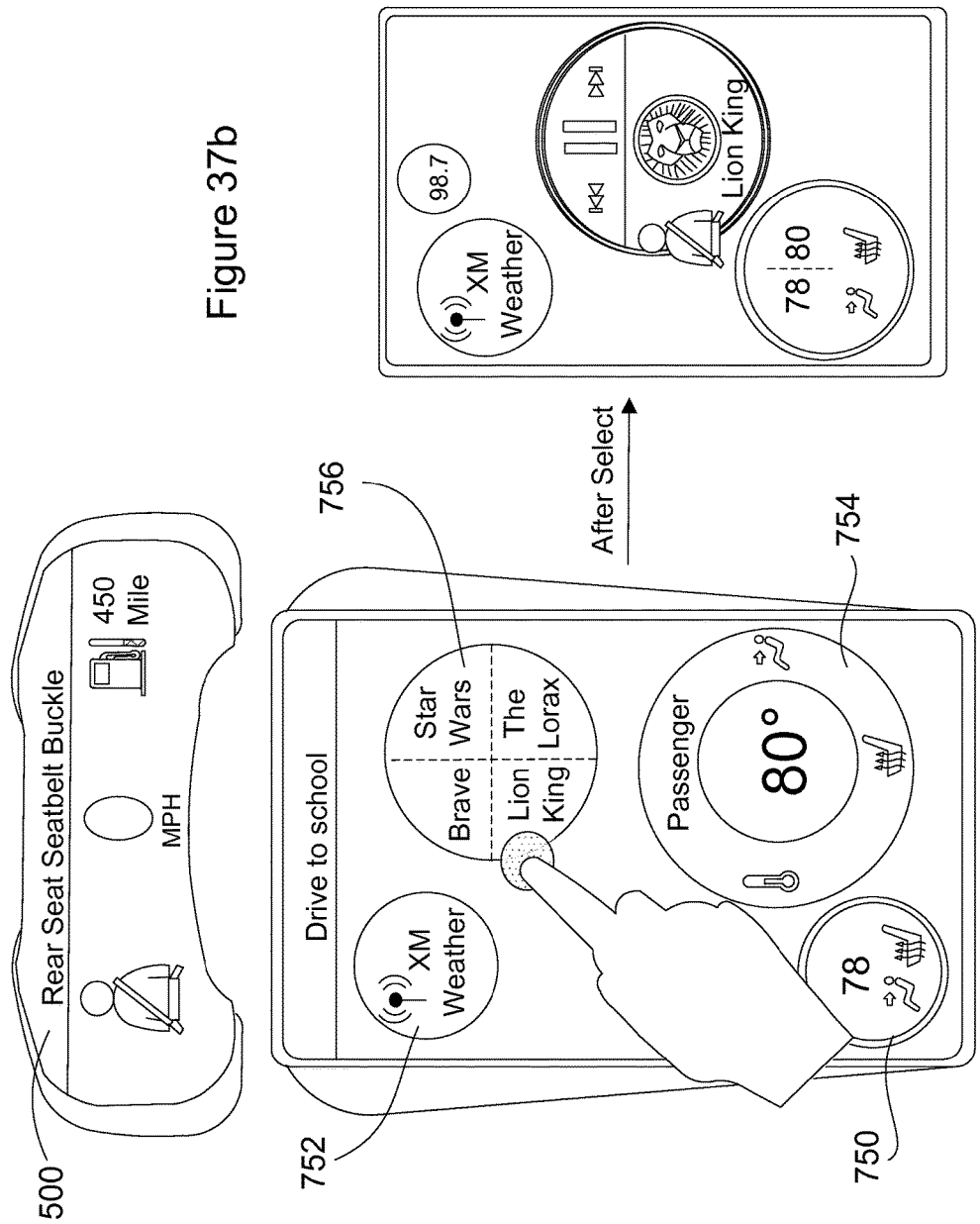

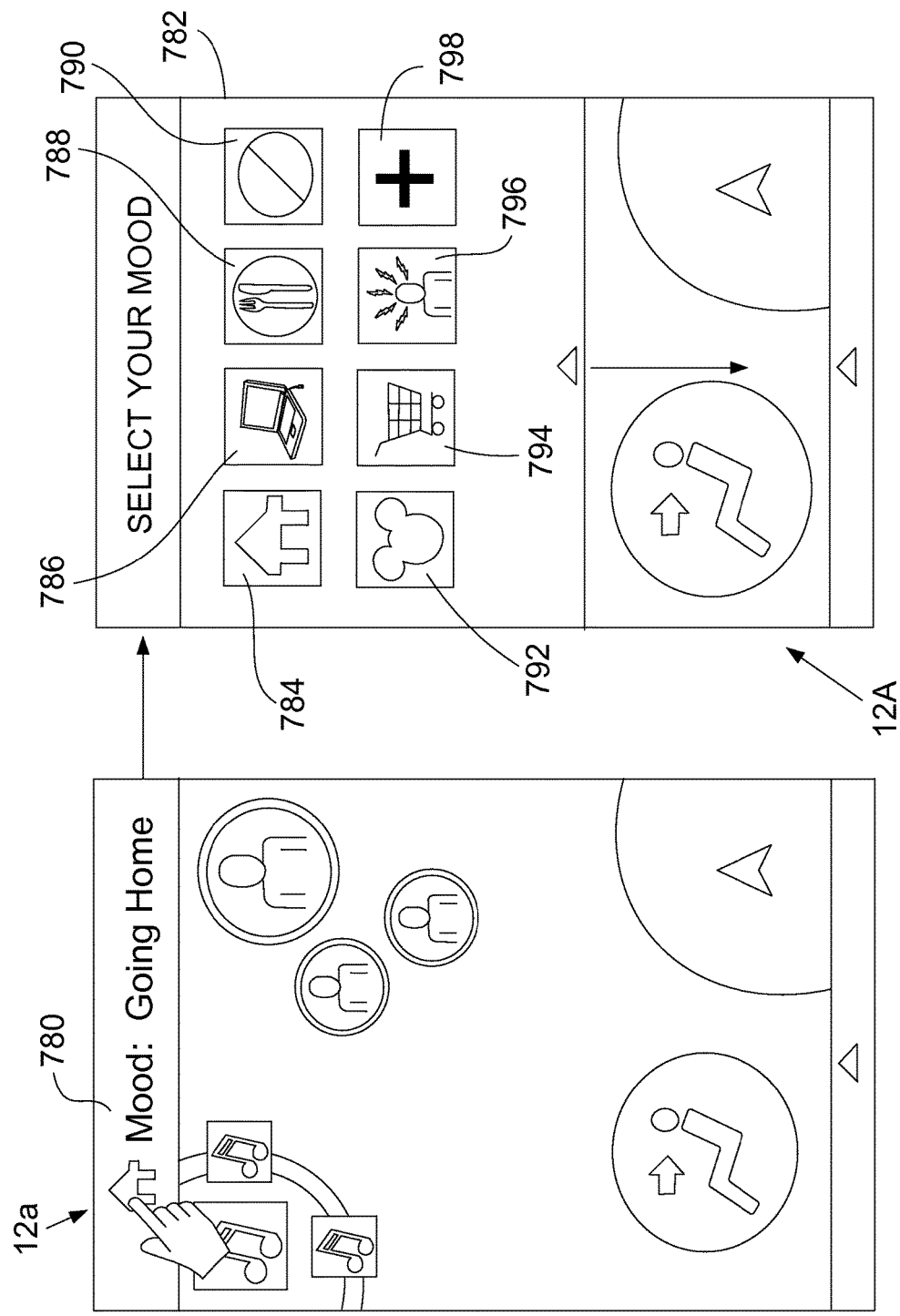

VEHICLE INFORMATION/ENTERTAINMENT MANAGEMENT SYSTEM

CROSS-REFERENCE TO RELATED APPLICATIONS

This application claims the benefit of U.S. Provisional Application No. 61/918,829, filed on Dec. 20, 2013. The entire disclosure of the above application is incorporated herein by reference.

FIELD

The present disclosure relates to systems for vehicle control, information management, entertainment and monitoring, and more particularly to a system and method that operates as a user interface and an information/entertainment management system to integrate a wide variety of on-board and off-board resources to assist a user in operating the vehicle, as well as to help the user and other passengers on-board the vehicle with accessing and making use of a wide variety of diverse information and media resources, which may help the user and the passengers to conduct and manage personal affairs and/or to enjoy entertainment resources while operating or travelling in the vehicle.

BACKGROUND

The statements in this section merely provide background information related to the present disclosure and may not constitute prior art.

With the growing amount of information and services that are available to individuals via cloud-based resources and via cellular links using smartphones, motor vehicle manufacturers are presented with a significant challenge as to how to make a wide variety of diverse information available to the user in a manner which is easy for the user to assimilate while operating a motor vehicle, and convenient for a user to access and control through an information/entertainment interface used on the vehicle. While various attempts have been made to provide an integrated user interface, such previously developed systems have not necessarily been highly intuitive for a user to learn to use. Such previously developed systems have either not been able to "learn", or have not been particularly effective at learning, habits of the user to enhance the user's experience with the vehicle's information and entertainment delivery capabilities.

Still further previously developed vehicle based information/entertainment systems have not been effective at providing the capability for a user to share important real time information that the user experiences while operating the vehicle, with other users who might benefit from knowledge of the same information while using their own vehicles. One example is enabling one user to immediately provide real time information on road hazards to other vehicle operators who may be in the vicinity. Still further, enabling the vehicle to automatically detect certain events, for example hitting a significant pothole or ice patch, and then to automatically provide real time information to other vehicle operators of the event, would help other vehicle operators prepare for, or avoid altogether, areas or obstacles that make vehicle operation more challenging.

Another limitation of previously developed on-board vehicle information/entertainment management systems is the inability to infer what information may be useful or needed by the user at a given time while the user is operating the vehicle. For example, it would helpful if a vehicle information management system was able to monitor a user's calendar and learned preferences and to infer, from one or more calendar entries, what route a user is likely to take to a given calendar appointment. This intelligence could be used by the system to then provide suggested restaurants, which are likely to be to the user's liking, along that specific route, as well as other useful information to the user, without prior prompting or request by the user. Another benefit would be the ability of the vehicle's information management system to infer the user's route and to use that information in real time to suggest to the user specific retail establishments where needed periodic maintenance (e.g., oil change, tire rotation, etc.) could be performed in accordance with suggested service intervals for the vehicle. And still another benefit would be the ability of the system to determine, from the user's calendar entries and real time weather and/or traffic information, as well as the distance to an appointment destination, whether the user will be able to arrive at the appointment destination by a set appointment time in the user's calendar, as well as whether a fuel fill up will be required for the vehicle to make it to an appointment destination. Present day vehicle information and/or interface systems are lacking in the ability to access and intelligently integrate information from various diverse resources, both on-board and off-board the vehicle, in real time, to provide these types of capabilities.

Still another limitation of previously developed vehicle information/interface systems is the limited ability for passengers present in the vehicle to share media content that the passenger brings onto the vehicle with other passengers on the vehicle or with the operator of the vehicle. For example, a passenger using a rear seat entertainment system on the vehicle may not necessarily be able to easily share media that is brought onto the vehicle with another passenger seated in the vehicle and/or with the driver. Still further, a user seated in one of the passenger seats may not be able to "push" information, such as media (e.g., music) or navigation maps, to the display associated with the vehicle's information/entertainment system.

SUMMARY

In one aspect the present disclosure relates to a motor vehicle information management system for use in a motor vehicle. The system comprises a radio system present in the vehicle and including a display system, and a remotely located processor-based inference engine. The remotely located processor-based inference engine automatically, wirelessly receives information inputs from the radio system in real time pertaining to at least one of a real time location of the vehicle and at least one of a destination of travel of the vehicle or a status of operation of the vehicle. The processor-based inference engine is configured to analyze the information inputs and to determine new information, in real time, that is useful to an operator of the vehicle, and to automatically transmit the new information wirelessly to the radio system for presentation to a user of the vehicle. The display system of the vehicle is configured to automatically display the new information to the operator of the vehicle.

In another aspect the present disclosure relates to an information management system for use in a motor vehicle. The system comprises a radio system, a touchscreen display system and a navigation system. The radio system has an associated processor and is located in the vehicle. The touchscreen display system is located in the vehicle and is accessible by the operator of the vehicle while operating the vehicle. The navigation system is operably associated with the vehicle for receiving real time navigation information and position information concerning a real time location of the vehicle while the operator is operating the vehicle. The system also includes a cloud-based portal containing information pertaining to other vehicle users. The cloud-based portal is wirelessly accessible by the radio system to enable information to be provided to the radio system in real time, as well as received from the radio system in real time and made available for use by the other vehicle users in real time. The system also includes a zoo system running on the processor of the radio system for enabling the operator to designate a select subgroup of individuals, using the touchscreen display, who are operating other vehicles which each have a radio system capable of communicating with the operator's radio system, and which are each in communication with the zoo system through the cloud-based portal. The zoo system enables the operator to push selected information in real time to radio systems associated with the select subgroup of individuals.

In still another aspect the present disclosure comprises a method for obtaining and managing information for use in a motor vehicle by a motor vehicle operator while operating the motor vehicle. The method comprises using a remotely located, processor-based inference engine for automatically, wirelessly receiving information inputs from a radio system in the vehicle, in real time. The information inputs pertain to at least one of a real time location of the vehicle and at least one of a destination of travel of the vehicle or a status of operation of the vehicle. The processor-based inference engine is used to analyze the information inputs and to determine new information, in real time, that is useful to an operator of the vehicle, and to automatically transmit the new information wirelessly to the radio system for presentation to a user of the vehicle. The display system of the vehicle is used to automatically display the new information to the operator of the vehicle.

In still another aspect the present disclosure relates to a method for controlling the display of touch controlled widgets on a touchscreen display system of a vehicle radio system, where the widgets provide information and control capabilities associated with the vehicle, based on anticipated needs or preferences of the vehicle operator. The method comprises displaying at least one touch controlled widget in a first dimension on the touch screen display system. A remotely located, processor based inference engine is used to detect a real time condition that is expected to be important to the vehicle operator. The inference engine provides information which is used by an intelligent resource display manager in communication with the radio system, to help modify a visual presentation of the at least one touch controlled widget on the touchscreen display system, and to automatically display another touch controlled widget on the touchscreen display system in a manner that signifies a higher priority than the at least one touch controlled widget.

BRIEF DESCRIPTION OF THE DRAWINGS

The drawings described herein are for illustration purposes only and are not intended to limit the scope of the present disclosure in any way.

FIG. 3 illustrates a menu screen that may be displayed for creating a new Zoo group;

FIG. 4 illustrates how a finger swipe may be used to designate a specific contact as a Zoo group member;

FIG. 5 illustrates a menu screen for selecting a specific Zoo group, along with the various functions that can be carried out for the selected Zoo group;

FIGS. 5A and 5B illustrate how a finger swipe may be used to enable information relating to music playing on the radio system of the user to be shared with a member of a Zoo group having only one member, or with the all the members of a selected Zoo group;

FIG. 6 illustrates a menu screen that may be displayed for enabling a single contact to be added to a Zoo group;

FIG. 7 illustrates a display showing how a real time location of a Zoo group member may be checked by the user;

FIG. 8 illustrates a menu screen which may be presented with the Zoo groups indicated by different icons, and which allows a user to select a specific Zoo group, whereupon the real time locations of the vehicles associated with those members of the selected Zoo group may be displayed on the user's display system;

FIG. 9 illustrates a screen for enabling the user to share his/her real time location with the members of a specific Zoo group by using a finger swipe;

FIG. 10 illustrates a screen showing the options that may be presented to the user pursuant to the making the finger swipe shown in FIG. 9;

FIG. 11 illustrates how a Zoo group member in a different vehicle that is also making use of the system may be notified of the selection made in FIG. 10;

FIG. 12 illustrates how a navigation application may be launched when the Zoo group member of the different vehicle "accepts" the follow request appearing on his/her display;

FIG. 13 illustrates a menu screen that provides the Zoo group member with various options, and in this example the Zoo group member has selected an email icon which prepares an email message to be sent to all the members of the Zoo group that the Zoo member and the user are a part of;

FIG. 15 illustrates how a user may tag his/her present location, or an establishment in close proximity to his/her present location;

FIG. 16 illustrates a screen popup that may be generated when to present various options to the user when the user is tagging his/her present location;

FIG. 20 is a high level flowchart illustrating operations that the system may perform in sharing an event/location which has been tagged by the user with other the systems of other individuals who are in communication with the user via one of the cloud-based portals;

FIG. 21 is a high level flowchart of operations that may be performed by the system in automatically generating a tag using information obtained by one or more of the vehicle's sensors, and then sharing that information with other members who are connected with the user through one or more of the cloud-based portals;

FIG. 23 is a high level flowchart illustrating how the system may determine that some real time action, such as a fuel fill up, may be required, based on real time monitoring of the fuel level of the vehicle, as well as the vehicle's progress along an inferred route and the distance remaining to a destination;

FIGS. 24A-24C represent a chart of various types of information that may be used in establishing a profile for the user;

FIG. 31 is an illustration of a circle widget for controlling a temperature of the vehicle's climate control system;

FIG. 32a shows the circle widget of FIG. 31 having been expanded by a user to show more control options;

FIG. 32b shows the circle widget of FIG. 32a having been expanded to show still further control options;

FIG. 34a-34g illustrate various controls that are brought up by a user by pressing on different portions of a circle widget;

FIGS. 35a-35d illustrate various controls that are brought up by the user by pressing different areas of a Navigation circle widget;

FIGS. 36a-36d show different controls that are brought up by the user by pressing different portions of a Contacts circle widget;

FIGS. 37a-37d illustrate examples of the Simple Mode being used to set various functions and controls of the vehicle while the vehicle is used throughout a given day;

FIGS. 38a-38d show illustrations of how different "moods" can be created and/or selected by the user using the system;

DETAILED DESCRIPTION

Figure 1:
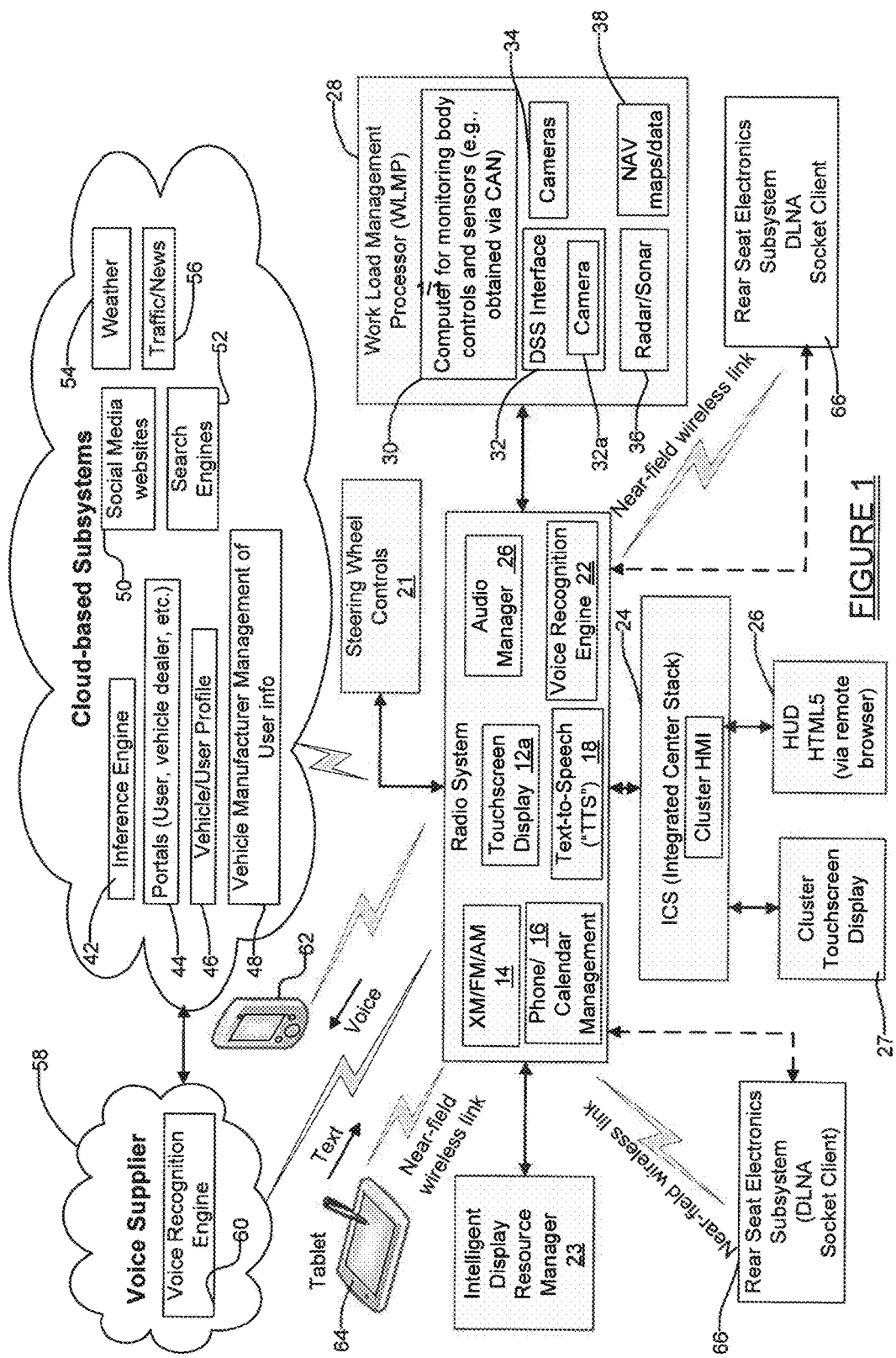
FIG. 1 is a high level block diagram of an information/entertainment system in accordance with example embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, there is shown an information/entertainment 10 in accordance with one embodiment of the present disclosure. The system 10 in this example forms a portion of a motor vehicle, for example a car, truck, SUV, minivan, crossover, etc. The system 10 includes a radio system 12, which in this example is an "Internet connected radio" with an embedded cellular chip. The radio system 12 has a touchscreen display 12a and a plurality of built-in components such as an XM/FM/AM radio subsystem 14, a phone/calendar management subsystem 16 which has access to the user's phone contacts and calendar on his/her smartphone or the remote site where such information is stored, a text-to-speech ("TTS") subsystem 18, an audio manager subsystem 20 for managing audio settings (bass, treble, balance, fade, etc.), and a voice recognition engine 22. The radio system 12 is in communication with an integrated center stack ("ICS") 24 that incorporates a cluster human/machine interface (cluster "HMI") 24a where the vehicle operator interfaces with the system 10. The ICS 24 is in communication with a heads up display ("HUD") 26 making use of a browser, for example an HTML5 browser, as well as a touchscreen cluster display 27 which is positioned on an instrument panel of the vehicle in front of the driver seat of the vehicle. The radio system 12 is also in communication with various steering wheel controls 21, where the user is able to make selections from the vehicle's steering wheel, as well as an intelligent display resource manager 23, which includes software running on a processor for assisting in determining how and when to display widgets on the touchscreen display 12a, as well as prioritizing the display of widgets and setting dimensions for widgets.

The radio system 12 is also in communication with a work load management processor ("WLMP") 28. The WLMP 28 includes a plurality of subsystems such as a computer 30 for monitoring body control sensors, wheel sensors, accelerometers, and other components associated with the chassis, engine and electrical system of the vehicle. A Decision Support System ("DSS") 32 having a camera 32*a* is included for monitoring the vehicle operator's eye movements and other physical movements of the operator to assist in providing related information to the WLMP 28. One or more additional cameras 34, for example a rearwardly aimed backup camera, is included to provide real time images and/or video to the computer 30 and/or the display 12*a* to assist with operation of the vehicle. A radar/sonar subsystem 36 is used to provide information regarding blind spot detection or other useful information to the computer 30. A navigation maps/data subsystem 38 is used to provide navigation information and/or data to the computer 30.

Figure 2:
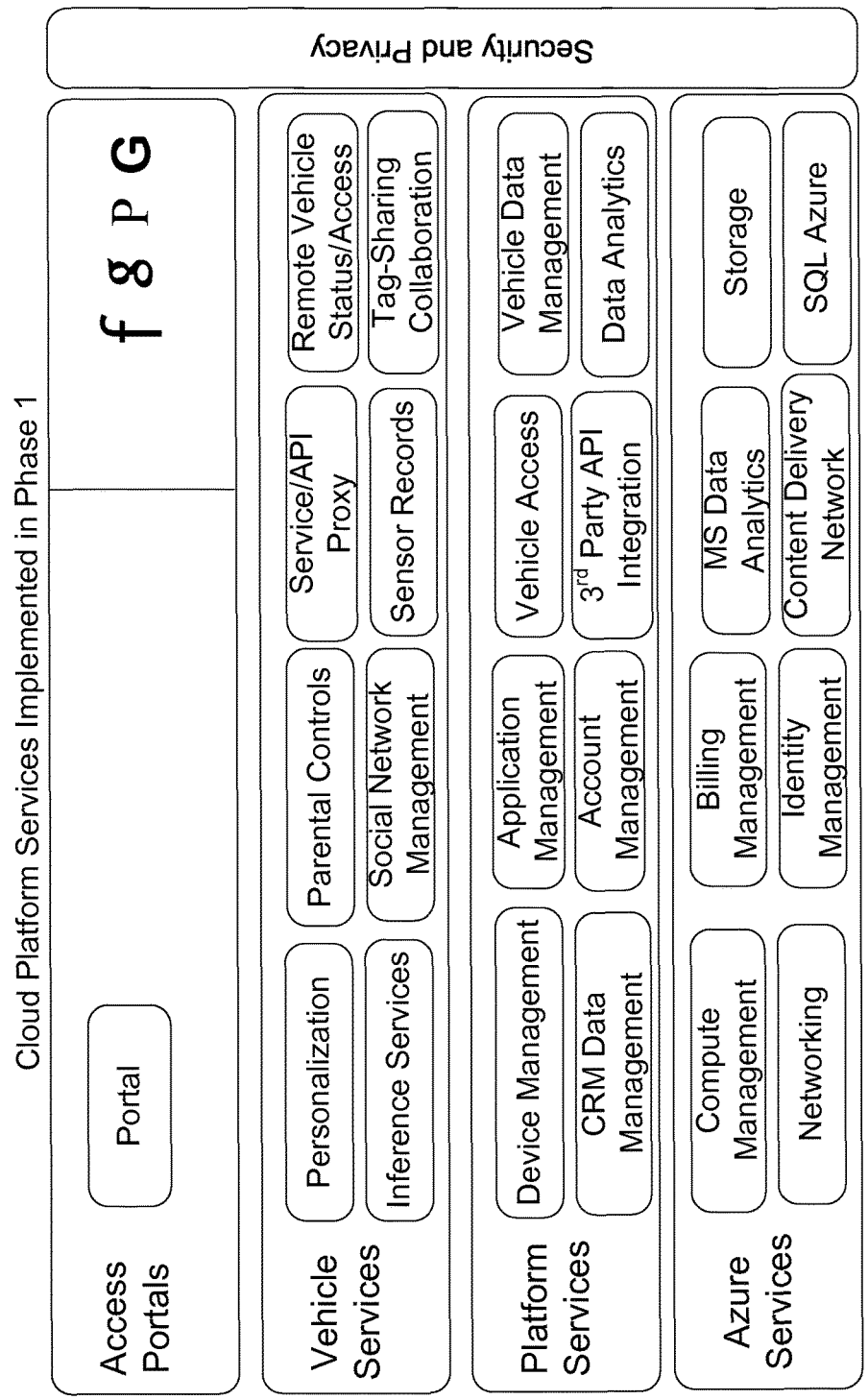
FIG. 2 is a diagram of specific cloud-based services that may be used in connection with the system of FIG. 1.

The radio system 12 is also in communication with a plurality of cloud-based services, collectively denoted by reference number 40, and shown in even greater detail in FIG. 2. The cloud-based services 40 include an inference engine 42, which is a software based system running on a suitable processor, for receiving information from the radio system 12 and determining what information to provide or suggest to the vehicle operator that may be useful to the vehicle operator. This feature will be described in greater detail in the following paragraphs.

The cloud-based services 40 also includes one or more portals (e.g., vehicle manufacturer's website), a portal 46 for a specific vehicle/user profile that may be established by the vehicle user (e.g., owner or leasee), a vehicle manufacturer "management" portal 48 for communicating information between the vehicle manufacturer and the user to help manage or maintain the user's vehicle and/or relationship with the vehicle manufacturer. The cloud-based services 44 includes one or more social media websites (FACEBOOK®, TWITTER®, etc.) 50, one or more Internet search engines (GOOGLE®, BING®, etc.) 52, real time weather services 54 and real time news/traffic services 56.

With further reference to FIG. 1, a cloud-based voice supplier service 58, which includes a voice recognition engine 60, is in communication with the radio system 12. The voice recognition engine 60 includes a processor that is running software (e.g., non-transitory, machine readable code) for performing speech-to-text translation. The radio system 12 is in communication with at least one smartphone 62, which typically is the vehicle operator's smartphone, as well as one or more other electronic devices such as a computing tablet 64. The smartphone 62 and the computing tablet 64 communicate with the radio system 12 via near field, low signal strength wireless links, for example BLUETOOTH® short range, wireless communications links. In addition, the vehicle incorporates one or more rear seat electronics (RSE) subsystems 66 which communicate with the radio system 12 either via a near field, short range wireless link or by a hard-wired connection. Each rear seat electronics subsystem includes a display (e.g., a touchscreen display) and suitable controls for enabling rear seat occupants of the vehicle to communicate with the radio system 12 and provide media or information to the radio system 12, or to use information or media provided from the radio system 12, or even for one rear seat occupant to transfer (e.g., "push") media files to the other rear seat occupant or to any other electronic device that is in communication with the system 12.

Referring now to FIGS. 3-5, the system 10 incorporates a plurality of information sharing features, one of which is termed for convenience a "Zoo" system 70. The Zoo system 70 may be thought of, without limitation, as a software system embodied in non-transitory machine readable code which runs on one or more processors associated with the radio system 12 and/or one or more cloud-based portals. The Zoo system 70 enables a user to define and create one or more groups of selected individuals whose vehicles also are able to communicate with the cloud-based services 40, such as via a system which is similar or identical to the radio system 12. FIG. 3 shows one user interface ("UI") screen 72 presented by the Zoo system 70 which is displayed on the touchscreen display 12*a* of the radio system 12. The UI screen 72 displays a plurality of controls such as "Play/Stop" 74, skip to previous track 76, skip to next track 78 and "Pause" 80 that may be used to control the playback of music or other audio content. Control 82 allows the user to select between satellite radio (if one such provider has been subscribed to), FM or AM signal sources. "Option" control 84 provides options relating to the playback or music or other audio content and "Browse" control 86 enables a user to browse content that is available to be played.

With further reference to FIG. 3, the "Apps" tab 88 allows the user to select from one or more applications that are running on the radio system 12 or available to the user from the radio 12 system (e.g., news/traffic, FACEBOOK®, etc.). A "Favorites" tab 90 allows the user to pull up one or more different compiled lists of individuals that have been denoted in one or more Favorites folders. Different Favorites folders could be created, for example, for co-workers, family of the user, and so forth. A "People" tab 92 allows brings up different folders of individuals. When the "People" tab is selected, the user is presented with a tab 94 for "Favorites", a tab 96 for "Contacts" and a tab 98 for "Zoo's". In FIG. 2 the "Zoo" tab 98 has been selected and icons 100 display the different Zoo groups that the user has created. It will be appreciated that each Zoo group is a group of one or more individuals which the user may desire to "push" information to, or receive information from, and will be described more fully in the following paragraphs.

FIG. 4 illustrates how a user creates a Zoo group. By touching one of the "+" icons on the display menu 72 of FIG. 3, specific files for each of the contacts on the user's cellular phone, or contacts otherwise available from a cloud-based resource or memory within the radio system 12, are displayed via screen 102 in FIG. 4. From here the user uses a finger to drag and drop specific contacts 104 into a previously created Zoo group or a new Zoo group. If a new Zoo group is being created, then a field 106 is displayed which the user touches to pull up a keyboard (not shown) by which to enter a name for the new Zoo group. Touching a "Save" tab 108 saves a new Zoo group. A slider control 110 enables a user to scroll rapidly through her/his Contacts folder.

Referring to FIG. 5, when a specific one of the icons 100 is pressed to indicate the selection of a specific Zoo group, a menu screen 112 is displayed for various functions that can be carried out for the selected Zoo group. The name of the Zoo group is displayed at field 114, along with an icon 116 for placing a call to the Zoo group (assuming only a single member comprises the selected Zoo group), an icon 118 for sending an email to each member of the selected Zoo group, and an icon 120 for selecting a navigation function for the selected Zoo group. Tab 122 for "edit Zoo" takes the user to a different screen where members of the selected Zoo group can be modified (i.e., some members deleted and/or other individuals added to the group). Tab 124 for "my location"

allows the real time location of the user's vehicle to be presented on the display screen of the vehicles of all the other members of the selected Zoo group who happen to be in their own vehicles at that time. This is accomplished by "pushing" the real time location of the owner's vehicle to one or more portals 44 and/or 48 of FIG. 1, with which the other members of the selected Zoo group are able to communicate with. A "my music" tab 126 allows the user to push music that is playing on his/her radio system 12 up through one or more of the cloud-based portals 44, 48 to the other members of the selected Zoo group. A "follow me" tab 128 allows a real time track of the user's vehicle to be pushed through one or more portals 44, 48 of the cloud-based services 40 to the display systems in the vehicles of the other members of the selected Zoo group. In this manner the members of the selected Zoo group are able to view, in real time, the path that the user's vehicle is taking on their own navigation display systems. As will be appreciated, this is an extremely powerful feature as it allows other members to watch the real time travel of the user's vehicle on their own navigation display system, which allows them to follow the user to a desired destination. This feature also allows a member of the selected Zoo group to provide input to the vehicle user and help direct the vehicle user to a desired location, assuming that the vehicle user is unsure as to the exact location of his/her desired destination. Thus, for example, a friend of the user, travelling in a different vehicle from the user, who knows the way out of a downtown urban area may watch the user's path of travel and guide the user, for example by phone, as to when to make certain turns or which exits to take to reach a desired freeway entrance, or to reach some other destination that the user is unfamiliar with, but which the friend knows how to reach.

With further reference to FIG. 5, a "my destination" tab 130 allows a navigation path of the user to a desired destination to be pushed, via the portal services 44 and/or 48, in real time to the navigation display systems in the vehicles of the other members of the selected Zoo group. As such, the other members of the selected Zoo group can monitor the travel of the user. If something should happen to the user or his/her vehicle, the other members of the Zoo group would immediately recognize if movement of the user's vehicle stops on the way to the destination for an unusual length of time, or if the user's vehicle inexplicably departs from the projected route to the destination. This feature thus also forms a highly important and useful function that allows other individuals, for example family members, to track in real time the path of travel of the vehicle user to ensure that the user reaches his/her destination without any problems. A "my tags" tab 132 enables a user to push "tags" that he has entered for locations (e.g., stores, restaurants, road hazards such as potholes, etc.) to other ones of the selected Zoo group members so that the tags are presented on the display systems of the other Zoo group members. This feature will also be discussed in greater detail in the following paragraphs.

FIGS. 5A and 5B illustrate how a finger swipe is used to enable information relating to a song playing on the radio 12 of the system 10 of the user to be shared with a single member of a selected Zoo group (FIG. 5A), or with a Zoo group having a plurality of members (FIG. 5B).

Figure 5D:
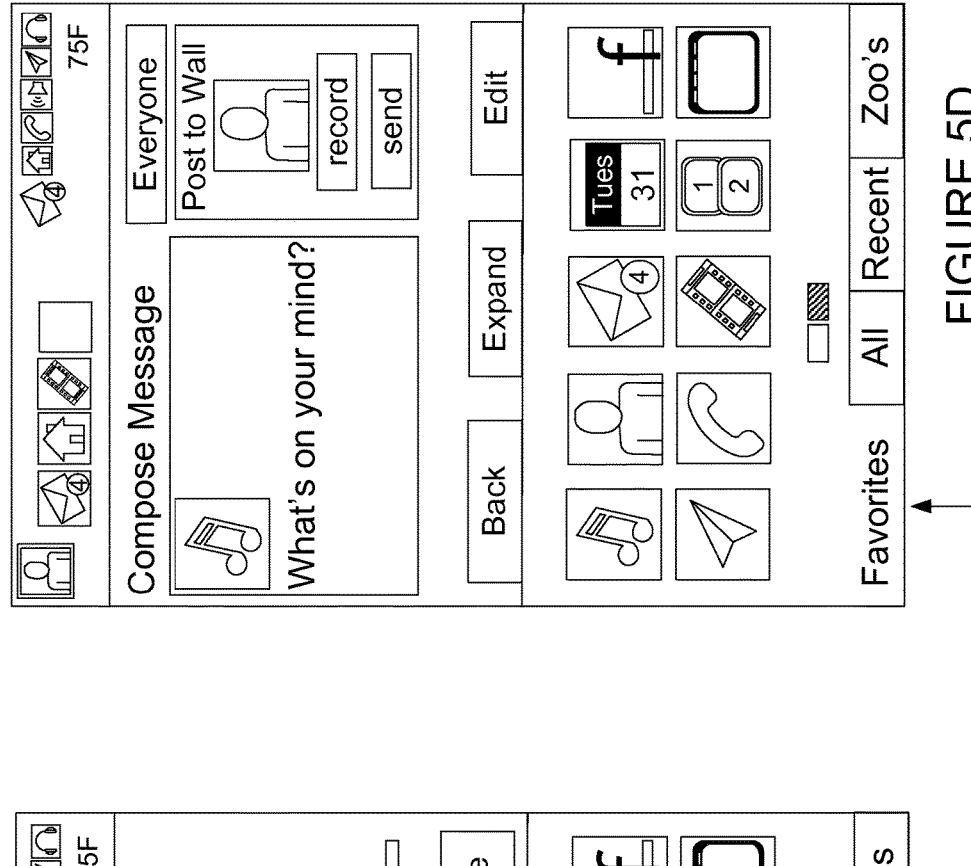
FIGS. 5C and 5D illustrate how information relating to music playing on the user's radio system may be shared with the user's social media account.
Figure 5C:
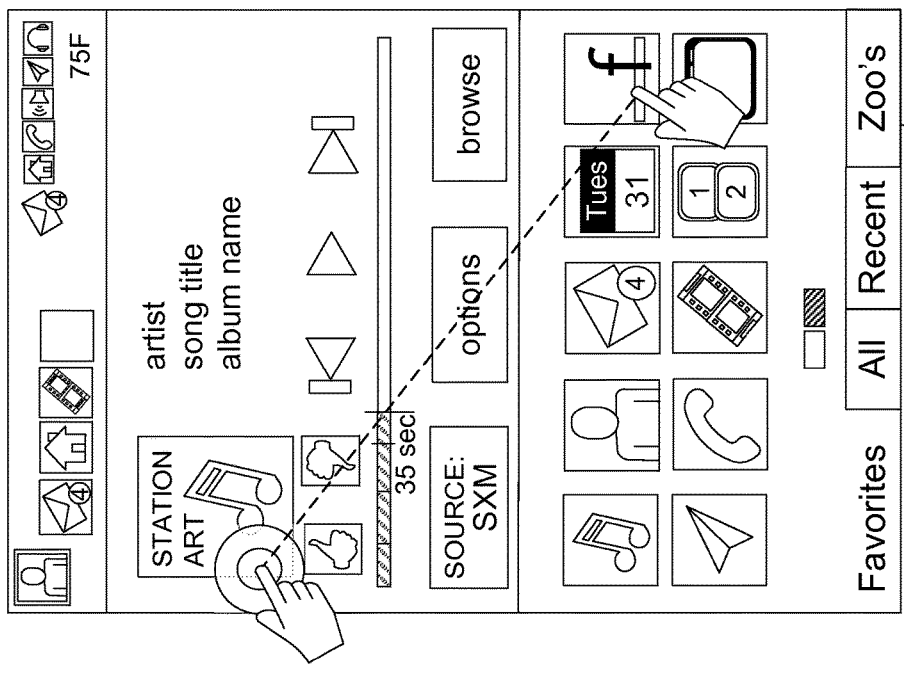

FIGS. 5C and 5D illustrate how information relating to a song playing on the radio 12 of the system 10 of the user is shared to a specific application, in this example a social media application that the system 10 has access to via the social media portal 50 (FIG. 1). FIG. 5D shows a screen 133 where a user is able to record a voice message, by selecting the "record" icon 133a, that may be pushed up to the user's social media account when the "send" icon 133b is selected.

Figure 5F:
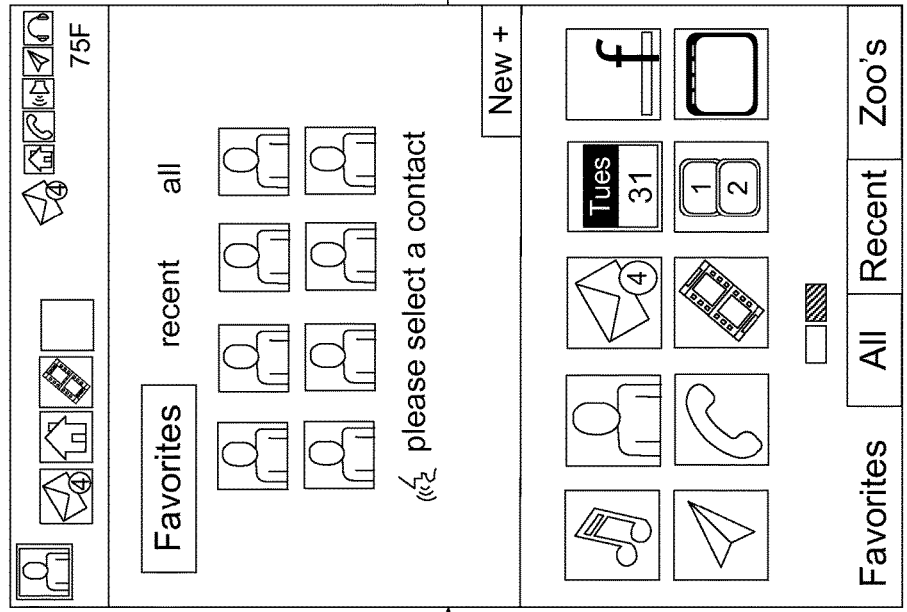
FIGS. 5E-5G illustrate how a link to a music file may be shared to a specific contact.
Figure 5E:
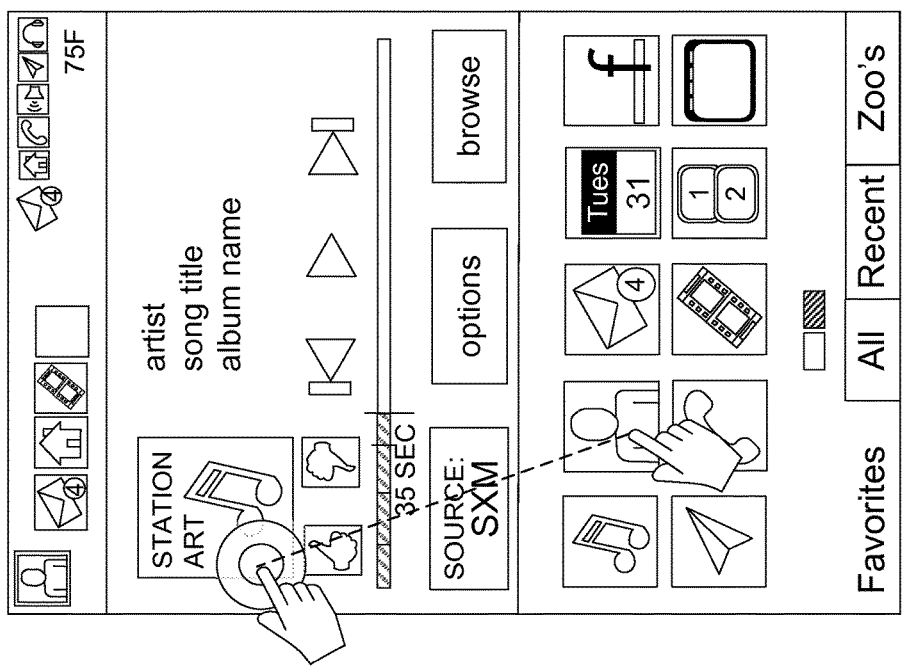
Figure 5G:
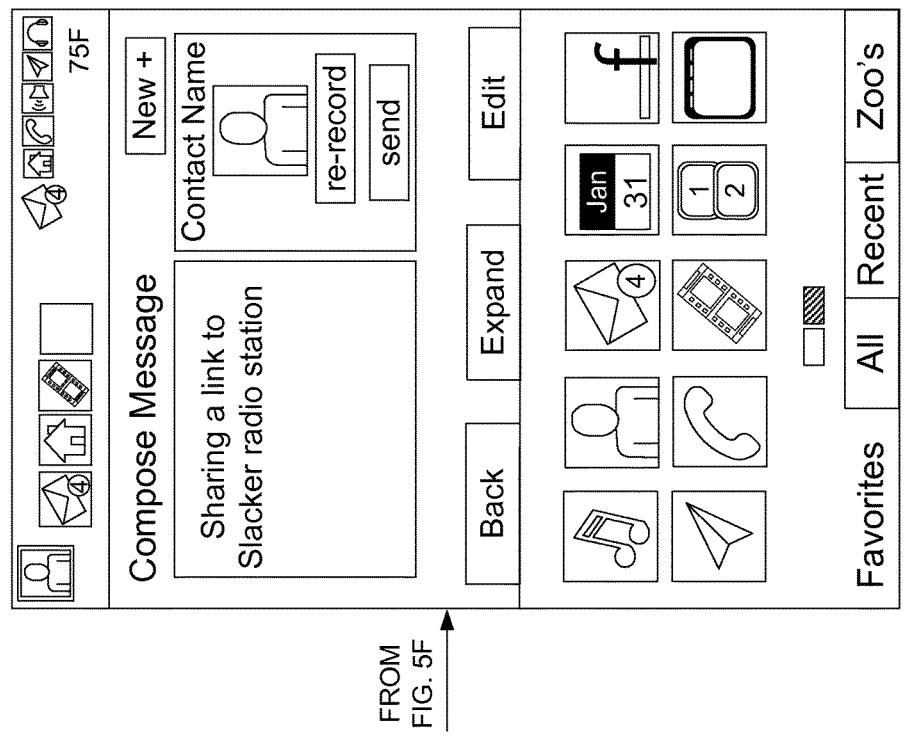

FIGS. 5E-5G illustrate how information relating to a song being played on the user's radio system 12 is shared to a specific contact with a finger swipe (FIG. 5E), which pulls up the user's "contact" folder (FIG. 5F). FIG. 5G allows a message to be created and sent in the same manner as discussed for the screen of FIG. 5D.

With reference to FIG. 6, the system 10 also enables a real time location of a specific individual to be acquired by the user. If the user selects an icon of a single individual from his/her contacts folder, from the menu screen 112 of FIG. 5, then menu screen 134 is presented on the display of the radio system 12. By pressing a "find location" tab 136, the real time location of the selected contact is presented on the display 12a of the radio system 12, as shown on the screen in FIG. 7. This is assuming, of course, that the selected contact is in his/her vehicle and in communication with the cloud-based services 44 and/or 48. In FIG. 6, if the user selects a "start zoo" tab 137, then menu screen 102 shown in FIG. 4 is presented to the user. The user can also choose to share his/her real time location with the selected contact by pressing the "my location" tab 138 in FIG. 6. Pressing the "my destination" tab 140 shares a destination and planned route of travel with the selected contact. Selecting a "my tags" tab 142 allows tags to be pushed to the display on the selected contact's display system, and selecting the "my music" tab 144 allows music that is playing in the user's vehicle to be pushed to the contact's radio system in real time.

Referring to FIG. 8, if a map application is open and running on the radio system display 12a, a menu screen 146 is presented with the Zoo groups indicated by icons 148. When a user selects a specific Zoo group, the real time locations of the vehicles associated with those members of the selected Zoo group are displayed on the display system 12a. Selecting a "poi's" tab 150 allows any points of interest that were previously created by the user to be displayed along with the locations of the members of the selected Zoo group. A "destination" tab 152 allows the user to select a destination.

Referring to FIGS. 9 and 10, a real time location of the user can also be dragged and dropped to a selected Zoo group. In FIG. 9, the user places a finger on directional arrow 154 while a map showing his real time location with arrow 154 is being displayed. By dragging the arrow 154 to one of the displayed Zoo icons 148, the system 10 generates a pop-up menu 158, shown in FIG. 10. The user's real time location will be pushed, via one or more of the portals 44 or 48, to the selected Zoo member or group, as soon as the user hits a "send" tab 160. If the user wishes to create a message that the selected Zoo member or group will receive, then tab 162 is selected and the user may then be prompted to enter a text or voice message (not shown). The menu screen 158 provides a field 164 that shows the user's real time location. Nearby retail establishments such as gas stations, restaurants, retail stores, etc., may be presented as well to the Zoo member or group when the user's location is received by the Zoo member or group.

Figures 12, 13:
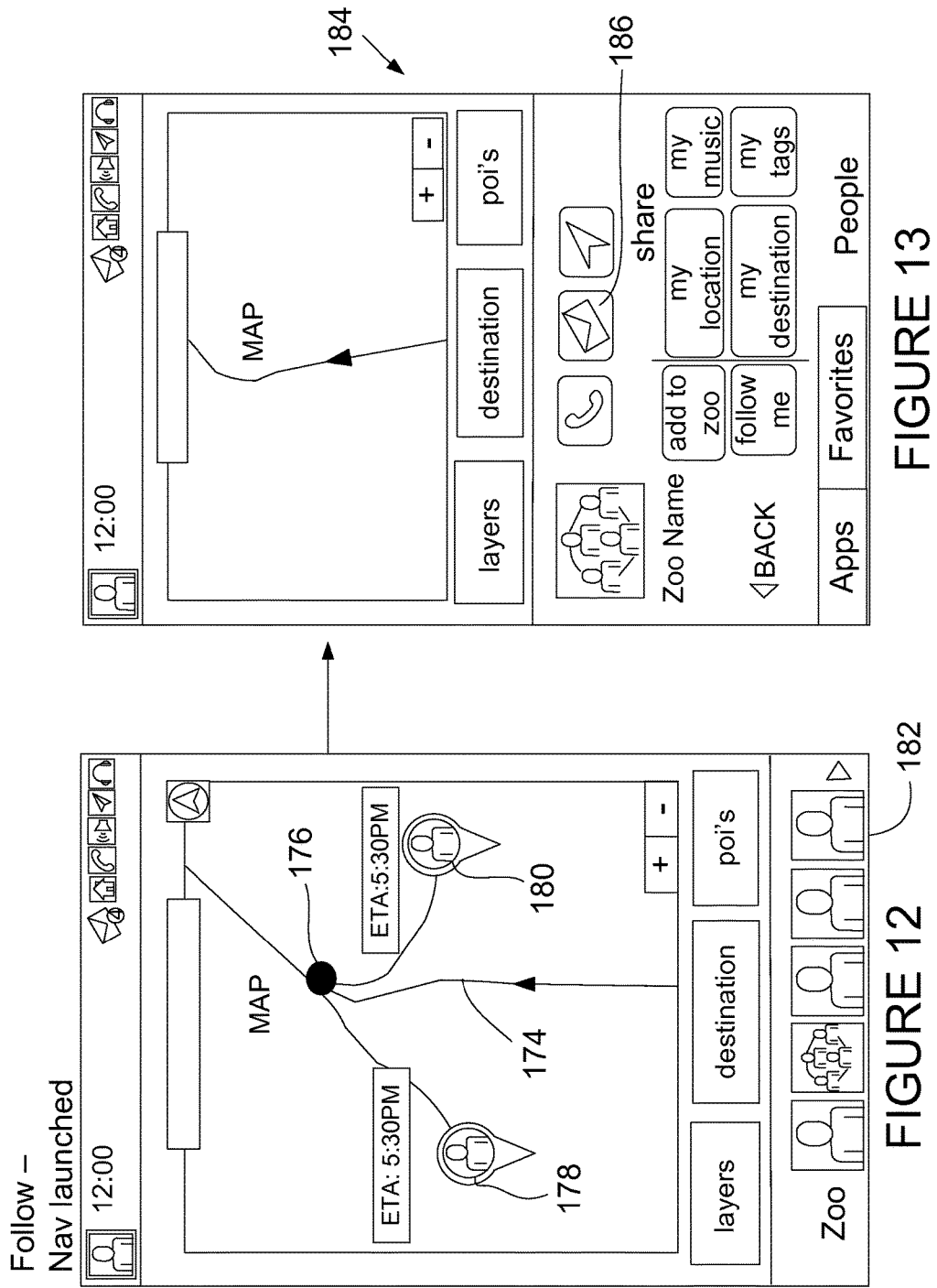

FIGS. 11-13 illustrate one example of how pushed location information from the user selected at FIG. 10 is presented to a Zoo group member. If the Zoo group member's vehicle has the system 10 installed therein, then its radio system 12 presents, on the touchscreen display 12a, an icon 166 indicating that the user has supplied a real time location to the Zoo member, as shown in FIG. 11. The Zoo member then selects a "follow" tab 168, by which the navigation system of the Zoo member's vehicle begins displaying the route that the user is presently following, as shown in FIG. 12. The route is marked by reference numeral 174. The Zoo member may instead select a "view" tab 170 by which the user's present location is displayed on the display 12*a* of the Zoo member's radio system 12. Alternatively the Zoo member may select a "dismiss" tab 172 which will dismiss the icon 166 from the Zoo member's display 12*a*.

With further reference to FIG. 12, if the "follow" tab 168 has been selected by the Zoo member, then on his/her display 12*a* the user's route is displayed, as indicated by reference numeral 174. A point where the Zoo member and other Zoo members of the Zoo group will reach the user's route is marked by the solid circle 176 in this example. The approximate location and estimated time of arrival at the destination for each Zoo members are indicated by icons 178 and 180.

Figure 14:
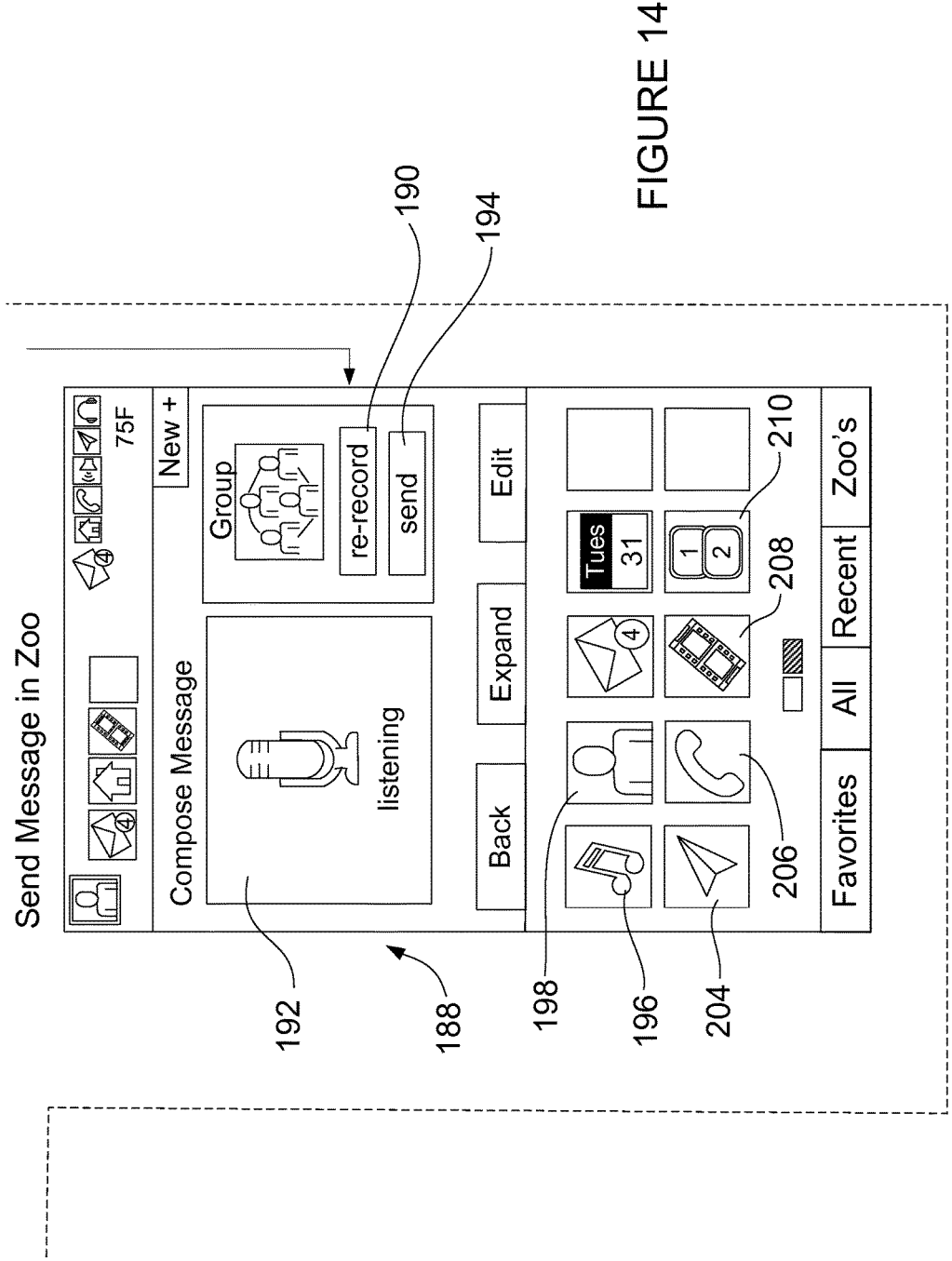
FIG. 14 illustrates a screen menu that may be presented to the user in the different vehicle by which the Zoo group member may begin composing an email message using the voice recognition engine shown of the system shown in FIG. 1.

FIG. 13 shows a menu screen 184 that is presented on the Zoo member's display 12*a* if the zoo member selects the icon 182 in FIG. 12, for the Zoo group that the user is part of. The menu screen 184 in FIG. 13 that is presented provides the Zoo member with various options, and in this example the Zoo member has selected an email icon 186 which prepares an email message to be sent to all the members of the Zoo group that the Zoo member and the user are a part of. FIG. 14 shows a menu screen 188 that is presented to the Zoo member by which the Zoo member may begin composing an email message using the voice recognition engine 22 shown in FIG. 1. A "re-record" tab 190 enables the Zoo member to record over a previously spoken message if changes are needed to the previously spoken message. The spoken message is presented in text in display area 192 after it is converted by the voice recognition engine 22 (FIG. 1). If the Zoo member is satisfied with the message, then he/she presses the "send" tab 194. Tabs 196-210 enable the Zoo member to select either a music folder, a contacts folder, an email application, a calendar application, a navigation application, an initiate phone call function, a pictures folder and a dual display screen function, respectively.

Manual Tagging and Sharing of Location

Figure 17:
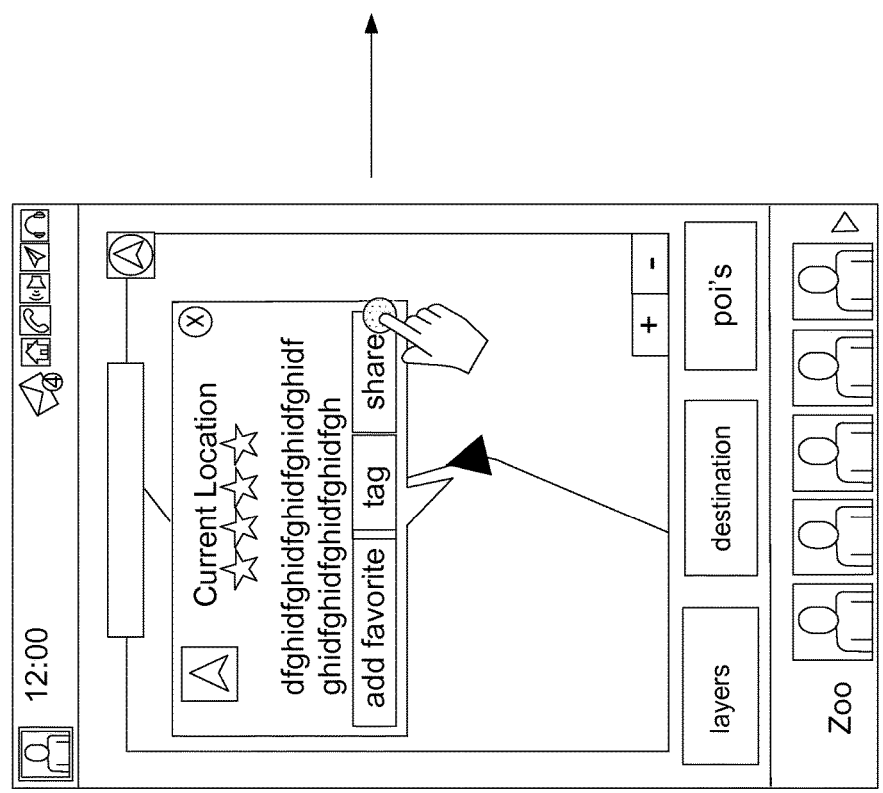
FIG. 17 illustrates a "share" tab of a screen that allows the user to share his real time location with other users who are accessing one or more of the portals shown in FIG. 1.
Figure 18:
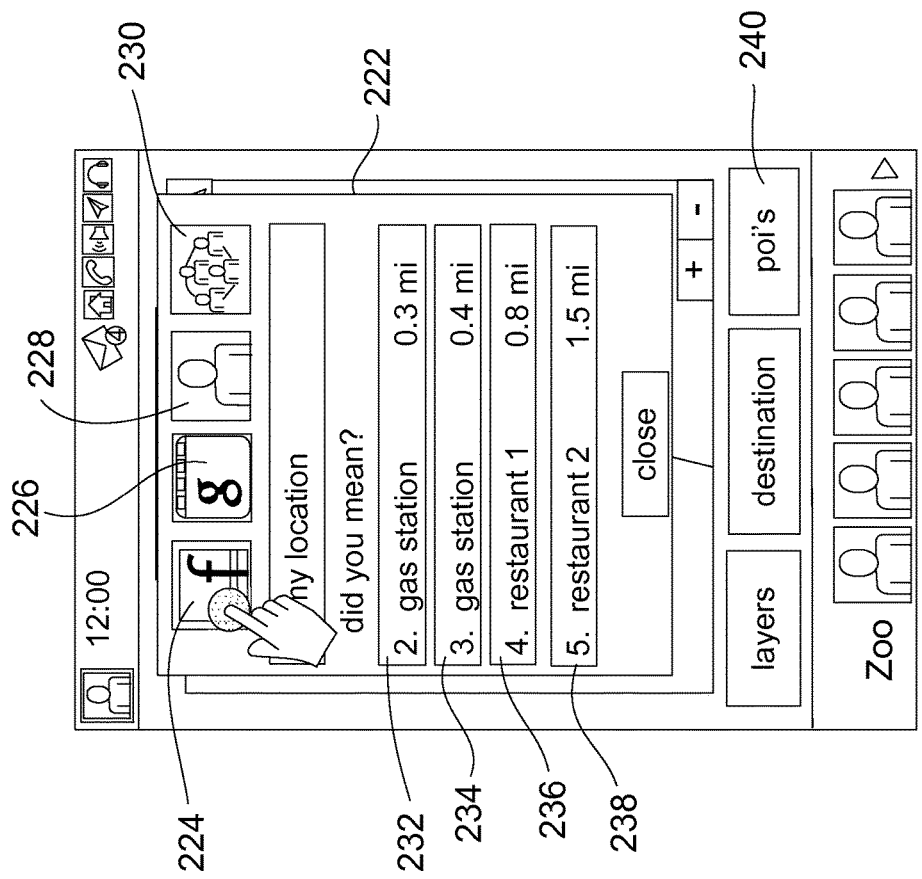
FIG. 18 illustrates a screen that may be generated pursuant to the selection made from the screen in FIG. 17, to enable the user to upload/update his/her real time location to a specific application.
Figure 19:
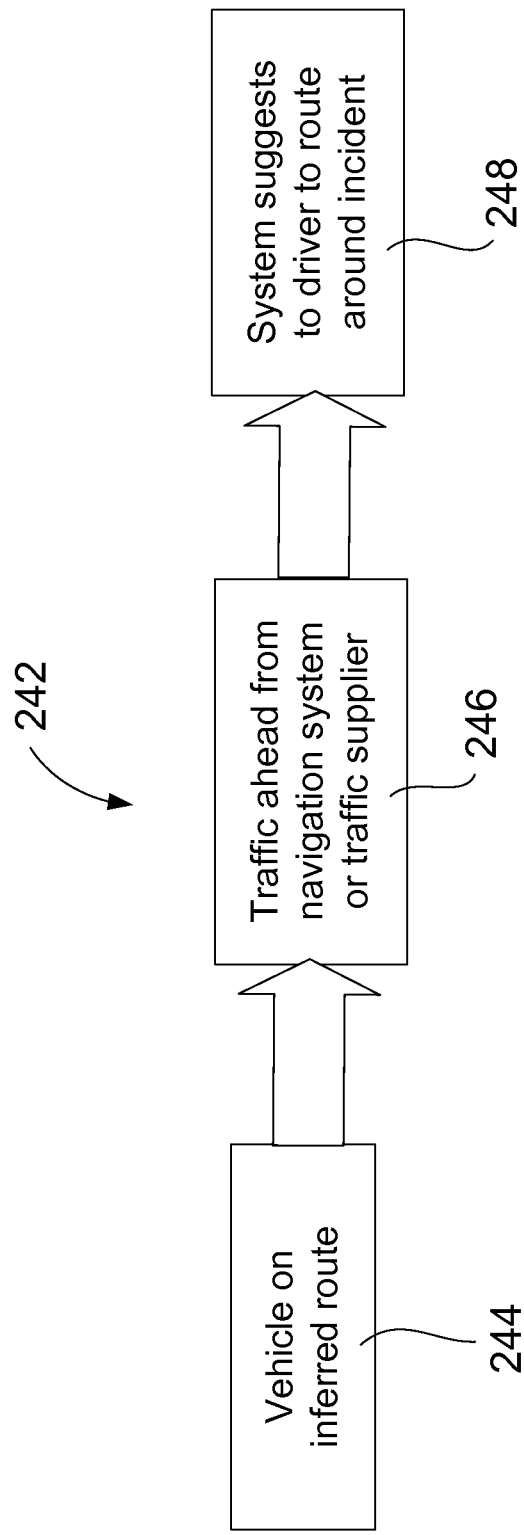
FIG. 19 is a high level flowchart illustrating operations that the system may perform in making a travel detour suggestion away from an inferred route of travel using real time traffic information obtained via one or more of the cloud-based portals.

Referring to FIG. 15, the user is able to "tag" a specific location while the system 10 is running the navigation application 38 and displaying the real time location of the user's vehicle. The user presses a location arrow 212 as indicated in FIG. 15 and the system 10 displays a pop-up screen 214 shown in FIG. 16. The pop-up 214 presents the user with the options to add the present location to a Favorites folder by pressing an "add favorite" tab 216, or to tag the location by pressing a "tag" tab 218, or to share the user's present location with one or more other individuals by pressing a "share" tab 220. Pressing the "tag" tab 218 stores the user's real time location in one or more of the portals 44, 48. Pressing the "share" tab 220 of the screen shown in FIG. 17 brings up a menu screen 222 shown in FIG. 18, by which the selects to share his/her real time location with at least one social media site, indicated by selecting tab 224, or with an Internet search engine, indicated by tab 226, or with a contact, indicated by tab 228, or with a Zoo group, indicated by tab 230. The inference engine 42 (FIG. 1) also is able to suggest various retail establishments that are close to the user's location as specific locations that the user may have intended to tag or share, as indicated by tabs 232-238. Pressing any one of tabs 232-238 causes the location of its associated establishment to be shared. The user also has the option of selecting a "poi" tab 240, which causes one or more of the cloud-based portals 44, 48, to retrieve the points of interest (e.g., gas stations, restaurants, department stores, etc.) that are in a vicinity of the user's location, and display those points of interest for the user.

Situational Awareness and Inferring Travel Routes of User

Referring to FIGS. 19-22, a useful feature of the system 10—the ability to infer when and under what circumstances specific types of information may be useful to the user—will be described. This capability makes use of various combinations of information available from the collection of cloud-based subsystems 40 and/or the WLMP 28, and does so in real time to provide the inferred information to the user when the user is likely to be in need of it. This enables the system 10 to maintain a "situational awareness" of the conditions affecting the travel of the user along the inferred route. Referring to the flowchart 242 of FIG. 19, the inference engine 42 infers a specific route that the user is currently on, as indicated at operation 244. The inference engine 42 does this by analyzing calendar entries of the user's calendar, noting the time of day, the day of the week and/or month, and analyzing a history of past trips that the user has taken, and possibly together with still further information. The user is presented with an option to "validate" the inferred route which, if selected, confirms to the system 10 that the inferred route is the actual route that the user is following. The inference engine 42 uses this information to infer a route that the user is travelling. The inference engine 42 also receives information from the weather portal 54, the traffic/news portal 56 or other portals to determine if a traffic disruption is present at some point along the inferred route, as indicated at operation 246. When the inference engine 42 determines that a traffic obstruction is ahead on the inferred route, and after considering other information such as a calendar appointment of the user, the inference engine 42 suggests an alternative route to the driver to route the driver around traffic obstruction, as indicated at operation 248. Optionally, the inference engine 42 may display a message on the display 12*a* informing the user that it is likely that the user will not be able to make it to an upcoming calendar appointment that the user is travelling to, and the inference engine 42 gives the user the option, through a suitable prompt on the display 12*a*, whether or not to accept an alternative route that the inference engine is recommending.

The inference engine 42 also uses real time information obtained from one or more portals 44, 48 to determine that an accident has occurred ahead on the inferred route, or that a significant road obstruction (pothole, missing manhole cover, vehicle accident, down power wire, flooding, ice, etc.) is present on the inferred route. The inference engine 42 is able to use one or more such items of information in determining the alternative route to recommend to the user.

FIG. 20 illustrates a flowchart 250 that shows how the system 10 enables the vehicle user to share important traffic or road condition information with other users of the system 10 that are linked to one another via the cloud-based ports 40. At operation 252 the user encounters a traffic concern, for example a road obstruction (e.g., accident with a vehicle blocking a lane of traffic) that creates a potentially hazardous traffic condition for other users that may be approaching the location of the obstruction. At operation 254 the user presses the "navigation icon" on the display 12*a* and then the "tag" tab 218 in FIG. 16. The system 10 records the location and presents a screen for the user to enter (such as by spoken words) a name for the event or condition that will be associated with the tab. Alternatively the system 10 presents a menu of choices (e.g., "pothole", "accident", "ice", etc.) that the user selects from to associate with the tag. At operations 256 and 258, the system 10 then pushes this information to one or more of the cloud-based portals on web service 40 where it may be shared with other users whose systems 10 are accessing the cloud-based portals.

As illustrated in FIG. 21, another feature of the system 10 is the ability to automatically create a real time tag for a road hazard condition that one or more sensors of the vehicle detects. In the flowchart 259 of FIG. 21, at operation 260 the computer system 30 receives a signal from a sensor of the vehicle that the vehicle has just hit a significant pothole. The sensor detects an immediate loss of tire pressure. The computer 30 automatically generates a tag, in real time, as indicated at operation 262, to record the location of the event, and from the sensor information infers that the vehicle struck a significant pothole. The system 10 pushes this information up to the cloud-based portals of web based services 40 where it is accessed by the systems 10 of other users communicating with the portals, as indicated at operations 264 and 266.

Figure 22:
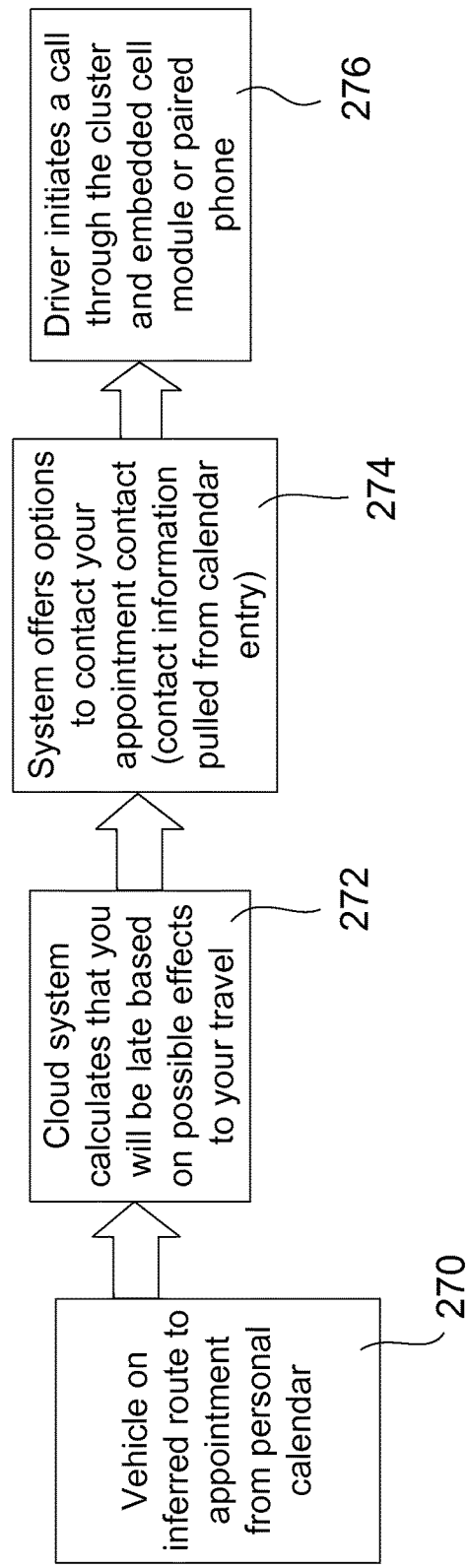
FIG. 22 is a high level flowchart of operations that may be performed by the system in making a real time determination, based on information available to the system from one or more sensors or gauges of the vehicle, that the user will not be able to make an appointment that the user is travelling to, and automatically offering the user one or more options as to how to contact the appointment contact to notify the contact of a delayed arrival of the user.

FIG. 22 illustrates another significant capability of the interference engine 42, that being inferring when the user is unlikely to make an appointment that the user is travelling to. Flowchart 268 of FIG. 22 describes how the user may be travelling on an inferred route to an appointment on the user's personal calendar. The inference engine 42 infers that the user is travelling to an appointment by accessing the phone/calendar management system 16 to monitor the user's appointments, and then from the appointment information (e.g., time, location, etc.), and the user's real time location, determining that the user is in route to a specific appointment, as indicated at operation 270. At operation 272, based on a diverse set of information including, but not necessarily limited to, the obtained calendar information, traffic/weather information and any road obstructions, speed limits over the inferred route of travel, and possibly other variables, the inference engine 42 calculates that the user will be late to his/her destination for the appointment. At operation 274 the inference engine 42 generates options that are displayed on the display 12a for the user to contact his/her appointment contact, which information is obtained by the system 10 from the phone/calendar management subsystem 16. At operation 276 the user initiates a call to his/her appointment contact through the phone/calendar management subsystem and his/her smartphone, to notify the contact of the user's anticipated delay in making the appointment.

FIG. 23 is a high level flowchart 300 which illustrates how the inference engine 42 communicates with the on-board computer 30 of the vehicle, and particularly with various sensors (e.g., fuel level, engine temperature, tire pressure, etc.) to supply suggestions to the user which aid the user in making travel decisions. At operation 302 the inference engine 42 determines that the user's vehicle is travelling to a specific destination, based on calendar information, the real time location of the vehicle and/or other forms of information. At operation 304 the computer 30 of the vehicle will be providing real time information to the inference engine 42 as to fuel level, engine temperature, speed of travel, or any other important variable that may affect operation of the vehicle. At operation 306 the inference engine 42 calculates that the fuel remaining in the vehicle's fuel tank is insufficient to enable the vehicle to reach the inferred destination. This calculation may be based on a diverse set of information including the present speed at which the vehicle is travelling or other factors (e.g., average vehicle MPG over a prior time period). At operation 308 the inference engine 42 uses the search engine website 52 to obtain the gas stations in the vicinity of the inferred route that the vehicle would need to access before the fuel level of the vehicle drops below a predetermined minimum level, and then provides a listing of the gas stations to the user on the display 12a. At operation 310 the user selects one of the gas stations by a touch selection, and the NAV maps/data subsystem 38 of the vehicle immediately generates a route to the selected gas station. The system 10 is also able to use one or more of the Internet search engine portal 52 and the vehicle's navigation system to determine if the user is approaching a stretch of road where no gas stations may be available for a lengthy period, and to so advise the user that it may be advisable to detour to a gas station.

It will be appreciated that other types of information generated by the vehicle's computer system 30, such as for example low tire pressure, may also be used by the inference engine 42 to suggest points of interest to the user where the user could have the low tire pressure condition checked, without departing significantly from the inferred route. Virtually any other condition affecting the vehicle (e.g., engine coolant temp) that is monitored by the computer system 30, may potentially be addressed by the inference engine 42 with a suitable warning or suggested locations where service may be obtained. The ability to monitor, in real time, various sensors of the vehicle, and to use this information in connection with navigation information as well as the user's calendar, enables the system 10 to provide a wide range of helpful real time suggestions to the user which helps the user more effectively, efficiently and conveniently carry out activities while using the vehicle, and which add to the overall enjoyment of the user experience in operating the vehicle.

Creating a Profile for the Vehicle User

The system 10 also provides the ability to create a customized "profile" for the vehicle user, as well as other individuals that periodically need to use the vehicle. The profile created for the user is used to control the delivery of information to the user by the system 10 such as from the user's email and calendar accounts, as well as potentially from social media accounts and historical information collected on the user, as well various vehicle settings (HVAC, seat position, initial audio settings, etc.). The user's profile is set up initially during a session in which the system 10 is configured to access the user's existing accounts (e.g., email, calendar, social media sites, etc.), as well as provided with certain information about the user that may be helpful (age, gender, food preferences, music or news/talk radio preferences, travel preferences as to mile roads versus expressways, social media application preferences, etc.). FIGS. 24A-24C represent a listing of one example of a wide range of information that is used to create a personal profile of the user. Once the user's profile is created it is uploaded to the vehicle/user profile portal 46, as well as to one or more other cloud-based portals 40 that the system 10 is able to access and use. The system 10 recognizes the user by one or more methods such as by voice biometrics, by facial recognition, by the keyfob that the user is carrying, by a BLUETOOTH® wireless code transmitted from the user's smartphone as the user enters the vehicle, or by any other suitable means. A plurality of personal profiles can be created and stored for different individuals who occasionally use the vehicle and thus the system 10. Thus, multiple user profiles are able to be stored and automatically applied by the system 10 as different users enter and begin using the vehicle.

An important feature of the profile feature of the system 10 is the ability to "grow" with the user over time. As such, the system 10 incorporates a machine learning capability to learn important preferences and habits of the user. More specifically, the system 10 is able to acquire historical data concerning the user's preferences such as, but not limited to, restaurant selections, tagged points of interest concerning retail or entertainment establishments, radio stations listened to at certain times of the day, heating, cooling or HVAC settings most typically used by the user, items of interest from social media websites that the user has responded to, specific songs that the user has "liked" or "disliked", specific genres of music that the user frequently listens to, etc. The system 10 uses this information to enhance and enrich the user's profile over time. This significantly enhances the ability of the system 10, and particularly the inference engine 42, to more accurately predict and suggest information, as well as the initial configuration of radio or other vehicle controls, that will enhance the user's experience in using the vehicle. Since the information making up the user's profile is stored at one or more of the cloud-based portals 40, the user's profile is able to be loaded onto a different vehicle of the manufacturer. In this manner, the system 10 is able to use the user's profile on a new vehicle that the user takes possession of when the user trades in an existing vehicle to a vehicle dealer associated with the vehicle manufacturer.

Simple Mode/Manual Mode

To assist the user in gradually becoming more and more familiar with the various and wide ranging features of the system 10, the system 10 is preferably initially programmed to start in a "Simple Mode" mode of operation where only a limited number of options and information is presented to the user on the display 12a. Such options are preferably for controlling basic operations of the vehicle's subsystems or accessing, for example, icons for radio, HVAC, seat position, Navigation, Email/Calendar messages/information, etc. As the user uses the vehicle over a period of days and weeks, the system 10 may gradually, automatically present additional controls on the display 12a. In this manner the user is allowed to become gradually familiar with the wide ranging controls and capabilities of the system 10. This also helps to prevent some users from feeling overwhelmed when initially beginning to learn to use all the diverse and numerous capabilities of the system 10. The Simple Mode of operation also enables the system 10 to predict how controls or widgets are presented on the touchscreen display 12a in a manner that is likely to be in accordance with preferences of the user. Thus, the Simple Mode will present basic controls for a function of feature (e.g., a climate control temperature setting), but over time as the system 10 learns the user's preferences by monitoring how often, and under what circumstances, the user has selected a more detailed display of control selections, the Simple Mode of operation automatically begins displaying control options that most closely match past selections of the user. In this example the Simple Mode is able to detect that whenever the user adjusts a temperature setting of the climate control, that the user almost always selects the airflow to be directed exclusively through the dashboard vents. The Simple Mode thus eventually "learns" to present the climate controls on the display screen 12a with the controls for setting the airflow, along with the UP and DOWN temperature selection controls for setting a specific temperature. This learning is carried out for other user selections (e.g., seat position, lighting, etc.) as well that the user frequently makes.

A "Manual Mode" selection is also available to the user via the display 12a, which when selected places a complete menu of icons on the display 12a that enable the user to immediately access all of the controls available via the system 10. This feature enables users who are more comfortable and proficient with using electronic devices to immediately be presented with the full panoply of options and capabilities of the system 10.

Rear Seat Sharing of Information

Figure 25:
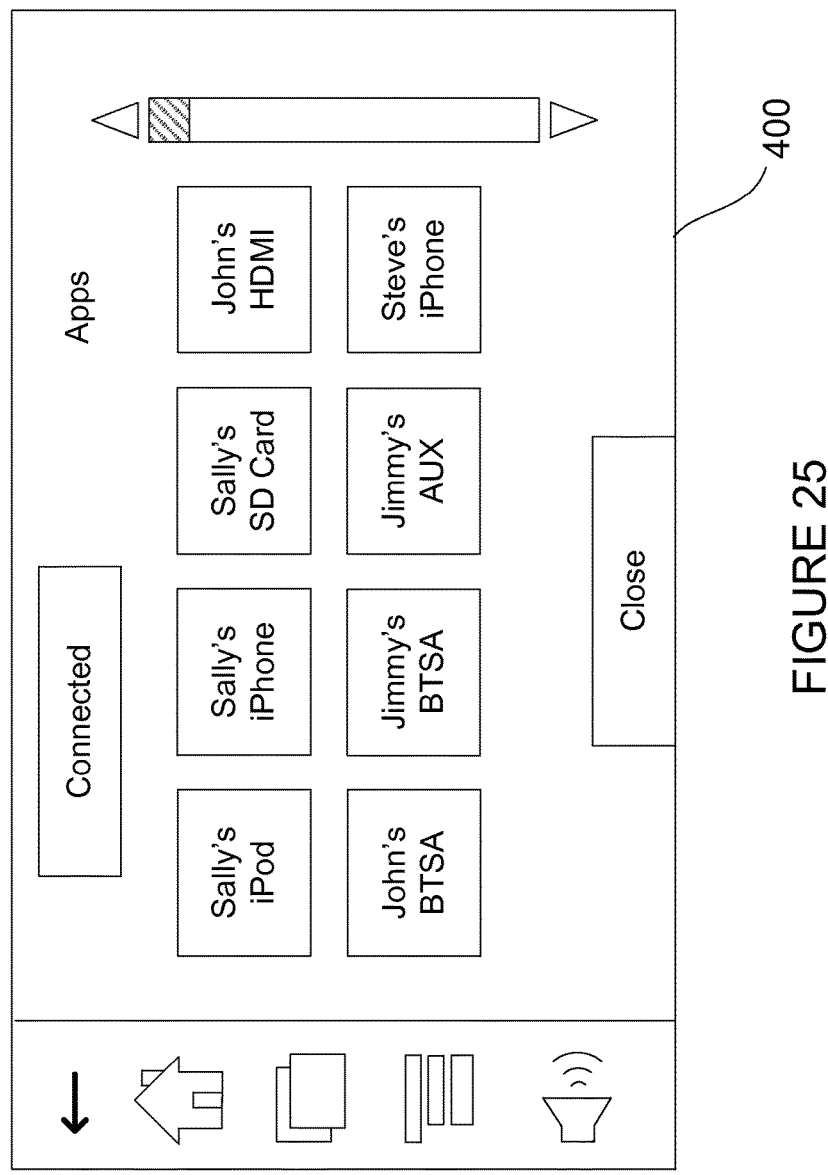
FIG. 25 is an illustration as to how one of the rear seat electronic subsystems may display all the devices that are connected to the system.

The system 10 further provides the ability of each of the rear seat electronic subsystems 66 to be used to share information such as song files, applications, video files or other documents with the vehicle operator through the ICS 24, or through the ICS 24 to other passengers of the vehicle who have an electronic device (tablet, laptop, smartphone, etc.) in communication with the system 10. The system 10 further enables points of interest (POIs) entered at the rear seat electronics subsystem 66, or from a smartphone, tablet, laptop or other electronic device that a passenger has brought onto the vehicle, to be pushed from the system 66 or other device to the ICS 24 of the vehicle while providing the vehicle operator with the option to accept or decline the point of interest. FIG. 25 shows one example of a screen 400 and how the rear seat electronics subsystem 10 display the other electronic devices that are connected to the system 10. Each connected device is identified by an icon.

ICS Cluster HMI

The Cluster HMI 24a (FIG. 1) also provides the feature of enabling multiple display windows to be selected by the user, with one of the windows being sized larger than the other, or the two windows being configured as the same size. This also enables two different screens of information to be displayed and updated simultaneously in real time. For example, the user may use the dual display screens to simultaneously display the navigation routes, in real time, of his/her route along with the route of a Zoo member or contact, or to display the real time routes/travel of two other individuals, such as two Zoo group members, simultaneously.

Figure 26:
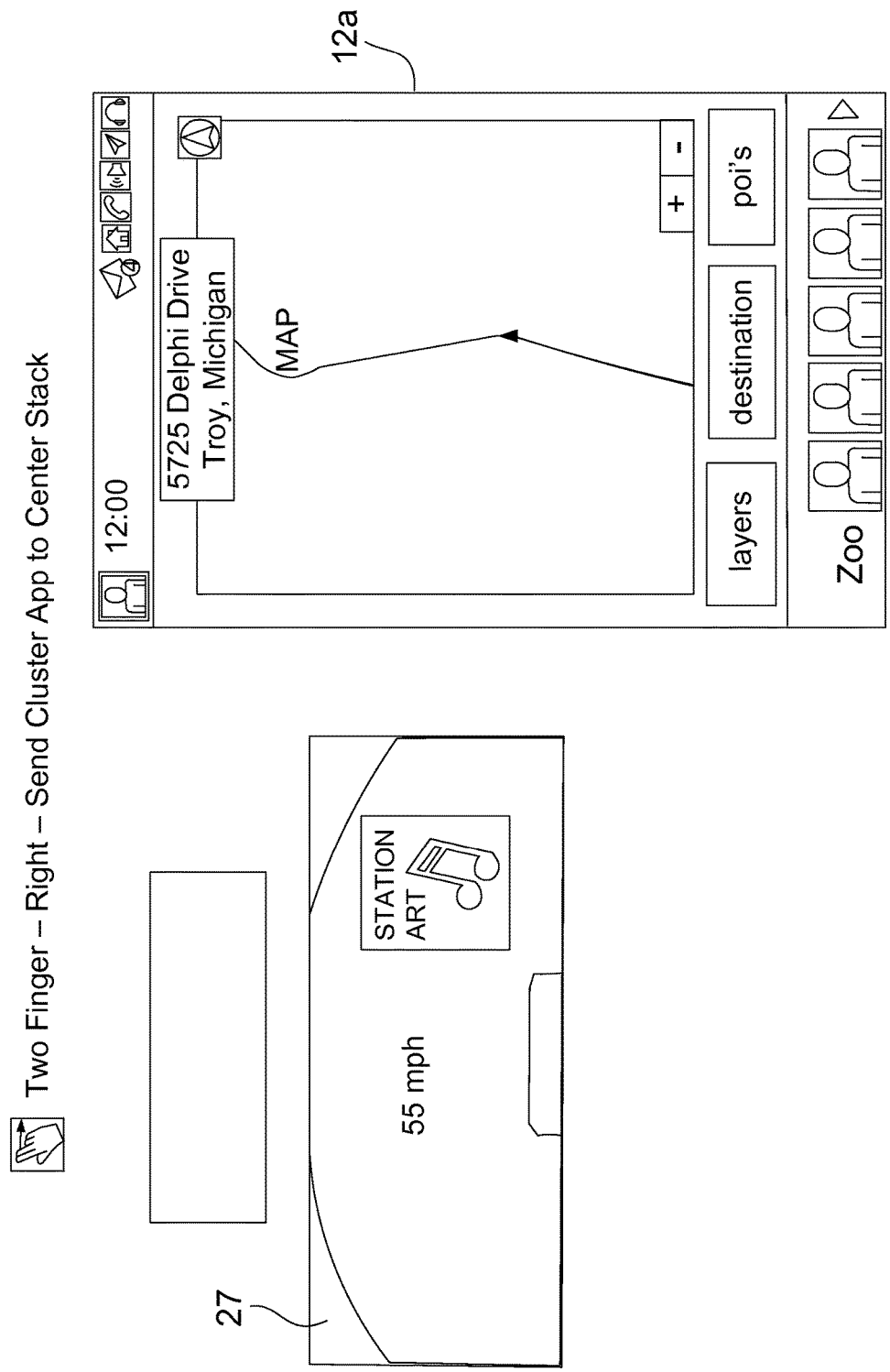
FIG. 26 is an illustration of how a user may use a two finger swiping motion to the right to move an application running on and being displayed on the touchscreen cluster display of the system to the ICS associated touchscreen display.
Figure 26A:
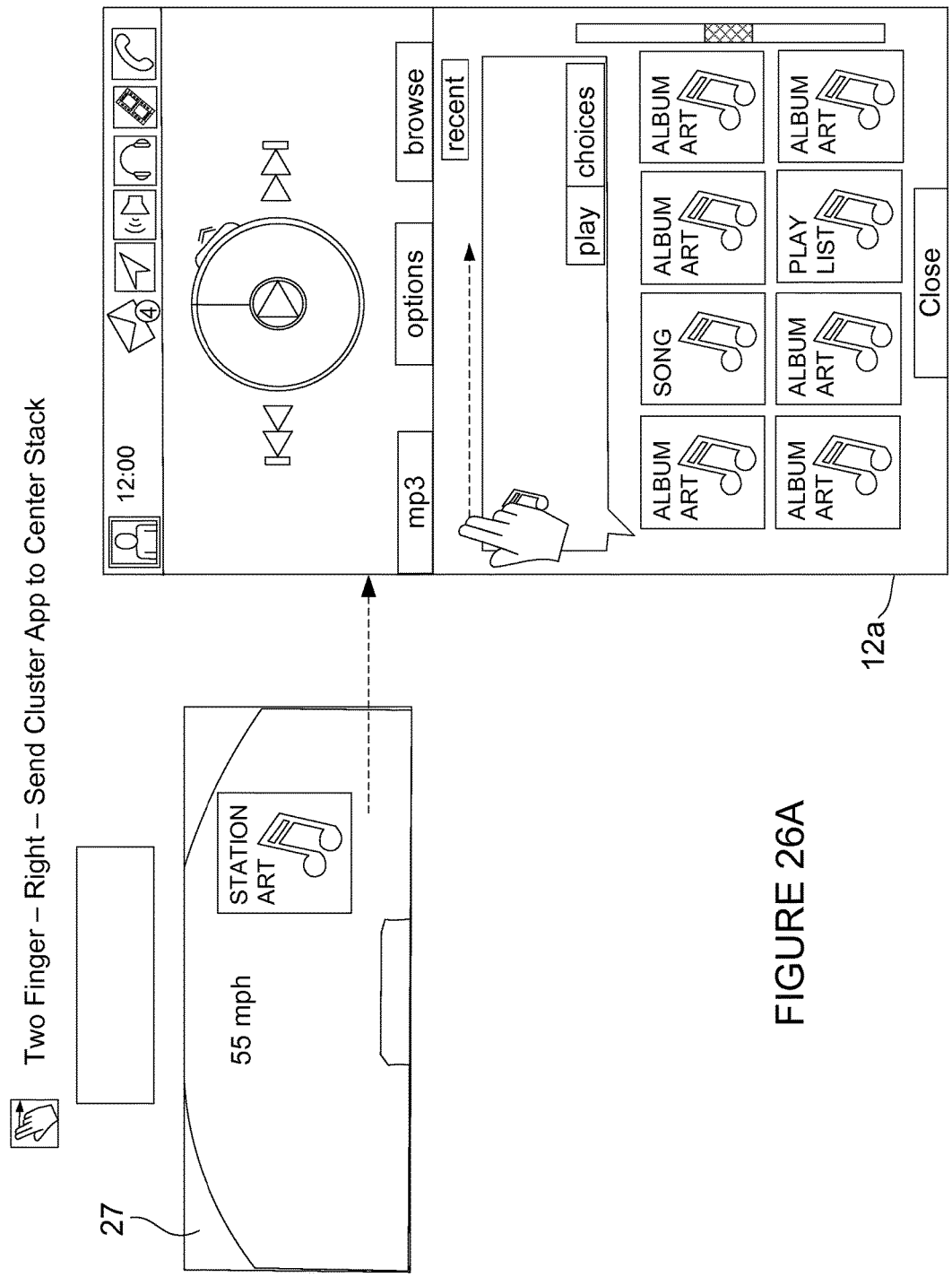
Figure 27:
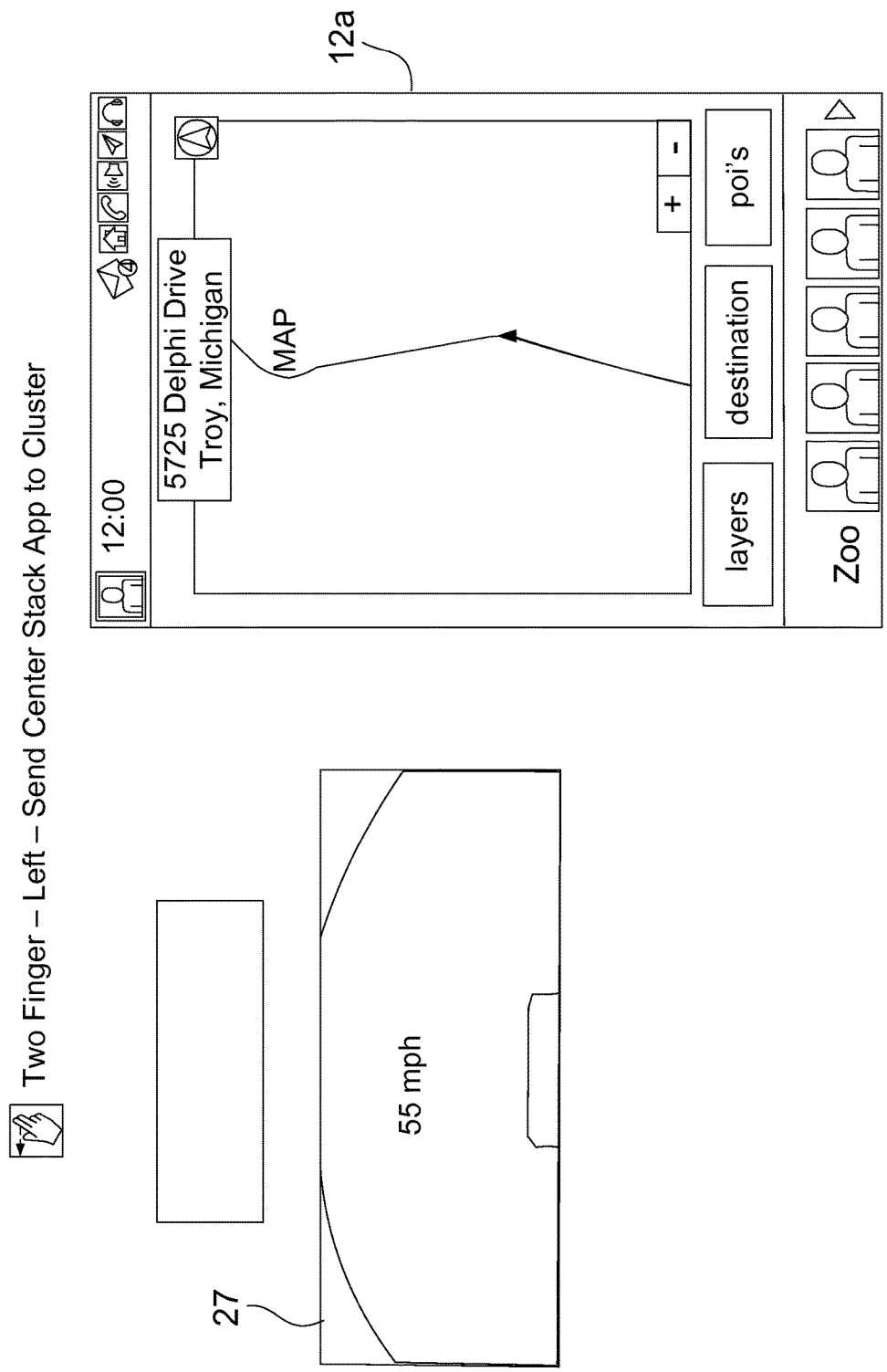
FIG. 27 is an illustration showing how the user may use a two finger swiping motion to the left to move an application running on the ICS associated touchscreen display over to the cluster touchscreen display.
Figure 27A:
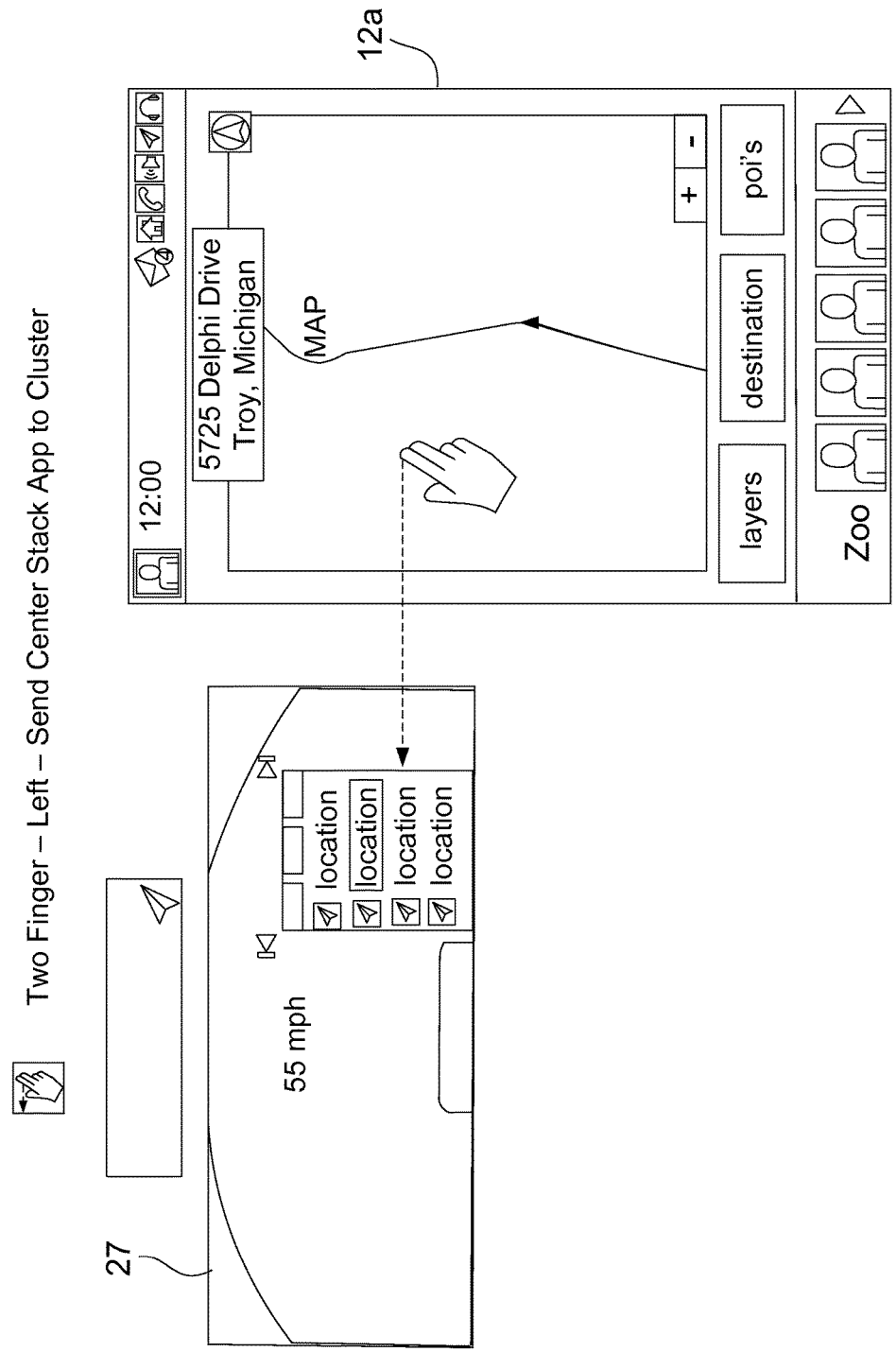

With specific reference to FIGS. 26 and 27, the system 10 also enables two finger swiping to move one application running on the cluster display 27 to the touchscreen display 12a associated with the ICS 12, or vice versa. FIG. 26 illustrates how placing two fingers on an application running on the cluster touchscreen display 27, in this example a music player application, and swiping the two fingers on the cluster touchscreen display 27 to the right, moves the music player application onto the ICS associated display 12a. FIG. 27 illustrates how placing two fingers on the ICS associated display 12a and swiping the two fingers to the left moves the application running on the touchscreen display 12a, in this example a navigation application, over to the cluster touchscreen display 27. This feature enables the user to quickly move those applications that are running on either of the displays 12a or 27 from one to the other to enhance use of the system 10.

Simple Mode Examples

Figure 28:
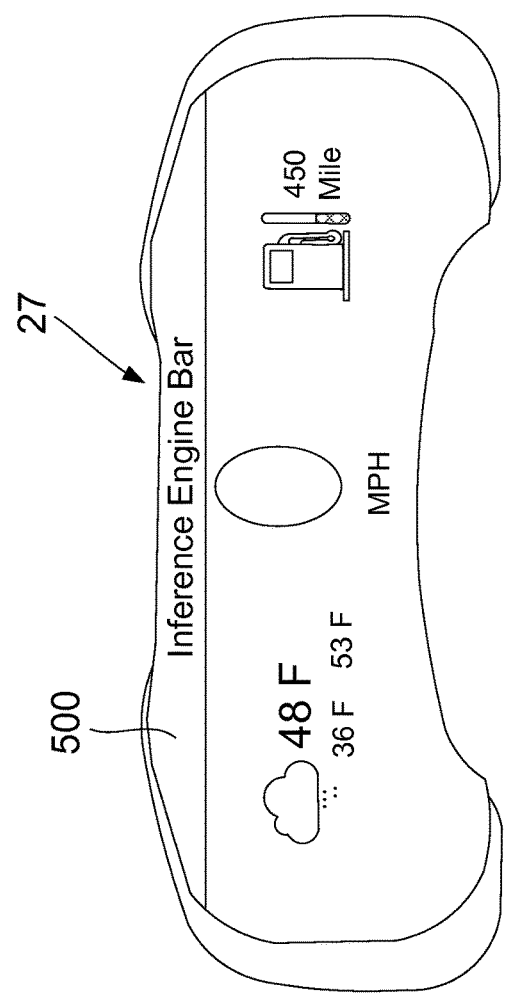
FIG. 28 is an illustration of the cluster touchscreen display showing an inference engine bar where notifications and prompts are presented to the user.

Referring to FIGS. 28-36d, further examples are presented as to how the Simple Mode control methodology is used in various user/driving situations. It will be appreciated that the Simple Mode methodology is implemented by software running on a processor, and is either an independent subsystem or implemented through the inference engine 42 and/or in connection with rules contained in the intelligent display resource manager 23. FIG. 28 illustrates the instrument cluster touchscreen display 27 having an inference information bar 500. The inference information bar 500 is where the inference engine 42 presents information to the user in the way of situational information or suggestions. In this example the instrument cluster touchscreen display 27 is used to present various types of information, for example to notify the user of a road hazard ahead (e.g., pothole or accident or road construction or lane closure). Notifications are also presented to the user in the inference information bar 500. Such notifications include, for example, incoming phone calls with a user prompt if the call is to be accepted or declined, daily or time sensitive reminders about appointments on the user's calendar, as well as suggestions for context and/or time sensitive information (e.g., pick up package on way home from specific store or location, or call road service for a detected flat tire).

Figure 29:
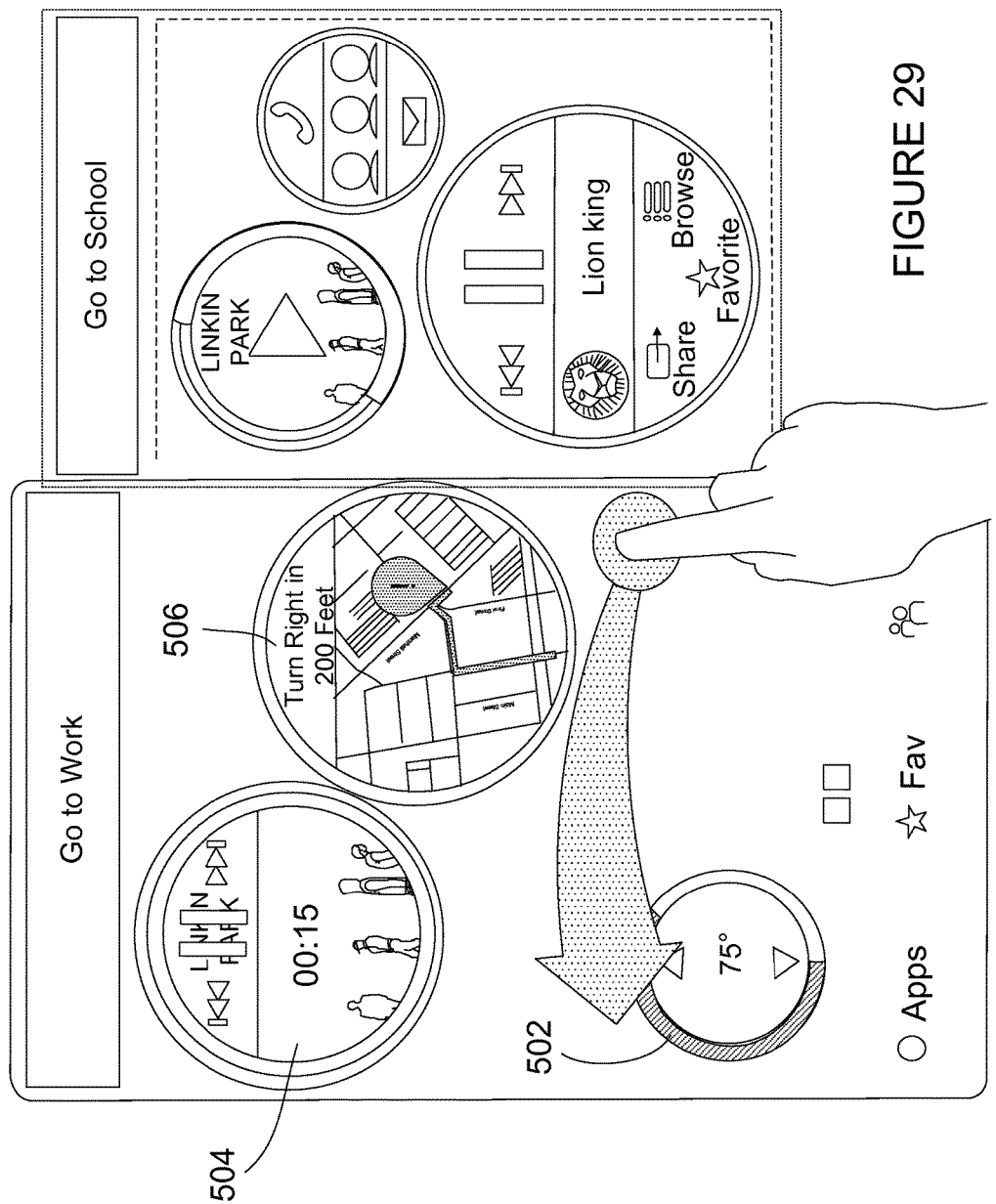
FIG. 29 is an illustration of the touchscreen display.
Figure 30:
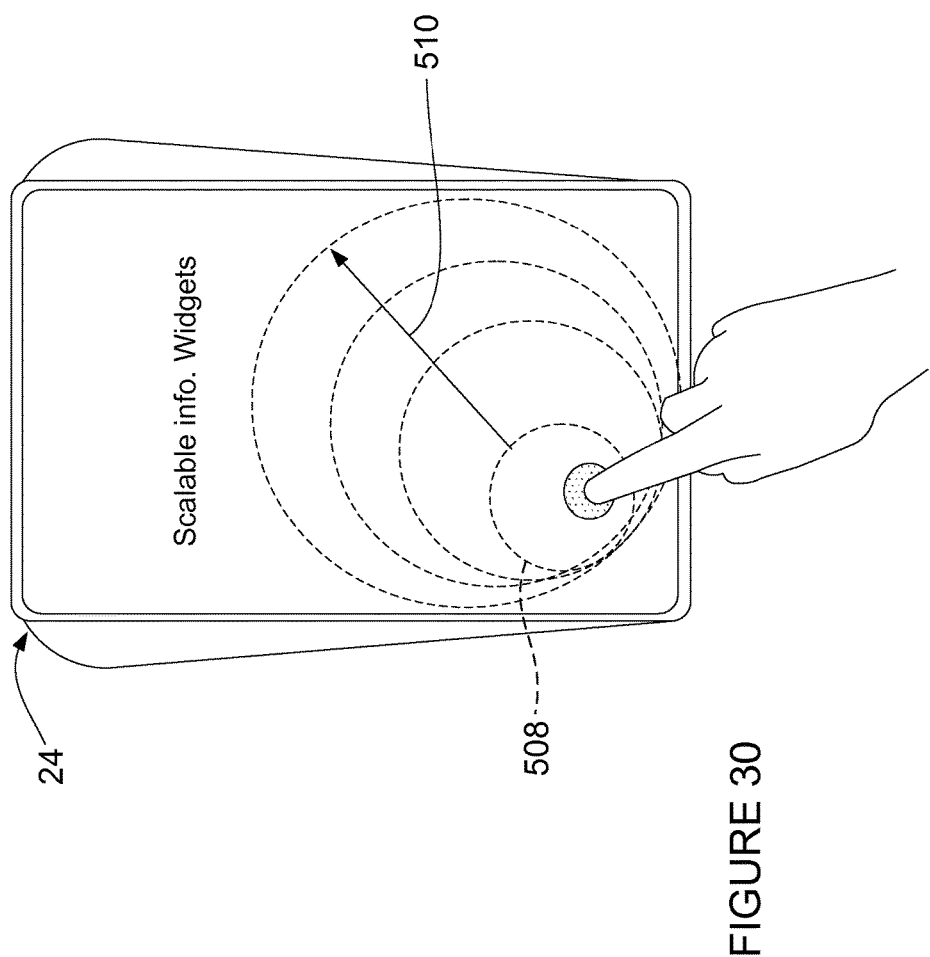
FIG. 30 is an illustrating showing how the size of a circle widget can be easily scaled using a swiping motion with a finger.

FIGS. 29 and 30 illustrate how the Simple Mode methodology of the present disclosure enables information to be presented to the user in a highly simplified manner, based on learned user habits and preferences determined by the inference engine 42, while still allowing the user to customize the presentation of different types of information. FIG. 29 illustrates that the Simple Mode methodology presents different types of information as widgets in the form of circles. In this example circle widgets 502, 504 and 506 are shown that can be scaled by the user to make the circles larger or smaller. The inference engine 42 uses learned habits of the user to initially present one or more circle widgets by which different subsystems of the vehicle may be controlled as the user enters and starts the vehicle. The circle widgets in this example are displayed on the touchscreen display 12a of the radio system 12. While the widgets are displayed as circles, virtually any other shape (square, rectangle, etc.) could be used for the widgets.

In FIG. 29 the inference engine 42 has determined that the most commonly used or accessed controls of the vehicle when the user initially starts and enters the vehicle, are the climate control, represented by circle widget 502, a media player, represented by circle widget 504, and a map indicating the user's route to his/her place of work, represented by circle widget 506. An "event bar" 508 is presented along the top of the touchscreen display 12a which informs the user of the event that the inference engine 42 believes the user is interested in. This event corresponds to the map provided in circle widget 506. In this example the "event" that the inference engine 42 initially suggests is travel to the user's place of work. This determination is made by the inference engine 42 based on the monitored habits of the user over time, and possibly also using calendar entries of the user. Thus, if the day of the week is Monday, and that particular Monday is not a holiday that most individuals would have off, and there is no calendar entry on the user's calendar indicating a meeting at some other location, then the inference engine assumes that the user will be headed toward his/her place of work, and will present a map with a route outlined to the user's place of work as indicated in circle widget 506 of FIG. 29. If an accident has occurred somewhere along the route shown in the circle widget 506, or if road construction has resulted in the closure of one or more roads or likely areas of traffic backup, then those conditions are noted on the map, and the inference engine 42 immediately presents information mentioning the traffic related information to the user in the inference engine bar 500 of FIG. 28, along with a prompt for the user to confirm that he/she wants an alternate route to be provided. The prompt is given to the user either in the inference engine bar 500 on the cluster touchscreen display 27 or possibly on the touchscreen display 12a.

With further reference to FIG. 29, recently used applications by the user are again moved onto the display 27 or 12a by the user swiping with his/her finger in a right to left motion. Content (or an application) may also be dragged onto the display 27 or 12a using a finger and a swiping motion, as indicated in FIG. 31.

With further reference to FIG. 30, the size of the circle widget 508 is scalable by the user in diameter so that it takes up only a very small portion of the available viewing area of the display 12a, or substantially all of the viewing area. Scaling is performed by the user touching within the circle widget and dragging his/her finger diagonally along line 510 until the desired size circle is reached. Accordingly, each of the circle widgets can be manually dimensioned by the user based on the importance of various applications or subsystems of the vehicle. In this manner, those subsystems or applications that are most important or used most frequently are presented by circle widgets which are larger than those used to control other subsystems or applications of lesser importance to the user. The inference engine 42 records instances when the user selects specific functions or applications, as well as the context (e.g., time of year, day of the week, ambient outdoor temperature, etc.), and presents the circle widgets to the user, when the user first enters the vehicle, that the inference engine 42 believes will be most important to the user.

FIGS. 31 and 32 illustrates how circle widget 502 may be controlled by the user to select a greater amount of information for display. In FIG. 31, circle widget 502 presents an initial inside vehicle temperature setting which the inference engine 42 determines that the user would want (based on previous selections, time of day, calendar day, outdoor ambient temperature, etc.). The user adjusts this up or down by using arrows 512 or 514. If the user desires more control options the user touches anywhere in the center of the circle widget 502, and the system creates circle widget 516 shown in FIG. 32a. Circle widget 516 can be seen to include additional controls for fan speed (control 518), heat/air vent control (control 520), seat position (control 522) and temperature setting (control 524). Touching anywhere in the center area 526 of circle widget 516 results in the system 10 bringing up even more control options as shown in circle widget 528 in FIG. 32b. Touching on any one of the options 518, 520, 522 or 524 allows the specific selections available for that selected subsystem to be displayed in a new circle widget. Thus, the user can touch specific icons to pull up detailed controls for a particular function (e.g., HVAC control) or can simply repeatedly touch the interior of the displayed circle widget to display more and more options. When the user simply presses the area within a displayed circle widget, the inference engine 42 controls what selection options will be displayed in the next depiction of the circle widget based on those selection options that have been used most recently or frequently by the user.

Figures 33A, 33B, 33C, 33D:
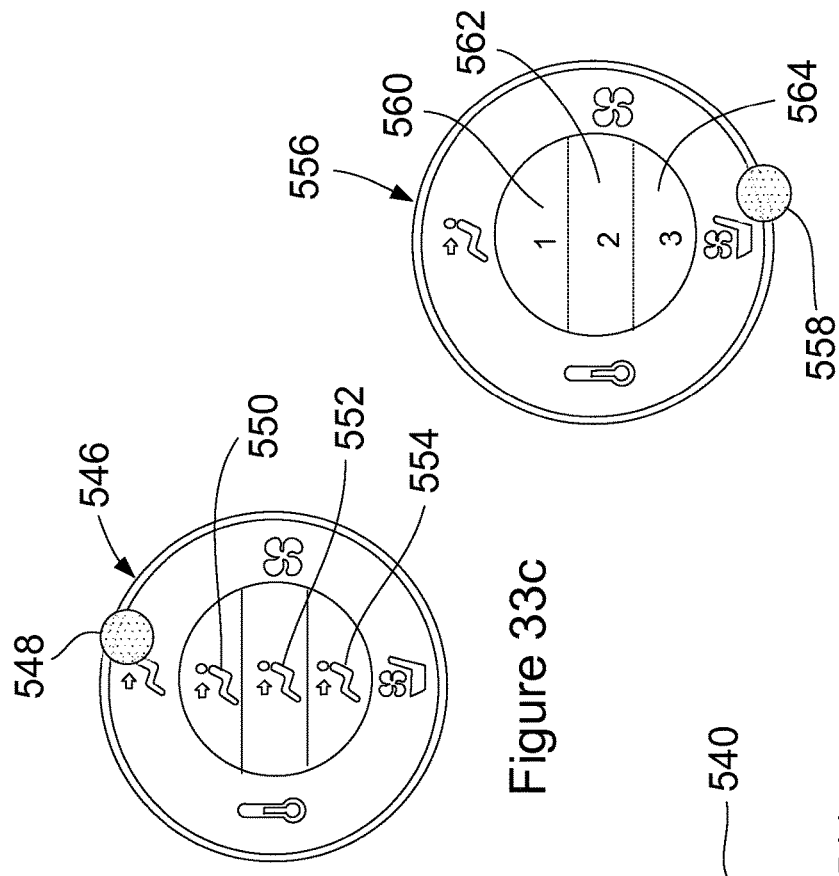
FIG. 33a illustrates a circle widget with the user having made a control selection to set the temperature.
FIG. 33b illustrates a circle widget with the user having made a selection to adjust the fan speed of the HVAC subsystem.
FIG. 33c illustrates a circle widget with the user having made a selection to adjust the airflow from the HVAC system.
FIG. 33d illustrates a circle widget with the user having made a selection to adjust a cooling level for the driver's seat.

In FIG. 33a, circle widget 530 can be seen with center section 532 displaying a current temperature setting and Up and Down arrows for allowing the user to adjust the temperature. Ring 534 shows a first level of control options for various vehicle subsystems. Pressing the temperature icon at point 536 allows the user to increase or decrease the set temperature of the vehicle's climate control system. Circle widget 538 shows that the user has touched the fan speed control selection at point 540, which causes Up and Down arrows 542 and 544 to be displayed along with an increment (e.g., percentage speed increase/decrease) by which the fan speed of the vehicle's climate control system will be increased or decreased with each touch of arrow 542 or arrow 544. Circle widget 546 indicates the user having touched the HVAC control icon at point 548. This results in options 550, 552 and 554 being displayed for the user. Circle widget 556 shows the user having pressed point 558, which brings up a plurality of selections 560, 562 and 564 for controlling cooling of the user's seat.

FIGS. 34*a*-34*g* illustrate a circle widget 570 that provides a media player and the different layers of control options that are presented to the user depending on selections made by the user. In FIG. 34*a*, pressing at point 572, which is within the top half of the circle widget 570, allows the currently displayed song title to be selected for playback. Pressing at point 574 (FIG. 34*b*), in the lower half of the circle widget 570, enables more control options to be displayed (i.e., "expanded"), as shown in FIG. 34*c*. In FIG. 34*c*, pressing at point 576 (i.e., on the smartphone icon) causes different selections for various audio sources to be displayed as shown in FIG. 34*d*. Pressing again at point 578 in FIG. 34*d* expands the selection options so that the options are presented in a ring 580 as shown in FIG. 34*e*. In FIG. 34*f*, pressing anywhere within the ring 583, but not directly on an icon, such as at point 582, causes all of the available selection options to be brought up within ring area 584 in FIG. 34*g*.

Figure 35B:
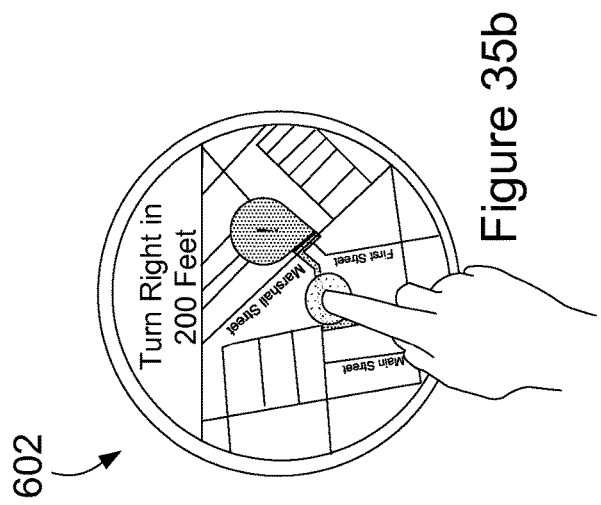
Figure 35A:
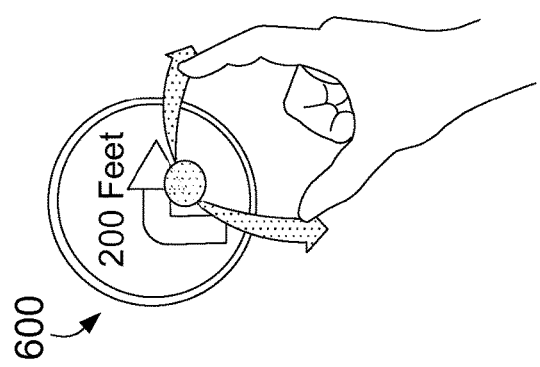

FIGS. 35*a*-35*d* illustrate how the Simple Mode methodology controls the presentation of control options when using a navigation map. Circle widget 600 in FIG. 35*a* shows how a detailed map in FIG. 35*b* can be presented by the user touching the display and swiping two fingers in an expanding motion. In FIG. 35*b*, touching anywhere within the circle widget 602 causes a first level of control options (e.g., "Favorites" 606, "Fuel" 608, "Tag" 610 and "Delete" 612) to be displayed in a ring area 603, as shown in FIG. 35*c*. In FIG. 35*c*, touching anywhere in the ring area 603 causes still further control selections to be brought up, as shown in circle widget 610.

FIGS. 36*a*-36*d* illustrate how the Simple Mode methodology is used for controlling the presentation of options for selecting contacts. FIG. 36*a* illustrates a circle widget 620 in its most basic presentation for a specific displayed, stored contact. Pressing on a phone icon 622 or anywhere within the upper portion of the circle widget 620 in which the phone icon is displayed initiates a call to the individual shown in a lower portion 624 of the circle widget 620. FIG. 36*b* illustrates that by pressing a lower portion 626 of the circle widget 620, the various control options associated with the Contacts folder is displayed in ring 628 of circle widget 627, along with one or more additional contacts, as shown in FIG. 36*c*. The one or more additional contacts are displayed within a center portion 630 of the circle widget 627, and are contacts that the inference engine 42 has determined the user is also likely to want/need to contact, based on past user behavior (e.g., inferred from past calls made at that particular time of day, route of travel, etc.). For example, the inference engine may determine that the user frequently calls contact "A" after making a call to the user's home, while driving toward the user's home after work. The inference engine 42 thus learns call patterns that the user demonstrates over a period of time, and anticipates when the user is likely to want/need to make two or more successive calls to two or more different contacts. Touching either contact displayed in FIG. 36*c* enables a greater plurality of contacts to be displayed in the circle widget 630, as shown in FIG. 36*d*. The greater plurality of contacts involves additional individuals that the user has called within the same day/time context.

Example of Simple Mode Use During a Single Day

Figure 37A:
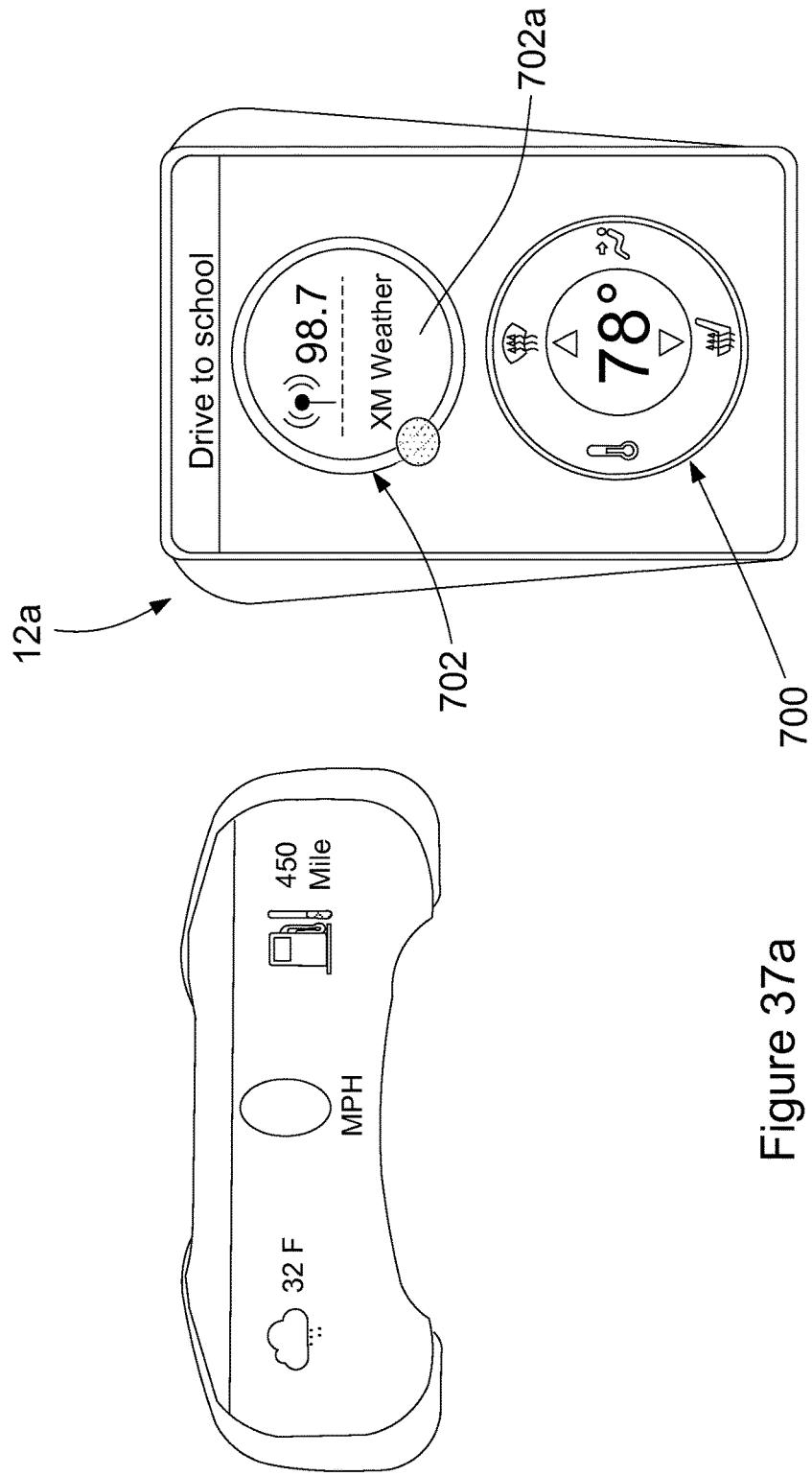

As one example, FIGS. 37*a*-37*d* show how the Simple Mode methodology of the present system and method, being used in connection with the inference engine 42, presents various control options to the user throughout a single day of vehicle usage. In FIG. 37*a*, when the user first enters and starts the vehicle, the inference engine has learned from past behavior of the user that the user typically checks the climate control and frequently listens to radio station 98.7. Accordingly, the climate control circle widget 700 and a media widget 702 are initially presented by the Simple Mode methodology on the touchscreen display 12*a*. On this particular day there is a weather advisory that has been detected by the system 10 by its having accessed a suitable on-line weather website. As such, a weather advisory option is provided in the lower portion 702*a* of the media circle widget 702. If the user wants more weather related information, the user simply presses on the lower portion 702*a* of the media circle widget 702 to obtain specific details on the weather condition in his/her area. The system 10 has also automatically checked one or more available traffic websites and has not detected any traffic issues on the user's anticipated route to work. The inference engine 42 has used the past behavior of the user, and taken into account the day and time of day, and information available on the user's calendar, to determine that the user will be travelling to a school. Since no traffic issues are present, no map or traffic alerts are generated by the inference engine 42 on the touchscreen display 12*a*.

Figure 37C:
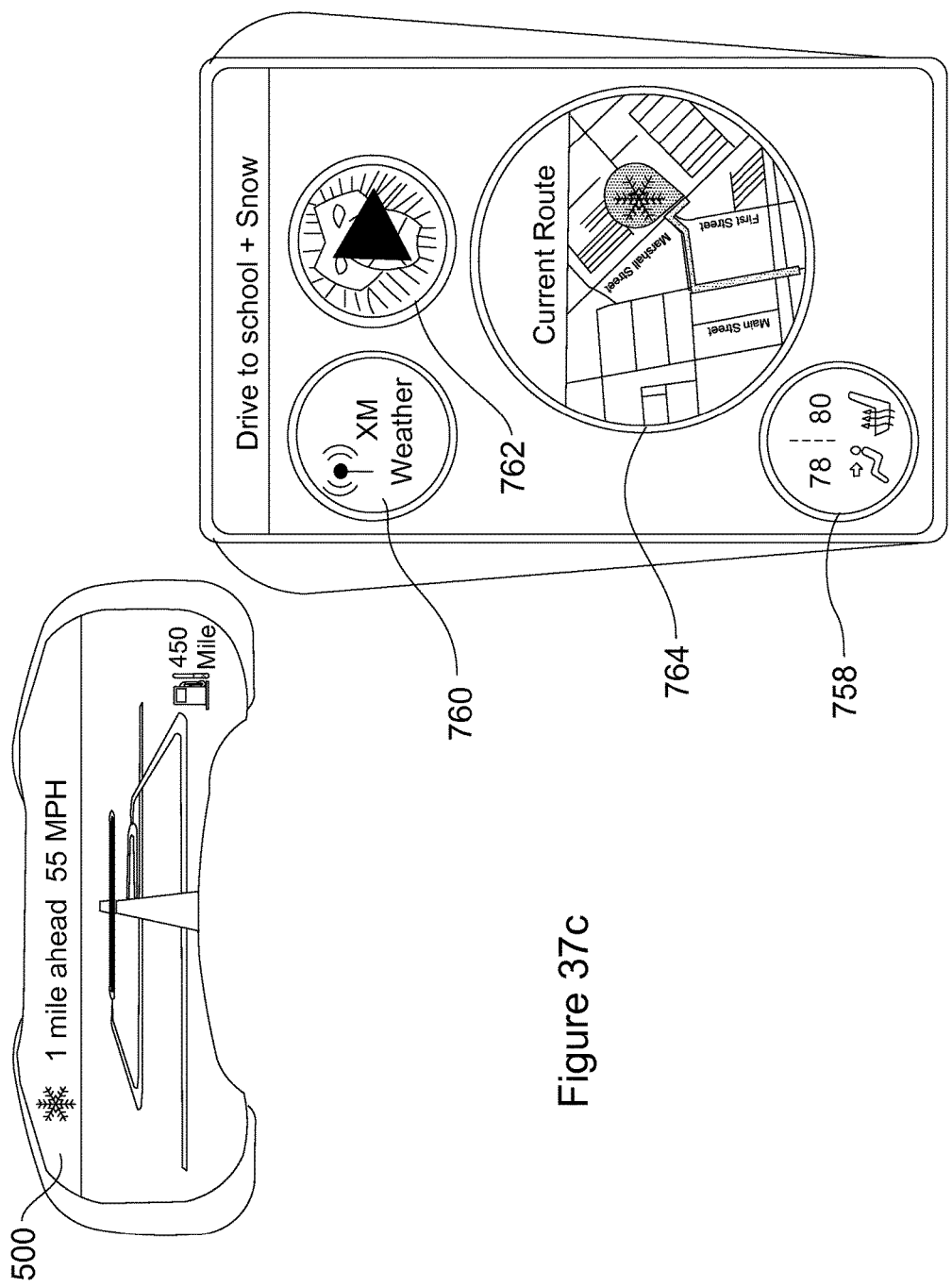

In FIG. 37*b*, the user has parked the vehicle to pick up one or more children on the way to a school. A notification on the inference engine bar 500 informs the user that at least one of the rear seatbelt buckles has been buckled. The user's climate control circle widget 750 and a media control circle widget 752 that had previously been displayed in relatively large sizes are automatically significantly reduced in size by the intelligent display resource manager 23 (FIG. 1), and a rear passenger climate control circle widget 754 is provided along with a media control circle widget 756 for the rear seat entertainment (RSE) system, which are both larger in size than circle widgets 750 and 752. The inference engine 42 determines, based on past usage, what options may be initially displayed for selection in the media control circle widget 756, as well as what temperature to initially set for the rear seat area. In FIG. 37*c*, after the user has continued driving for 10 minutes, a weather advisory is automatically displayed on the inference engine bar 500 indicating a weather condition ahead on the predicted route of travel which is causing a traffic slowdown. At this point the intelligent display resource manager 23 automatically shrinks the sizes of circle widgets 758, 760 and 7612, and places a larger map circle widget 764 in the touchscreen display 12*a*. Again, the intelligent display resource manager 23 is determining that the map circle widget 764 has a display priority over the other widgets being displayed, and allocates the available display area of the touchscreen display 12*a* accordingly.

Figure 37D:
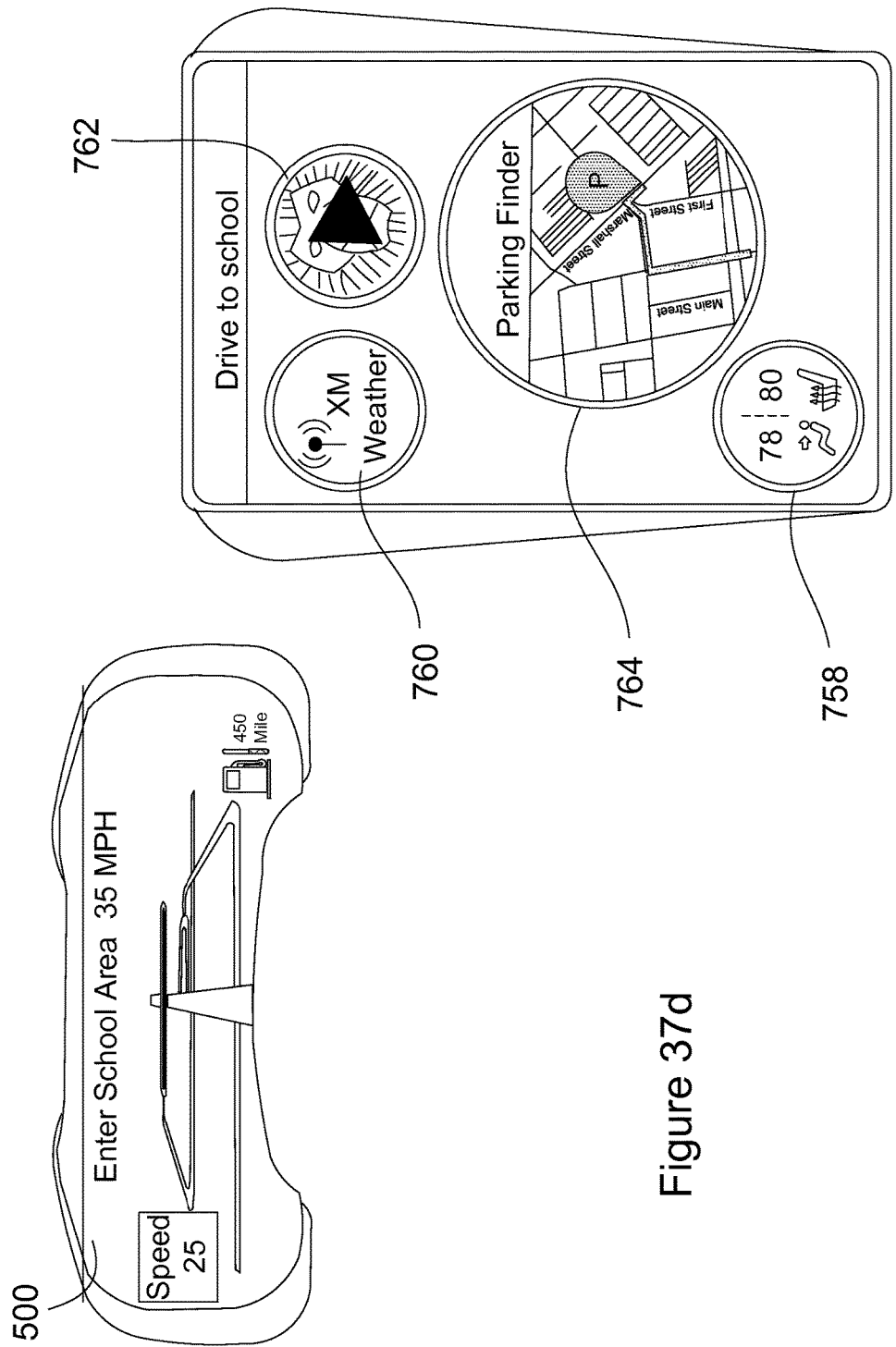

FIG. 37*d* shows that when the user has entered a school area with a reduced speed limit, a notification of this is provided in the inference engine bar 500 by the inference engine 42, along with the posted speed limit. The intelligent display resource manager 23 automatically assumes that the user will want parking assistance, and reduces the sizes of circle widgets 758, 760 and 762 and displays a larger map circle widget which indicates one or more parking areas at the destination school. The volume of any media content playing at the time is also automatically reduced by the inference engine 42.

The foregoing Simple Mode examples illustrate how the inference engine 42 and the intelligent display resource manager 23 are both used to present the touch controlled circle widgets in a manner that the user is likely to prefer, taking into account the context of real time operating conditions (e.g., real time traffic, real time weather, location, time of day, day of the week, calendar information, inferred destination, etc.). The inference engine 42 monitors the user's past behavior when selecting and using the various touch controlled circle widgets to gain an understanding of the user's preferences and habits when operating the vehicle in specific contextual situations. Based in part on the user's past behavior and on real time conditions, the intelligent display resource manager 23 determines when the information that needs to be displayed to the user, and the intelligent resource display manager 23 uses its stored rules to help prioritize the display of the widgets pertaining to the information, as well as appropriate dimensions for the widgets being displayed, and furthermore determines when to reduce the size of certain widget circles being displayed to allow one or more different widget circles to be presented in a larger fashion. In this manner the intelligent display resource manager 23 prioritizes the display of a plurality of widget circles on the touchscreen display system 12a in accordance with an anticipated importance of each of the widget circles, or to otherwise maximize convenient operation of the vehicle's subsystems.

Simple Mode "Mood" Management

The Simple Mode methodology is also powerful in that it can leverage the learning ability of the inference engine 42 to determine what collection or group of diverse control commands or selections are often used together by the user during a specific event. In this manner the system 10 can set a "mood" for the user during a learned event, such as a ride home after work. Alternatively, the system 10 allows the user to create a mood. In the former instance, as one example, when driving home from work, the user may often 1) listen to a specific genre of music; 2) select a particular interior lighting mode; 3) call one or more specific contacts during the ride home; and 4) actuate a garage door opener when reaching his/her home driveway. The Simple Mode methodology and the inference engine 42 allow the system 10 to create a "favorite" or "mood" which is made up of these items. For example, when the system 10 detects that the user has begun driving toward his/her home (e.g., based on time of day, day of week, and direction of travel of vehicle), the inference engine 42 queries the user to confirm that the user's home is the destination being traveled to. The inference engine 42 monitors the control selections that the user makes during this trip, and during subsequent trips where the inference engine assumes with high probability that the user is driving toward home. The inference engine 42 then sets the interior lighting and display music selections on the touchscreen display 12a in accordance with what the user has selected on one or more previous drives home. When the user reaches his destination, the inference engine 42 detects this through the vehicle's navigation system 38 and previously input information by the user defining his/her home location, and automatically activates a garage door opener subsystem associated with the vehicle. The inference engine 42 also preferably provides a prompt to the user on the inference information bar 500 before taking an action, such as initiating a garage door opener selection, with the options "Yes", "No" or "Always". If the user selects "Always", the system 10 knows that the user always wants it to take the prompted action in the context of driving home after work. Similar prompts can be presented to the user on the touchscreen 12a for other functions when the driver initially makes a selection, which helps the inference engine 42 to learn the user's preferences. For example, when the user selects a specific lighting condition, the inference engine 42 may display the prompt "Always". If the user selections "Always", the inference engine 42 knows that this selection is always desired in the context of a specific travel day, time, destination, etc. Additional typical "events" that can eventually be detected, and associated with a plurality of specific vehicle control selections, by the system 10 are driving to work, driving to specific locations repeatedly (e.g., school), typical stops along a route of travel, etc.

The system 10 can also take action, such sending a location notification to a specific contact, for example by using the Glympse® real time location sharing application, as part of a detected "mood" or event. Consider that for the above example of driving home after work, the user also typically sends a real time location notification, via the Glympse® real time location sharing application, to one or more contacts, or possibly to a Zoo group, as soon as he/she starts heading toward home. In this example the system 10 "learns" this habit, based on past actions taken by the user during drives home after work. As a result, when the inference engine 42 detects that the user is likely heading toward home at the end of a work day, the inference engine prompts the user if the user wants to send a Glympse® location sharing notification to the contact, or Zoo group, that the user has typically notified during past drives home. The inference engine 42 may prompt the user with "Yes", "No" or "Always" on the inference information bar 500. Answering "Yes" causes the system 10 to send a one time Glympse® location sharing notification, while answering "Always" lets the system 10 know that this action is to be taken as part of the "mood" that makes up the user's drive home after work. Thus, whenever the inference engine 42 detects that the user has begun a trip home after work, the system 10 will automatically send a Glympse® location sharing notification to the designated contact or Zoo group, as part of the actions taken for the mood or event that comprises the user's ride home from work.

The system 10 may also learn that the user has certain habits while driving in certain contextual situations. For example, the system 10 may eventually learn and be able to detect that the user usually turns down the radio volume when in heavy rush hour traffic or when driving in rain or snowing conditions, as well as demonstrating a habit of selecting an AM news/weather station during these driving conditions. The inference engine 42 can predict the various settings for media selection (e.g., AM radio station) radio volume, HVAC, etc., based on real time traffic and/or weather conditions, and configure the touchscreen display 12a, and the radio system 12 in general, in accordance with the learned preferences/habits of the user. It is also expected that the user will want to share one or more created moods with other members of the user's Zoo community, and instructions can be presented on the touchscreen display 12a for enabling the user to title groups of control actions collected by the inference engine 42 and to share these groups with other members of a zoo group that the user has set up.

User Created or Customized Moods

Figure 38D:
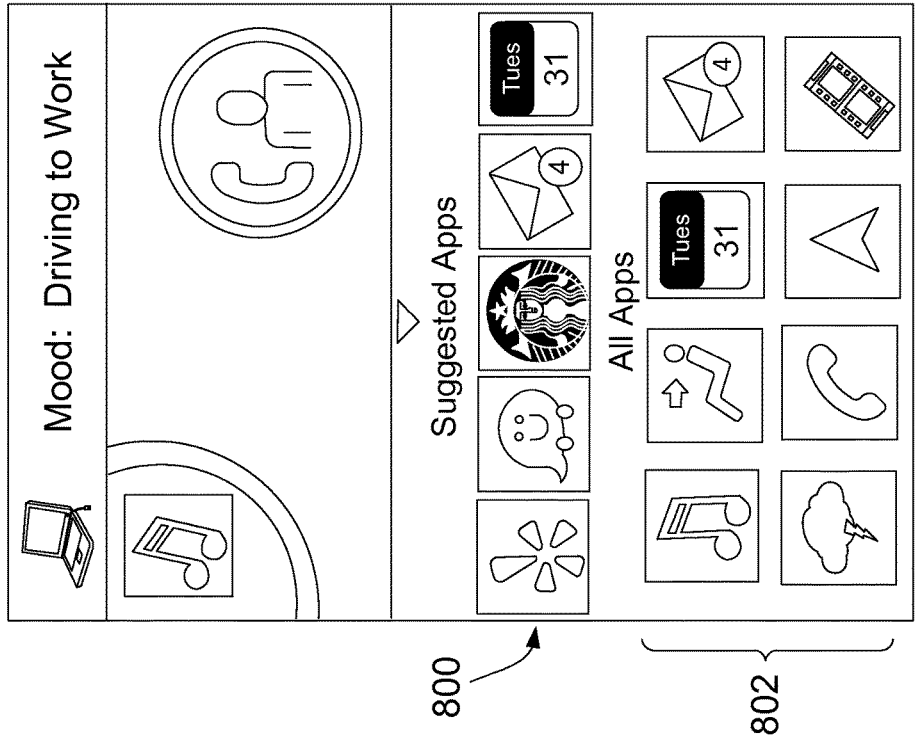
Figure 38C:
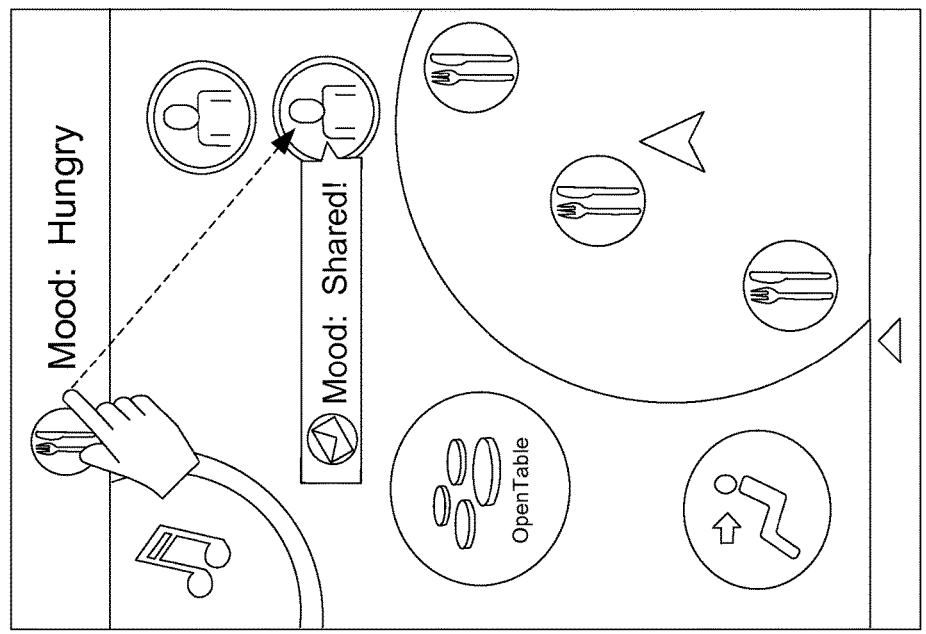
Figure 38E:
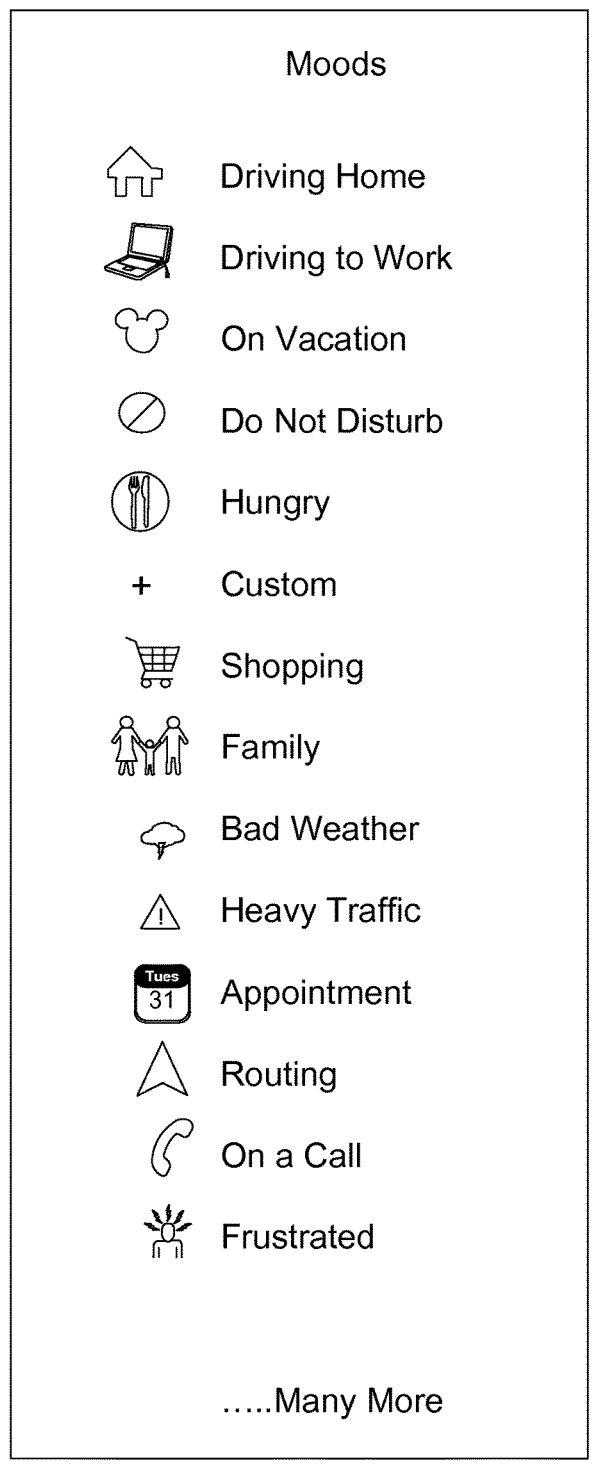
FIGS. 38e and 38f show tables of different types of events that can be used to create moods, along with different actions that can be taken in response to an event to help create a given mood.
Figure 38F:
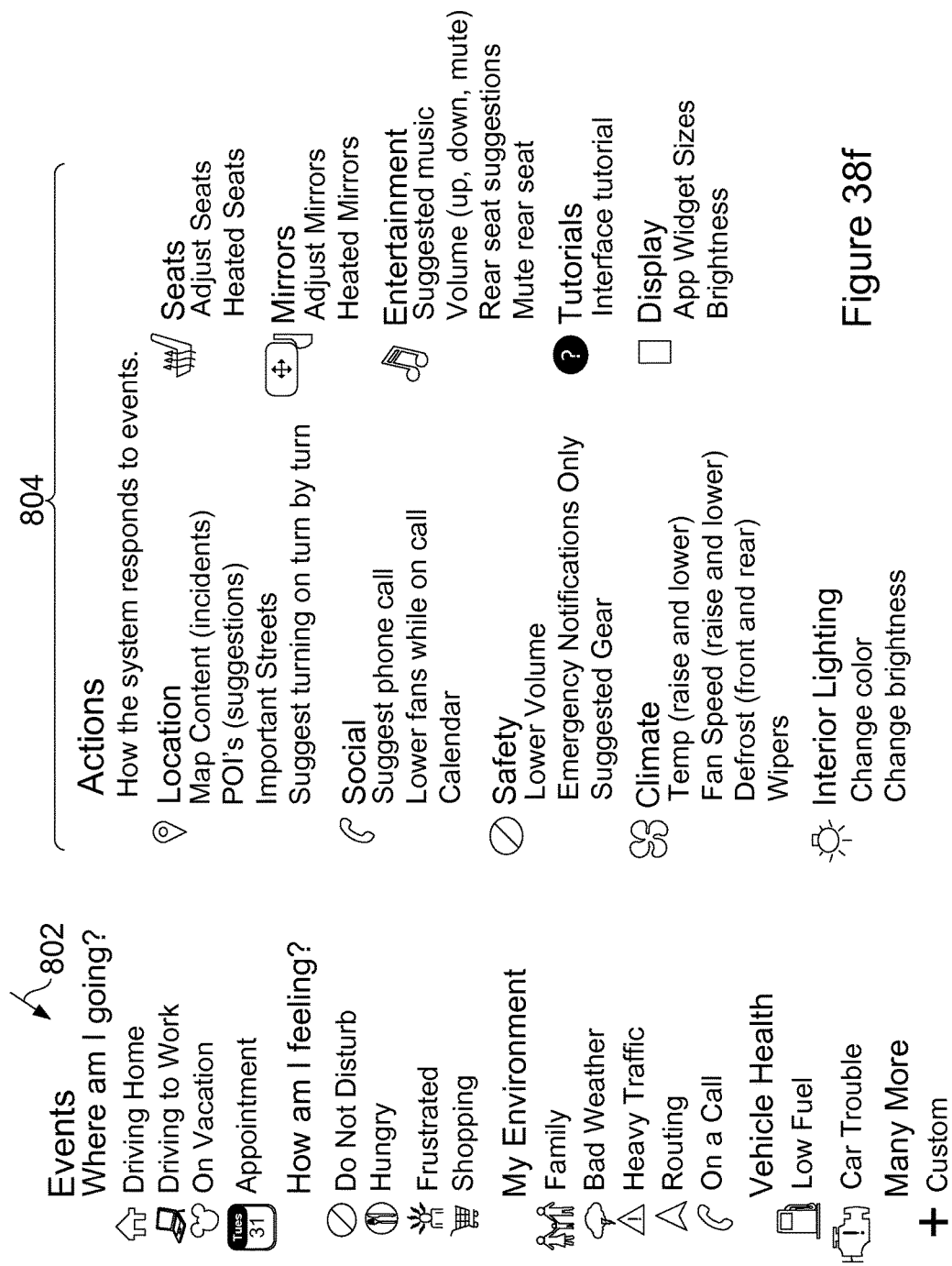

The system 10 also enables the user to create a new mood as well as customize a previously created mood. Referring to FIG. 38a, the system 10 presents a "mood" bar 780 on the touchscreen display 12a that displays a title of the current mood that is being carried out. Touching the mood bar 780 causes another menu screen 782 shown in FIG. 38b to be pulled up. On the menu screen 782 various options are presented which the user can select to create new moods or modify existing moods. Icon 784 relates to a trip home mood, icon 786 relates to driving to work, icon 788 relates to dining or eating mood ("Hungry"), icon 790 is a "Do Not Disturb" mood, icon 792 relates to an "On Vacation" mood, icon 794 relates to a "Shopping" mood, icon 796 relates to a "Frustrated" mood, and icon 798 allows the user to take a snapshot of a current event (i.e., configuration of system 10 controls) to define a new mood. FIG. 38c allows a current mood to be shared with other contacts simply by dragging and dropping the title displayed on the mood bar 780 to the selected contact. FIG. 38d shows that the system 10 presents a group of specific applications 800 that are believed to be pertinent to the specific mood that is being executed, along with a complete or partial listing of other applications that are available to the user. FIG. 38e shows a table of various moods that the system 10 enables the user to create. FIG. 38f provides a table 802 showing examples of various events that can be used to create a mood, as well as a table 804 showing specific actions that can be taken by the system 10 in response to specific events.

It will also be appreciated that a specific mood can be entered simply via a voice command from the user. Likewise, a mood may be interrupted if the system 10 detects a significant event, for example a traffic accident or road construction which is likely to affect the user's travel to a destination. In such an instance, the system 10 can interrupt or modify a present mood to display a notification to the user on the inference bar 500, and/or an additional widget, for example a widget relating to navigation to suggest an alternative route. A changing weather condition, for example a sudden rain storm, can be responded to by the system 10 modifying a mood, for example by decreasing the volume of music that the user is playing. The system 10 is capable of also automatically switching a mood, for example to a "Do Not Disturb" mood, where phone calls and emails are queued to better enable the driver to focus on the present driving conditions.

Widgets Interacting with One Another

Figure 39:
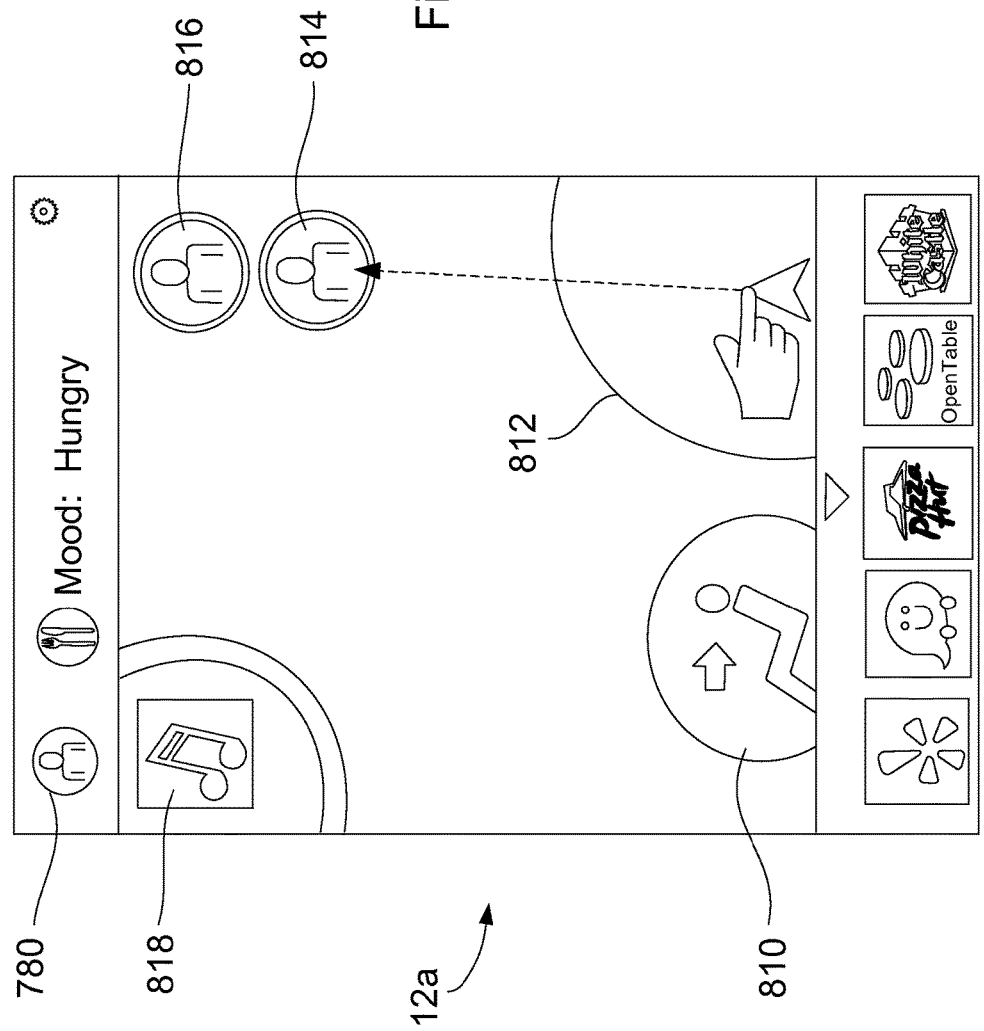
FIG. 39 is an example showing how widgets are able to interact with one another so that a function (e.g., sharing real time location) can be carried out simply by dragging and dropping one widget onto another widget.
Figure 40:
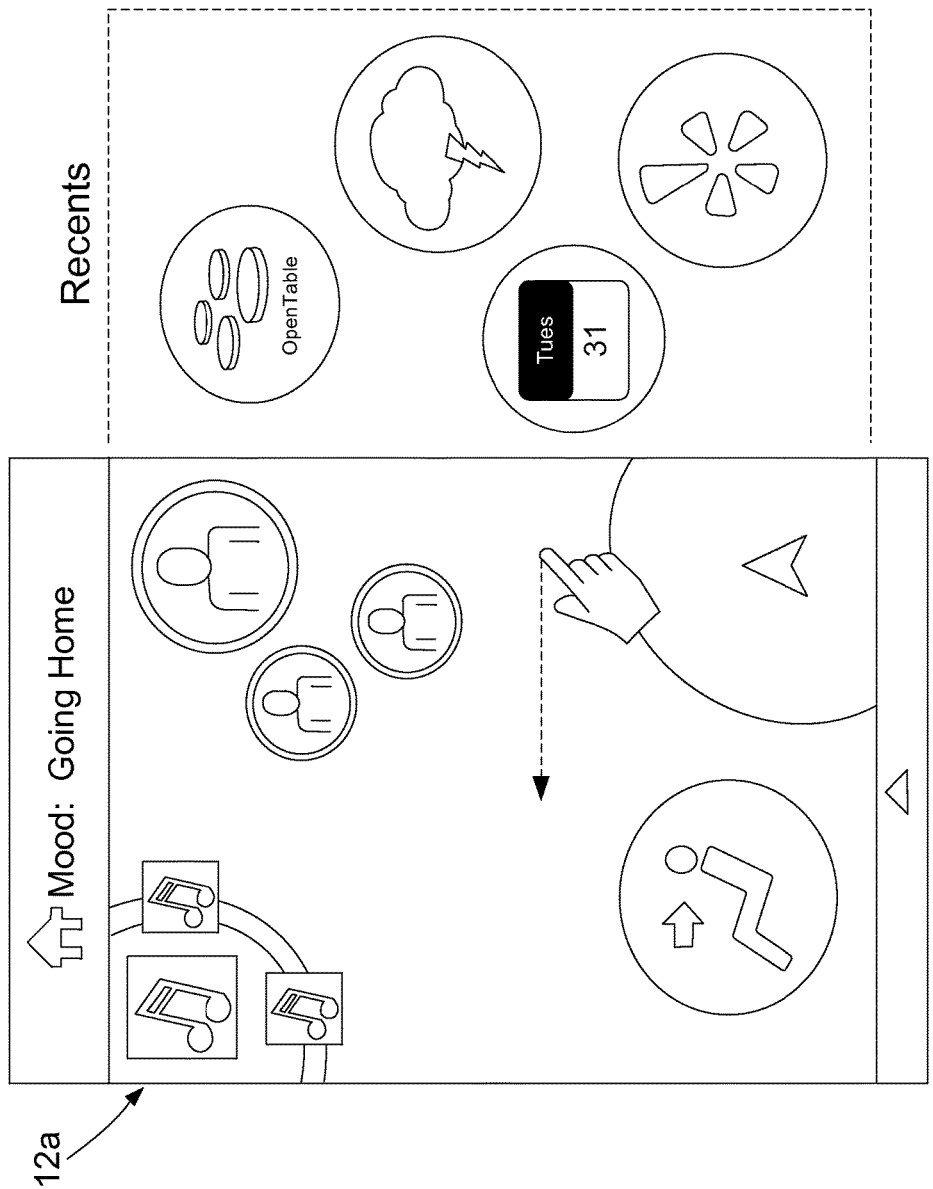
FIG. 40 shows how a leftward finger swipe motion can be used to quickly bring recently used applications which have moved off of the touchscreen display back onto the touchscreen display.

The system 10 further provides the ability for the circle widgets to interact with one another simply by dragging and dropping one circle widget onto another. In FIG. 39, a HVAC control widget 810, a navigation widget 812, a first contact 814, a second contact 816 and a music widget 818 are shown being displayed on the touchscreen display 12a. In this example the applications corresponding to these widgets form a mood "Hungry", as displayed in mood bar 780. The user is able to share his/her real time location with the first contact simply by touching the navigation widget 812 and dragging it onto the first contact widget 814. The system 10 then sends the real time location of the user to the first contact. Similar actions can be taken for other functions. For example, the user is able to send a song or playlist that is presently being displayed in a media widget to a widget representing a contact or Zoo group that the user wishes to share the media content with. When any such type of sharing action takes place, the system 10 of the recipient contact creates a widget that is displayed on his/her touchscreen display 12a, with the information received from the user contained therein. FIG. 40 further shows how widgets representing previously used applications, which are no longer being displayed on the touchscreen display 12a, can be quickly moved back onto the touchscreen display. This is accomplished by the user simply swiping a finger from right to left on the touchscreen display 12a. Widgets representing recently used applications are then moved back onto the touchscreen display 12a.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A motor vehicle information management system for use in a motor vehicle, the system comprising:

a radio system present in the vehicle and including a display system;
a remotely located, vehicle manufacturer management portal for communicating information wirelessly between the manufacturer of the vehicle and an operator of the vehicle to help manage and maintain the vehicle;
a remotely located, processor-based inference engine for automatically, wirelessly receiving information inputs from the radio system in real time pertaining to a real time location of the vehicle and:
a destination of travel of the vehicle; and
a status of operation of at least one subsystem of the vehicle without requiring a parameter input from the operator of the vehicle;
a workload management processor in communication with the radio system;
the processor-based inference engine configured to analyze the information inputs and to determine new information, in real time, that is useful to the operator of the vehicle, and automatically transmitting the new information wirelessly to the radio system for presentation to a user of the vehicle;
wherein the display system of the vehicle is configured to automatically display the new information to the operator of the vehicle; and
wherein the processor-based inference engine is configured to:
access historical information on routes travelled by the vehicle on specific days and specific times of day;
use the historical information on routes previously travelled by the operator to generate an inferred destination of the vehicle and an inferred route of travel; and
consider real time information obtained from the radio system pertaining to the status of operation of the subsystem of the vehicle;
based on the inferred destination of the vehicle and known locations of establishments along the inferred route of travel leading to the inferred destination, using the inference engine to determine a specific establishment able to address the status of operation of the vehicle, and to transmit information to the radio system which informs the operator of the specific establishment along the inferred route of travel at which the status of operation of the subsystem of the vehicle can be addressed; and
the workload management processor being in communication with the process-based inference engine and analyzing the monitored information and communicating suggested information to the operator of the vehicle.

2. The system of claim 1, wherein the workload management processor includes a computer in communication with the radio system, and configured to monitor and obtain monitored information concerning at least one of:
body control sensors located on the vehicle;
wheel speed sensors located on the vehicle;
accelerometers located on the vehicle;
at least one component associated with the engine of the vehicle;
a real time fuel level of fuel remaining in a fuel tank of the vehicle;
a real time remaining oil life of engine oil associated with an engine of the vehicle;
at least one component associated with the electrical system of the vehicle; and
the workload management processor using the obtained monitored information to determine suggested information to be provided to the operator concerning operation of the vehicle.

3. The system of claim 2, wherein the work load management processor is further able to receive information from at least one of:
a decision support system (DSS) on-board the vehicle having a camera for monitoring eye movements of the vehicle operator while the vehicle operator is operating the vehicle;
a radar device on-board the vehicle;
a sonar device on-board the vehicle;
a navigation system including maps, the navigation system being on-board the vehicle; and
wherein the work load management processor is able to use the received information to help determine the suggested information to be provided to the operator.

4. The system of claim 2, wherein the suggested information to be provided to the user concerning operation of the vehicle includes at least one of:
a suggested alternative route of travel, based on a destination known to the workload management processor;
a suggested action of refueling the vehicle;
a suggested action of having a periodic vehicle maintenance operation performed on the vehicle.

5. The system of claim 1, wherein the radio system further includes a voice recognition engine for processing voice commands received from the operator as the operator operates the vehicle.

6. The system of claim 1, wherein the radio system further comprises a text-to-speech subsystem for generating audio information to the vehicle operator in accordance with text presented on the display system.

7. The system of claim 1, wherein the radio system further comprises a phone/calendar management system for obtaining stored phone numbers and calendar information of the vehicle operator via at least one of:
a near field, wireless communication link with a smartphone of the vehicle operator which is present in the vehicle; or
a remote server wirelessly accessible by the radio system, wherein the remote server includes the phone numbers and calendar appointments associated with the vehicle operator.

8. The system of claim 1, further comprising a plurality of cloud-based portals wirelessly accessible by the radio system using a wide area network, the cloud-based portals including at least one of:
a portal associated with stored information concerning the operator of the vehicle and the vehicle;
a portal associated with at least one social media website;
a portal associated with a web-based search engine;
a portal associated with real time weather information;
a portal associated with real time traffic information;
a portal associated with a vehicle dealer associated with the operator's vehicle;
a portal associated with real time news information; and
a portal associated with a voice recognition engine.

9. The system of claim 8, wherein the inference engine is able to obtain additional information from at least two of the portals.

10. The system of claim 1, wherein the radio system display system comprises a touchscreen display.

11. The system of claim 1, further comprising an integrated center stack (ICS) subsystem present in the vehicle and accessible by the vehicle operator from during operation of the vehicle, the ICS including:
- a human/machine interface (HMI) to assist the operator in interacting with the ICS subsystem;
- a cluster touchscreen display system; and
- a heads up display system; and
- a web browser.

12. The system of claim 1, further comprising at least one rear seat electronics subsystem in communication with the radio system, and disposed for use by an occupant seated in a rear seat of the vehicle.

13. The system of claim 1, wherein the processor-based inference engine is further configured to:
- access historical information on routes travelled by the vehicle on specific days and specific times of day;
- access a calendar of the operator;
- use the historical information on routes travelled and appointments contained in calendar information associated with the operator to help in inferring what the destination of the vehicle is; and
- based on the inferred destination of the vehicle, to suggest information to the user that is helpful to the user in at least one of:
  - managing operation of the vehicle in travelling to the inferred destination; or
  - determining and suggesting a new route of travel if the processor-based inference engine determines that the user is not likely to reach the destination by an appointment time associated with the destination.

14. An information management system for use in a motor vehicle, the system comprising:
- a radio system with an associated processor, and located in the vehicle;
- a cloud-based vehicle manufacturer management portal for communicating information wirelessly between the manufacturer of the vehicle and an operator of the vehicle via the vehicle radio system to help manage and maintain the vehicle;
- a cloud-based and processor controlled inference engine for automatically, wirelessly receiving information inputs from the radio system in real time pertaining to a real time location of the vehicle and operation of a subsystem of the vehicle, along with a destination of travel of the vehicle;
- a touchscreen display system in the vehicle and accessible by the operator of the vehicle while operating the vehicle;
- a workload management processor in communication with the cloud-based vehicle manufacturer management portal through the vehicle radio system;
- a navigation system operably associated with the vehicle for receiving real time navigation information and position information concerning a real time location of the vehicle while the operator is operating the vehicle;
- a cloud-based portal containing information pertaining to other vehicle users and being wirelessly accessible by the radio system to enable information to both be provided to the radio system in real time, as well as received from the radio system in real time and made available for use by the other vehicle users in real time;
- a zoo system running on the processor for enabling the operator to designate a select subgroup of individuals, using the touchscreen display, who are operating other vehicles which each have a radio system capable of communicating with the operator's radio system, and which are each in communication with the zoo system through the cloud-based portal, and to enable the operator to push selected information in real time to radio systems associated with the select subgroup of individuals; and
- wherein the inference engine uses information provided from a plurality of subsystems of the vehicle, without requiring an input of user parameters, to determine an inferred destination of the vehicle, an inferred route of travel of the vehicle, and an operating status of a subsystem of the vehicle from operating system information received wirelessly from the vehicle's radio system, and providing information on an establishment along the inferred route of travel that is able to address the operating subsystem of the vehicle; and
- wherein the cloud-based manufacturer management portal provides suggested information back to the operator based at least in part on the information received from the workload management processor.

15. The system of claim 14, wherein the selected information which is pushed to the radio systems of the select subgroup of individuals comprises at least one of:
- an email message sent to the select subgroup of individuals through the cloud-based portal;
- information sent to the select subgroup of individuals concerning a real time location of the vehicle of the operator, sent through the cloud-based portal;
- information concerning a destination and route of travel to the select subgroup of individuals which is sent through the cloud-based portal;
- audio content playing on the radio system of the operator which is pushed to an audio system of each one of the select subgroup of individuals, through the cloud-based portal; and
- points of interest designated by the operator using the radio system, which are pushed to the select subgroup of individuals using the cloud-based portal.

16. The system of claim 14, wherein the information points of interest comprise at least one of:
- a retail establishment;
- a restaurant; or
- a road hazard.

17. The system of claim 14, wherein the zoo system is configured to display on the touchscreen display system of the operator's vehicle, a real time location of each one of the select subgroup of individuals.

18. The system of claim 14, wherein the vehicle operator is able to command pushing a real time location of the operator's vehicle to each one of the select subgroup of individuals, via the cloud-based portal, by the operator swiping a finger on the touchscreen display system.

19. The system of claim 14, wherein the radio system of any one of the select subgroup of individuals enables a command to be received from its associated user that commands the user's radio system to display, on an associated display system, the real time route of the operator's vehicle, to enable the user to follow the operator's vehicle.

20. A method for obtaining and managing information for use in a motor vehicle by a motor vehicle operator while operating the motor vehicle, the method comprising:
- using a remotely located processor-based inference engine for automatically, wirelessly receiving information inputs from a radio system in the vehicle, in real time, pertaining to a real time location of the vehicle a destination of travel of the vehicle and, without requiring a parameter input from the operator of the vehicle, an operating status of a subsystem of the vehicle;
- using a cloud-based vehicle manufacturer management portal for communicating information wirelessly between the manufacturer of the vehicle and the operator of the vehicle to help manage and maintain the vehicle;

using a workload management processor in communication with the cloud-based vehicle manufacturer management portal through the vehicle radio system, which provides information to the vehicle manufacturer management portal;

using the processor-based inference engine to analyze the information inputs and to determine new information, in real time, that is useful to an operator of the vehicle, and automatically transmit the new information wirelessly to the radio system for presentation to a user of the vehicle on a display system within the vehicle;

using the display system of the vehicle to automatically display the new information to the operator of the vehicle; and wherein the processor-based inference engine is configured to:

access historical information on routes travelled by the vehicle on specific days and specific times of day;

use the historical information on routes previously travelled by the operator to generate an inferred destination of the vehicle and an inferred route of travel; and consider real time information obtained from the radio system pertaining to the status of operation of the subsystem of the vehicle; and based on the inferred destination of the vehicle and known locations of establishments along the inferred route of travel leading to the inferred destination, using the inference engine to determine a specific establishment able to address the operating status of the vehicle, and to transmit information to the radio system which informs the operator of the specific establishment along the inferred route of travel at which the subsystem of the vehicle can be addressed; and said cloud based vehicle manufacturer management portal providing suggested information back to the operator via the vehicle radio system based on information supplied by the workload management processor.

21. A method for controlling the display of touch controlled widgets on a touchscreen display system of a vehicle radio system, where the widgets provide information and control capabilities associated with the vehicle, based on anticipated needs or preferences of an operator of the vehicle, the method comprising:

using a navigation system to determine a real time location of the vehicle;

displaying at least one touch controlled widget in a first dimension on the touch screen display system;

using a remotely located, processor based inference engine to detect a real time vehicle operating condition, without requiring a parameter input from the vehicle operator, that is expected to be important to the vehicle operator;

using a cloud-based vehicle manufacturer management portal for communicating information wirelessly between the manufacturer of the vehicle and the operator of the vehicle to help manage and maintain the vehicle;

using a workload management processor in communication with the cloud-based vehicle manufacturer management portal via the vehicle radio system to supply information relating to operation of the vehicle to the cloud-based vehicle manufacturer management portal;

using an intelligent display resource manager in communication with the remotely located, processor based inference engine and the vehicle manufacturer management portal, to automatically modify a visual presentation of the at least one touch controlled widget on the touchscreen display system, and to automatically display another touch controlled widget on the touchscreen display system in a manner that signifies a higher priority than the at least one touch controlled widget;

using the inference engine and information supplied from the navigation system to infer a route of travel and a destination of the vehicle, and to determine a specific establishment along the inferred route of travel which is able to address the vehicle operating condition providing information on an establishment along the inferred route of travel that is relevant to the real time condition; and using the cloud-based vehicle manufacturer management portal to provide suggested information to the operator based on an evaluation of the information received from the workload management processor.

22. The method of claim 21, wherein the at least one touch controlled widget is displayed with a plurality of control selections based on learned and monitored past usage of the vehicle operator.

* * * * *